United States Patent
Niwa et al.

(10) Patent No.: US 12,450,524 B2
(45) Date of Patent: Oct. 21, 2025

(54) MACHINE LEARNING SYSTEM, MACHINE LEARNING METHOD, AND PROGRAM

(71) Applicants: NIPPON TELEGRAPH AND TELEPHONE CORPORATION, Tokyo (JP); VICTORIA UNIVERSITY OF WELLINGTON, Wellington (NZ)

(72) Inventors: Kenta Niwa, Tokyo (JP); Willem Bastiaan Kleijn, Wellington (NZ)

(73) Assignees: NTT, Inc., Tokyo (JP); VICTORIA UNIVERSITY OF WELLINGTON, Wellington (NZ)

(*) Notice: Subject to any disclaimer, the term of this patent is extended or adjusted under 35 U.S.C. 154(b) by 1100 days.

(21) Appl. No.: 17/047,028

(22) PCT Filed: Apr. 12, 2019

(86) PCT No.: PCT/JP2019/015973
§ 371 (c)(1),
(2) Date: Oct. 12, 2020

(87) PCT Pub. No.: WO2019/198815
PCT Pub. Date: Oct. 17, 2019

(65) Prior Publication Data
US 2021/0158226 A1 May 27, 2021

(30) Foreign Application Priority Data

Apr. 12, 2018 (JP) ................. 2018-076814
Apr. 12, 2018 (JP) ................. 2018-076815
(Continued)

(51) Int. Cl.
*G06N 20/20* (2019.01)
*G06F 17/18* (2006.01)

(52) U.S. Cl.
CPC ............ *G06N 20/20* (2019.01); *G06F 17/18* (2013.01)

(58) Field of Classification Search
CPC ........ G06N 20/00; G06N 20/20; G06F 17/18; G06F 17/11
See application file for complete search history.

(56) References Cited

U.S. PATENT DOCUMENTS
2014/0279771 A1 9/2014 Golovashkin et al.

OTHER PUBLICATIONS

Zhang et al., Distributed Optimization Using the Primal-Dual Method of Multipliers, arXiv:1702.00841v1, Dec. 2, 2017, 14 pages (Year: 2017).*

(Continued)

*Primary Examiner* — Markus A. Vasquez

(57) ABSTRACT

Machine learning techniques which allow machine learning to be performed even when a cost function is not a convex function are provided. A machine learning system includes a plurality of node portions which learn mapping that uses one common primal variable by machine learning based on their respective input data while sending and receiving information to and from each other. The machine learning is performed so as to minimize, instead of a cost function of a non-convex function originally corresponding to the machine learning, a proxy convex function serving as an upper bound on the cost function. The proxy convex function is represented by a formula of a first-order gradient of the cost function with respect to the primal variable or by a formula of a first-order gradient and a formula of a second-order gradient of the cost function with respect to the primal variable.

1 Claim, 23 Drawing Sheets

(30) Foreign Application Priority Data

Apr. 12, 2018 (JP) ................................ 2018-076816
Apr. 12, 2018 (JP) ................................ 2018-076817
Oct. 29, 2018 (JP) ................................ 2018-202397

(56) References Cited

OTHER PUBLICATIONS

Feinberg (2017) "Non-convex First Order Methods", [online], Jun. 20, 2017, pp. 1-14.

Richtarik et al. (2015) "Modern Convex Optimization Methods for Large-Scale Empirical Risk Minimization (Part 1: Primal Methods)",[online], Jul. 6, 2015, International Conference on Machine Learning (ICML 2015), pp. 1, 4, 8, 13, 20, 22, 27, 30, 36, 39, 41, 44, 46, 47, 51, 54, 57-63, 68.

Mu Li et al. (2014) "Scaling Distributed Machine Learning with the Parameter Server", Proceedings of the 11th USENIX Symposium on Operating Systems Design and Implementation (OSDI'14), [online], USENIX Association, Oct. 8, 2014, pp. 583-598, ISBN: 978-1-931971-16-4.

Tsianos et al. (2012) "Consensus-Based Distributed Optimization: Practical Issues and Applications in Large-Scale Machine Learning", Proceedings of the 50th Annual Allerton Conference on Communication, Control, and Computing (Allerton 2012), Oct. 5, 2012, pp. 1543-1550, ISBN: 978-1-4673-4539-2.

Sherson et al. (2017) "Derivation and Analysis of the Primal-Dual Method of Multipliers Based on Monotone Operator Theory", [online], Nov. 6, 2017, version v3, arXiv: 1706.02654v3, pp. 1-13.

Chang et al. (2014) "Distributed Constrained Optimization by Consensus-Based Primal-Dual Perturbation Method", IEEE Transactions on Automatic Control, vol. 59, No. 6, Jun. 2014, pp. 1524-1538, ISSN: 0018-9286.

Boyd et al. (2011) "Distributed Optimization and Statistical Learning via the Alternating Direction Method of Multipliers", Foundations and Trends in Machine Learning, 3(1):1-122.

Ryu et al. (2016) "Primer on Monotone Operator Methods", Appl. Comput. Math., 15(1):3-43.

Niwa et al. (2018) "Bregman Monotone Operator Splitting", arXiv:1807.04871v1, Jul. 13, 2018.

\* cited by examiner

Algorithm 1 Conventional PDMM based Edge-consensus Algorithm

---
Initialization of $z_{i|j}^0$, $p_i^0$, $\zeta_i^0$
for t=0, ..., T-1 do
   △ Latent variable update (Update of latent variable)
   for all i∈V do
      $p_i^{t+1} = \text{argmin}_{p_i}(F_{1,i}(p_i) - \sum_{j \in N(i)} \langle z_{i|j}^t, A_{i|j}p_i \rangle + 1/(2\gamma)\|A_{i|j}p_i + A_{j|i}\zeta_i^t\|_2^2)$,
   △ Dual variable update (Update of dual variable)
   for all i∈V, j∈N(i) do
      $\lambda_{i|j}^{t+1} = z_{i|j}^t - 2\kappa A_{i|j} p_i^{t+1}$,
   △ Transmit data    (Exchange latent variable and dual variable between connected nodes)
   for all i∈V, j∈N(i) do
      $\xi_{i|j}^{t+1} = \text{Transmit}_{j \to i}\{\lambda_{j|i}^{t+1}\}$,
      $\zeta_i^{t+1} = \text{Transmit}_{j \to i}\{p_j^{t+1}\}$,
   △ Dual variable update (Update of dual variable)
   for all i∈V, j∈N(i) do
      $z_{i|j}^{t+1} = \begin{cases} \xi_{i|j}^{t+1} & \text{(P-R type)} \\ \alpha \xi_{i|j}^{t+1} + (1-\alpha) z_{i|j}^t & \text{(D-R type)} \end{cases}$
end for

FIG. 11

Algorithm 2 B-MOS based Edge-consensus Algorithm

Initialization of $z_{i|j}^0$, $p_i^0$, $\zeta_i^0$
for $t=0, \ldots, T-1$ do
    ▷ Latent variable update (Update of latent variable)
    for all $i \in V$ do
        $p_i^{t+1} = \text{argmin}_{p_i}(F_{1,i}(p_i) - \sum_{j \in N(i)} \langle z_{i|j}^t, A_{i|j}p_i\rangle + 1/(2\gamma)\|A_{i|j}p_i + A_{j|i}\zeta_i^t\|_2^2)$,
    ▷ Dual variable update (Update of dual variable)
    for all $i \in V$, $j \in N(i)$ do
        $\lambda_{i|j}^{t+1} = z_{i|j}^t - 2H_{D_{i|j}}^{-1}(z_{i|j}^t)A_{i|j}p_i^{t+1}$,
    ▷ Transmit data   (Exchange latent variable and dual variable between connected nodes)
    for all $i \in V$, $j \in N(i)$ do
        $\xi_{i|j}^{t+1} = \text{Transmit}_{j \to i}\{H_{D_{j|i}}(z_{j|i}^t)\lambda_{j|i}^{t+1}\}$,
        $\zeta_i^{t+1} = \text{Transmit}_{j \to i}\{p_j^{t+1}\}$,
    ▷ Dual variable update (Update of dual variable)
    for all $i \in V$, $j \in N(i)$ do
        $z_{i|j}^{t+1} = \begin{cases} H_{D_{i|j}}^{-1}(z_{i|j}^t)\xi_{i|j}^{t+1} & \text{(P-R splitting)} \\ \alpha H_{D_{i|j}}^{-1}(z_{i|j}^t)\xi_{i|j}^{t+1} + (1-\alpha)z_{i|j}^t & \text{(D-R splitting)} \end{cases}$
end for

FIG. 12

Algorithm 3 B-MOS based Edge-consensus Algorithm
―――――――――――――――――――――――――――――――――――――
Initialization of $z_{i|j}^0$, $p_i^0$
for $t=0, \ldots, T-1$ do
  △ Dual variable update (Update of dual variable)
  for all $i \in V$, $j \in N(i)$ do
    $\lambda_{i|j}^{t+1} = z_{i|j}^t - 2H_{D i|j}^{-1}(z_{i|j}^t)(A_{i|j}(p_i^t - H_{F1,i}^{-1}(p_i^t)\partial F_{1,i}(p_i^t)))$
  △ Latent variable update (Update of latent variable)
  for all $i \in V$ do
    $p_i^{t+1} = p_i^t - H_{F1,i}^{-1}(p_i^t)(\partial F_{1,i}(p_i^t) - \sum_{j \in N(i)} A_{i|j}^T w_{i|j}^{t+1}$
  △ Transmit data (Exchange dual variable between connected nodes)
  for all $i \in V$, $j \in N(i)$ do
    $\xi_{i|j}^{t+1} = \text{Transmit}_{j \to i}\{H_{D j|i}(z_{j|i}^t)\lambda_{j|i}^{t+1}\}$,
  △ Dual variable update (Update of dual variable)
  for all $i \in V$, $j \in N(i)$ do
    $z_{i|j}^{t+1} = \begin{cases} H_{D i|j}^{-1}(z_{i|j}^t)\xi_{i|j}^{t+1} & \text{(P-R splitting)} \\ \alpha H_{D i|j}^{-1}(z_{i|j}^t)\xi_{i|j}^{t+1} + (1-\alpha)z_{i|j}^t & \text{(D-R splitting)} \end{cases}$
end for

FIG. 13

MACHINE LEARNING SYSTEM, MACHINE LEARNING METHOD, AND PROGRAM

CROSS-REFERENCE TO RELATED APPLICATIONS

This application is a U.S. 371 Application of International Patent Application No. PCT/JP2019/015973, filed on 12 Apr. 2019, which application claims priority to and the benefit of JP Application No. 2018-076814, filed on 12 Apr. 2018, JP Application No. 2018-076815, filed on 12 Apr. 2018, JP Application No. 2018-076816, filed on 12 Apr. 2018, JP Application No. 2018-076817, filed on 12 Apr. 2018, and JP Application No. 2018-202397, filed on 29 Oct. 2018, the disclosures of which are hereby incorporated herein by reference in their entireties.

TECHNICAL FIELD

The present invention relates to techniques for machine learning.

BACKGROUND ART

Machine learning has been booming in recent years. For machine learning, it is increasingly common to use a framework that acquires mapping between collected data and information that should be output through learning with data and teaching data. In some cases, a cost function is used instead of teaching data.

Most of the currently ongoing researches adopt frameworks in which data is centralized and mapping is learned using teaching data or a designed cost function. However, centralization of information such as speech and video is becoming less practical today, when data volumes are becoming considerably enormous. For providing smooth services (for example, a response time would be shorter when the network distance between a user and a server is smaller), one of the techniques desired in the field of today's machine learning is a framework in which data is collected at distributed nodes (for example, servers and PCs), the nodes are connected with each other, and mapping is optimized and shared among all the nodes only by exchanging latent variables for data, not large-volume data themselves. Such a technique is called a consensus algorithm in edge computing.

FIG. 1 shows an example of a network system as an application of the consensus algorithm. In the network system of FIG. 1, a multitude of sensors A-101 and the like (for example, microphones, cameras, and thermometers) are placed in a distributed manner across various environments (for example, houses, factories, outdoors, and buildings), and data acquired through those sensors A-101 are accumulated at each of multiple node portions A-102 (for example, servers and PCs) which are placed in a distributed manner. A centralized framework needs a central server and also requires all pieces of the data to be accumulated on the central server, whereas when the consensus algorithm is used, the central server need not exist and data may be accumulated at each of the multiple node portions A-102 which are placed in a distributed manner. Note that data is not limited to those acquired from the sensors A-101 but may be character data and the like acquired from input devices, Web, or the like. The node portions A-102 in the network system of FIG. 1 are loosely connected with each other by edges A-103; they do not have to be fully connected and only have to be in a relationship that allows direct or indirect exchange of some pieces of data between the node portions A-102. Connecting structure of the edges A-103 is not limited; it can be any structure such as a tree or cyclic/circle structure as long as all the node portions A-102 are directly or indirectly connected. That is, the connecting structure of the edges A-103 can be any structure that is not a divided structure.

Use of the consensus algorithm in edge computing enables mapping to be optimized and shared while exchanging variables generated in the course of learning the mapping between nodes, not the data itself, under conditions like the network system of FIG. 1. This makes it possible to shorten the response time or reduce the amount of data.

As an example of conventional techniques, consensus-type edge computing based on convex optimization technique is discussed. Although the cost function is limited to being a convex function, consensus-type edge computing techniques already exist. A first one is a method based on Distributed ADMM (Alternating Direction Method of Multipliers) (see Non-patent Literature 1, for instance), and a second one is a method based on PDMM (Primal Dual Method of Multipliers) (see Non-patent Literature 2, for instance). Note that DNNs do not fall in this category because they use non-convex cost functions.

<<Consensus Algorithm of Distributed ADMM>>

The consensus algorithm of the Distributed ADMM is described below.

The cost function is limited to a closed proper convex function. In the consensus algorithm based on the Distributed ADMM, the whole structure is optimized while updating primal variables and dual variables. In the process, the primal variables are shared among nodes and the cost function is generated in a manner that consensus is formed such that the primal variables match each other.

FIG. 2 shows a situation where three kinds of nodes are fully connected. In the example of FIG. 2, the variables consist of three kinds of primal variables $w_1$, $w_2$, $w_3$, six kinds of dual variables $\lambda_{1|2}, \lambda_{2|1}, \lambda_{1|3}, \lambda_{3|1}, \lambda_{2|3}, \lambda_{3|2}$, and six kinds of primal variables $w_1^{<1>}, w_1^{<2>}, w_2^{<1>}, w_2^{<2>}, w_3^{<1>}, w_3^{<2>}$ exchanged between the nodes.

An index set ~V which represents the nodes and the number of nodes V are written as follows.

$$\tilde{V}=\{1,2,3\}, V=3$$

An index set of nodes connected with the ith node (information on edges) ~N(i) and the number of them N(i) are written as follows. Here, ~N(i) represents that "~" is placed above N(i). This also applies to ~V and ~B, mentioned later.

$$\{2,3\}\in\tilde{N}(1), N(1)=2$$

$$\{1,3\}\in\tilde{N}(2), N(2)=2$$

$$\{1,2\}\in\tilde{N}(3), N(3)=2$$

A dual variable at the ith node with respect to the jth node is represented as $\lambda_{i|j}$.

As an instance of mapping, a least square problem with teaching data is handled.

Symbols are defined as follows. Let s be teaching data; x be input data (sometimes referred to as "observation data"); w be a weight vector; B be the dimension (b=1, ..., B) of teaching data (sometimes referred to as "output data"); and λ be a dual variable. The dimension of the dual variable λ is assumed to be the same as the dimension of the weight vector w. The meaning of these alphabets with suffixes is assumed to be the same as the meaning of them without suffixes. For example, $s_i$ means teaching data as with s. Also, assume that $\sim B = \{1, \ldots, B\}$ holds. B is a predetermined positive integer. When an identification problem is handled, B is an integer equal to or greater than 2. For example, B=10 holds for a task of recognizing ten different numbers. When a regression problem is handled, B=1 holds, for example.

Then, with $i=1, \ldots, V$, teaching data $s_i$ has the following configuration.

$$s_i = [s_{i,1}, \ldots, s_{i,B}]^T$$

Similarly, assume that $x_i = [x_{i,1}, \ldots, x_{i,B}]^T$, $w_i = [w_{i,1}, \ldots, w_{i,B}]^T$, and $\lambda_{i|j} = [\lambda_{i|j,1}, \ldots, \lambda_{i|j,B}]^T$ hold.

When using an arithmetic that obtains $s_i$ by weighted addition to data $x_i$ residing at the ith node as mapping, the cost for optimizing the mapping can be written by the proper convex closed function $f_i$ below. The cost function at the ith node is represented as $f_i$ and w that minimizes it is found.

$$f_i(w_{i,b}) = \tfrac{1}{2} \| s_{i,b} - x_i^T w_{i,b} \|_2$$

Here, the mapping function is assumed to be a linear weighted addition $\hat{s}_{i,b} = x_i^T w_{i,b}$. The symbol "^" on the upper left of $s_{i,b}$ means that it is obtained with $w_{i,b}$ that was acquired after or during learning. Also, with "·" being an arbitrary number, $\|\cdot\|_p$ means L-p norm.

w will be called the primal variable hereinafter. The problem of minimizing the cost under a restriction that V nodes are connected and the variables are made the identical among them can be written by the following.

$$\min_{w_{i,b}} \max_{\lambda_{i|j,b}} \sum_{i \in \tilde{V}} f_i(w_{i,b}) + \sum_{j \in \tilde{N}(i)} \lambda_{i|j,b}^T (A_{i|j} w_{i,b} + A_{j|i} w_{j,b}^{<i>})$$

Here, $w_{j,b}^{<i>}$ means the primal variable for the jth node accumulated at the ith node. As discussed later, $w_{j,b}^{<i>}$ is updated as appropriate.

This formula indicates that the primal variable w is optimized so as to minimize the cost function under the condition of maximizing the dual variable $\lambda$ (an intention that the term by which $\lambda$ is multiplied becomes 0 if the condition that the primal variables between nodes match each other between connected nodes is satisfied).

The condition that the primal variable w matches between connected nodes can be represented by describing a matrix A with a relationship that makes the sum of each other 0, for example. For example, the matrix A can be described with I, −I, and 0 as shown below. I is an identity matrix and 0 is a zero matrix.

$$A_{i|j} = \begin{cases} I & (i > j, j \in \tilde{N}(i)) \\ -I & (i < j, j \in \tilde{N}(i)) \\ 0 & \text{(otherwise)} \end{cases}$$

From the minimax theorem found at pp. 154-155 of Non-patent Literature 3, if a cost function "f" is a proper convex function, the optimal solution of the original problem of "minimizing the primal variable while maximizing the dual variable" agrees with the optimal solution for when the problem of "maximizing the dual variable while minimizing the primal variable" is solved.

$$\max_{\lambda_{i|j,b}} \min_{w_{i,b}} \sum_{i \in \tilde{V}} f_i(w_{i,b}) + \sum_{j \in \tilde{N}(i)} \lambda_{i|j,b}^T (A_{i|j} w_{i,b} + A_{j|i} w_{j,b}^{<i>})$$

One scheme for solving this problem is the augmented Lagrangian method (see Non-patent Literature 2, for instance). This is a method that adds a penalty term in order to stabilize an optimization process. $\rho_i$ is a predetermined positive number.

$$\max_{\lambda_{i|j,b}} \min_{w_{i,b}} \sum_{i \in \tilde{V}} f_i(w_{i,b}) +$$

$$\sum_{j \in \tilde{N}(i)} \lambda_{i|j,b}^T (A_{i|j} w_{i,b} + A_{j|i} w_{j,b}^{(i)}) + \frac{\rho_i}{2} \| A_{i|j} w_{i,b} + A_{j|i} w_{j,b}^{(i)} \|_2 =$$

$$\max_{\lambda_{i|j,b}} \min_{w_{i,b}} \sum_{i \in \tilde{V}} f_i(w_{i,b}) + \sum_{j \in \tilde{N}(i)} \frac{\rho_i}{2} \left\| A_{i|j} w_{i,b} + A_{j|i} w_{j,b}^{(i)} + \frac{1}{\rho_i} \lambda_{i|j,b} \right\|_2 - \frac{1}{2\rho_i} \| \lambda_{i|j,b} \|_2$$

The inside problem of minimization for w is solved first. That is, a point at which the differential is 0 with respect to w is sought. w* refers to the point of optimization for w. Also, t represents the index of the number of updates.

$$w_{i,b}^* =$$

$$\operatorname*{argmin}_{w_{i,b}} \left\{ f_i(w_{i,b}) + \sum_{j \in \tilde{N}(i)} \frac{\rho_i}{2} \left\| A_{i|j} w_{i,b} + A_{j|i} w_{j,b}^{(i)} + \frac{1}{\rho_i} \lambda_{i|j,b}^{(t)} \right\|_2 - \frac{1}{2\rho_i} \| \lambda_{i|j,b}^{(t)} \|_2 \right\} =$$

$$\left[ x_i x_i^T + \rho_i \sum_{j \in \tilde{N}(i)} A_{i|j}^T A_{i|j} \right]^{-1} \left( x_i s_{i,b} - \sum_{j \in \tilde{N}(i)} A_{i|j}^T (\rho_i A_{j|i} w_{j,b}^{(i)} + \lambda_{i|j,b}) \right)$$

Thus, the t+1th update of the primal variable is performed in the following manner.

$$w_{i,b}^{(t+1)} = \left[ x_i x_i^T + \rho_i \sum_{j \in \tilde{N}(i)} A_{i|j}^T A_{i|j}^{(t)} \right]^{-1} \left( x_i s_{i,b} - \sum_{j \in \tilde{N}(i)} A_{i|j}^T (\rho_i A_{j|i} w_{j,b}^{(i)} + \lambda_{i|j,b}^{(t)}) \right)$$

The t+1th update for the dual variable is performed in the following manner.

$$\lambda_{i|j,b}^{(t+1)} = \lambda_{i|j,b}^{(t)} + \rho_i (A_{i|j} w_{i,b}^{(t+1)} + A_{j|i} w_{j,b}^{<i>})$$

The consensus algorithm of the conventional Distributed ADMM can be summarized as follows.

Assuming that updates are to be made T times, processing from (1) to (3) below is performed for $t \in \{0, \ldots, T-1\}$. Here, T is the number of repetitions, being a predetermined positive integer. In the present specification, T represents either the number of repetitions or a transposition of a matrix and a vector; however, in the following description, T will be used without explicitly indicating which of them is meant because it would be apparent for those skilled in the art from the context.

(1) Update the Primal Variable for $i \in \tilde{V}$, $b \in \tilde{B}$, $$w_{i,b}^{(t+1)} = \left[ x_i x_i^T + \rho_i \sum_{j \in \tilde{N}(i)} A_{i|j}^T A_{i|j} \right]^{-1} \left( x_i s_{i,b} - \sum_{j \in \tilde{N}(i)} A_{i|j}^T (\rho_i A_{j|i} w_{j,b}^{(i)} + \lambda_{i|j,b}^{(t)}) \right)$$

(2) Update the Dual Variable for $i \in \tilde{V}, j \in \tilde{N}(i), b \in \tilde{B}$, $$\lambda_{i|j,b}^{(t+1)} = \lambda_{i|j,b}^{(t)} + \rho_i (A_{i|j} w_{i,b}^{(t+1)} + A_{j|i} w_{j,b}^{<i>})$$

(3) Although it need not be performed every time and it can be done independently for each edge (asynchronously), the primal variables are updated between nodes.

for $i\in \tilde{V}, j\in \tilde{N}(i), b\in \tilde{B}$,

Node$_j\leftarrow$Node$_i(w_{i,b}^{(t+1)})$ $w_{i,b}^{<j>}=w_{i,b}^{(t+1)}$

An advantage of the consensus algorithm of the Distributed ADMM is that, though lacking theoretical background, it has been confirmed through several experiments to converge even when there is a statistical property difference among data sets accumulated at the nodes. However, its convergence rate is low.

On the other hand, the disadvantages of the consensus algorithm of the Distributed ADMM include the following (1) to (4): (1) The convergence rate is low. (2) In principle, it cannot be applied to the optimization of non-convex functions (including DNNs and the like). (3) Confidentiality of information is somewhat low in terms of exchanging the primal variable. That is, the primal variable sometimes strongly reflects the nature of data, so the statistical properties of the data can be acquired by hacking the primal variable. (4) It requires somewhat high transmission rate. That is, the required transmission rate tends to be high when no statistical bias is seen in the data of the primal variable.

<<PDMM-Based Consensus Algorithm>>

Next, the PDMM-based consensus algorithm is described. A major difference from the Distributed ADMM is that dual variables are also shared in addition to the primal variable. As discussed later, consensus is formed for a pair of dual variables.

Solving an optimization problem under the condition of $\lambda_{i|j}=\lambda_{j|i}$ is equivalent to implicit formation of consensus for the primal variable as well. That is, consensus is formed for each of the primal variable and the dual variables. It has also been theoretically found that the convergence speed is increased by imposing the restriction.

In the example of FIG. 3, the six kinds of dual variables $\lambda_{1|2}$, $\lambda_{2|1}$, $\lambda_{1|3}$, $\lambda_{3|1}$, $\lambda_{2|3}$, $\lambda_{3|2}$ form three pairs $\lambda_{1|2}=\lambda_{2|1}$, $\lambda_{1|3}=\lambda_{3|1}$, $\lambda_{2|3}=\lambda_{3|2}$. Formation of consensus is sought after while exchanging information on the dual variables and the primal variable between connected nodes. Physically, a dual variable corresponds to a difference between the primal variables at the time of each update.

As with Distributed ADMM, the cost function is limited to a closed proper convex function. As an instance, when a least square problem is to be solved, the following will be the cost.

$f_i(w_{i,b})=\frac{1}{2}\|s_{i,b}-x_i^T w_{i,b}\|_2$

Defining the dual problem as in the Distributed ADMM gives the following.

$$\max_{\lambda_{i|j,b}}\min_{w_{i,b}}\sum_{i\in \tilde{V}}f_i(w_{i,b})+\sum_{j\in \tilde{N}(i)}\lambda_{i|j,b}^T\left(\frac{1}{2}A_{i|j}w_{i,b}+\frac{1}{2}A_{j|i}w_{j,b}\right)=$$

$$\max_{\lambda_{i|j,b}}\min_{w_{i,b}}\sum_{i\in \tilde{V}}f_i(w_{i,b})+\sum_{j\in \tilde{N}(i)}\lambda_{i|j,b}^T A_{i|j}w_{i,b}=\max_{\lambda_b}\min_{w_b}f(w_b)+\lambda_b^T Aw_b$$

Definitions of variables are shown below. The following represents the variables by connecting V nodes.

$$f(w_b)=\frac{1}{2}\|s_b-X^T w_b\|_2,$$

$$s_b=[s_{1,b},\ldots,s_{V,b}]^T,$$

$$w_b=[w_{1,b}^T,\ldots,w_{V,b}^T]^T,$$

$$\lambda_b=[\lambda_{1|2,b}^T,\ldots,\lambda_{1|V,b}^T,\lambda_{2|1,b}^T,\ldots,\lambda_{2|V,b}^T,\ldots,\lambda_{V|1,b}^T,\ldots,\lambda_{V|V-1,b}^T]^T,$$

$$X=\begin{bmatrix} x_1 & & O \\ & \ddots & \\ O & & x_V \end{bmatrix},$$

$$A=\begin{bmatrix} A_{1|2} & & & & & O \\ \vdots & & & & & \\ A_{1|V} & & & & & \\ & A_{2|1} & & & & \\ & \vdots & & & & \\ & A_{2|V} & & & & \\ & & \ddots & & & \\ & & & A_{V|1} & & \\ & & & \vdots & & \\ O & & & A_{V|V-1} & & \end{bmatrix}$$

The formula will be the following when written assuming the edge configuration as shown in FIG. 3, in other words, under the restriction of $\lambda_{i|j}=\lambda_{j|i}$.

$$\sum_{i\in \tilde{V}}f_i(w_{i,b})+\sum_{j\in \tilde{N}(i)}\lambda_{i|j,b}^T\left(\frac{1}{2}A_{i|j}w_{i,b}+\frac{1}{2}A_{j|i}w_{j,b}\right)=$$

$$f_1(w_{1,b})+\lambda_{1|2,b}^T\left(\frac{1}{2}A_{1|2}w_{1,b}+\frac{1}{2}A_{2|1}w_{2,b}\right)+$$

$$\lambda_{1|3,b}^T\left(\frac{1}{2}A_{1|3}w_{1,b}+\frac{1}{2}A_{3|1}w_{3,b}\right)+f_2(w_{2,b})+\lambda_{2|1,b}^T\left(\frac{1}{2}A_{2|1}w_{2,b}+\frac{1}{2}A_{1|2}w_{1,b}\right)+$$

$$\lambda_{2|3,b}^T\left(\frac{1}{2}A_{2|3}w_{2,b}+\frac{1}{2}A_{3|2}w_{3,b}\right)+f_3(w_{3,b})+$$

$$\lambda_{3|1,b}^T\left(\frac{1}{2}A_{3|1}w_{3,b}+\frac{1}{2}A_{1|3}w_{1,b}\right)+\lambda_{3|2,b}^T\left(\frac{1}{2}A_{3|2}w_{3,b}+\frac{1}{2}A_{2|3}w_{2,b}\right)=$$

$$f_1(w_{1,b})+\left(\frac{1}{2}\lambda_{1|2,b}+\frac{1}{2}\lambda_{2|1,b}\right)^T A_{1|2}w_{1,b}+\left(\frac{1}{2}\lambda_{1|3,b}+\frac{1}{2}\lambda_{3|1,b}\right)^T A_{1|3}w_{1,b}+$$

$$f_2(w_{2,b})+\left(\frac{1}{2}\lambda_{2|1,b}+\frac{1}{2}\lambda_{1|2,b}\right)^T A_{2|1}w_{2,b}+\left(\frac{1}{2}\lambda_{2|3,b}+\frac{1}{2}\lambda_{3|2,b}\right)^T A_{2|3}w_{2,b}+$$

$$f_3(w_{3,b})+\left(\frac{1}{2}\lambda_{3|1,b}+\frac{1}{2}\lambda_{1|3,b}\right)^T A_{3|1}w_{3,b}+\left(\frac{1}{2}\lambda_{3|2,b}+\frac{1}{2}\lambda_{2|3,b}\right)^T A_{3|2}w_{3,b}=$$

$$f_1(w_{1,b})+\lambda_{1|2,b}^T A_{1|2}w_{1,b}+\lambda_{1|3,b}^T A_{1|3}w_{1,b}+f_2(w_{2,b})+$$

$$\lambda_{2|1,b}^T A_{2|1}w_{2,b}+\lambda_{2|3,b}^T A_{2|3}w_{2,b}+f_3(w_{3,b})+\lambda_{3|1,b}^T A_{3|1}w_{3,b}+$$

$$\lambda_{3|2,b}^T A_{3|2}w_{3,b}=\sum_{i\in \tilde{V}}f_i(w_{i,b})+\sum_{j\in \tilde{N}(i)}\lambda_{i|j,b}^T A_{i|j}w_{i,b}$$

The condition that consensus is formed for each of the primal variable and the dual variables can be written by the following.

$$A_{i|j}=\begin{cases} I & (i>j, j\in \tilde{N}(i)) \\ -I & (i<j, j\in \tilde{N}(i)), \\ O & (\text{otherwise}) \end{cases} \lambda_{i|j,b}=\lambda_{j|i,b}, (i\in \tilde{V}, j\in \tilde{N}(i), b\in \tilde{B})$$

A convex conjugate function f*, which is a Legendre transformation of f, is introduced as a technique for optimizing w. This is described in this way because it is known that when f is a closed proper convex function, f* will also be closed proper convex function (see Non-patent Literature 3, for instance).

$$f^*(-A^T\lambda_b) = \max_{w_b}(-\lambda_b^T A w_b - f(w_b))$$
$$= \max_{w_b}\left(-\lambda_b^T A w_b - \frac{1}{2}\|s_b - X^T w_b\|_2\right)$$

The right side of the first formula above is an extraction of the underlined portion of the formula below.

$$\max_{\lambda_b}\min_{w_b} f(w_b) + \lambda_b^T A w_b \Rightarrow \max_{\lambda_b}\left(-\max_{w_b}(-\lambda_b^T A w_b - f(w_b))\right)$$

The original problem can be written as follows. The formula transformation below makes use of the fact that it can be written as a minimization problem for f* since f* is a closed proper convex function.

$$\max_{\lambda_b}\min_{w_b} f(w_b) + \lambda_b^T A w_b \Rightarrow \max_{\lambda_b}\left\{-\max_{w_b}\{-f(w_b) - \lambda_b^T A w_b\}\right\} \Rightarrow$$
$$\max_{\lambda_b}\{-f^*(-A^T\lambda_b)\} \Rightarrow -\min_{\lambda_b}\{f^*(-A^T\lambda_b)\}$$

Adding the fact that it is an optimization problem under the condition of consensus of the dual variables, the problem to be solved is redefined by the following.

$$\min_{\lambda_b} f^*(-A^T\lambda_b) \text{ s.t. } \lambda_{i|j,b} = \lambda_{j|i,b} \ (i \in \tilde{V} \in b \in \tilde{B})$$

This problem is equivalent to solving the following.

$$\min_{\lambda_b} f^*(-A^T\lambda_b) + \delta_{(I-P)}(\lambda_b),$$
$$\delta_{(I-P)}(\lambda_b) = \begin{cases} 0 & (I-P)\lambda_b = 0 \\ +\infty & \text{otherwise} \end{cases}$$

The function δ is called an indicator function. An indicator function is also a sort of convex function. As shown below, a matrix P is an operation ("P" for permutation) to exchange the pair of dual variables which are present between the ith and jth nodes, and means that the indicator function outputs 0 (reducing the cost) when the dual variables match each other.

$$\begin{bmatrix} \lambda_{2|1,b} \\ \vdots \\ \lambda_{V|1,b} \\ \lambda_{1|2,b} \\ \vdots \\ \lambda_{V|2,b} \\ \vdots \\ \lambda_{1|V,b} \\ \vdots \\ \lambda_{V-1|V,b} \end{bmatrix} = P \begin{bmatrix} \lambda_{1|2,b} \\ \vdots \\ \lambda_{1|V,b} \\ \lambda_{2|1,b} \\ \vdots \\ \lambda_{2|V,b} \\ \vdots \\ \lambda_{V|1,b} \\ \vdots \\ \lambda_{V|V-1,b} \end{bmatrix}$$

The problem to be solved consists of two kinds of convex functions. One technique for solving such a problem is an operator splitting method (see Non-patent Literature 4, for instance). This technique solves even a problem for which the overall optimization is difficult to perform at once, by performing alternate optimization.

While there are various methods for operator splitting, a representative one is Peaceman-Rachford splitting (P-R splitting).

A PDMM-based consensus algorithm using the P-R splitting will be as follows.

Assuming that updates are to be made T times, processing from (1) to (3) below is performed for $t \in \{0, \ldots, T-1\}$.

(1) Update the Primal Variable for $i \in \tilde{V}, b \in \tilde{B}$, $$w_{i,b}^{(t+1)} = \mathrm{argmin}_{w_{i,b}}\left(F_i(w_{i,b}) + \sum \lambda_{i|j}^{(t)T} A_{i|j} w_{i,b} + \frac{\sigma_1}{2}\|A_{i|j} w_{i,b} + A_{j|i} w_{i,b}^{(t)}\|_2\right)$$

(2) Update the Dual Variable for $i \in \tilde{V}, j \in \tilde{N}(i), b \in \tilde{B}$, $$\lambda_{i|j,b}^{(t+1)} = \lambda_{i|j,b}^{(t)} + \sigma_1(A_{ij} w_{i,b}^{(t+1)} + A_{ji} w_{j,b}^{(t)})$$

(3) The primal variables are updated between the nodes. The update process may be non-continuous (they need not be updated every time) and may be performed independently for each edge (asynchronously).

for $i \in \tilde{V}, j \in \tilde{N}(i), b \in \tilde{B}$, $$\text{Node}_j \leftarrow \text{Node}_i(w_{i,b}^{(t+1)}, \lambda_{i|j,b}^{(t+1)})$$

An advantage of this PDMM-based consensus algorithm is that the convergence rate is high.

On the other hand, the disadvantages of this PDMM-based consensus algorithm include the following (1) to (4): (1) In some cases, it has been reported that convergence was not reached when there was a statistical property difference between the data sets accumulated at the individual nodes. However, there is no theoretical guarantee that convergence is reached also for heterogeneous data sets. (2) In principle, it cannot be applied to the optimization of non-convex functions (including DNNs and the like). (3) Confidentiality of information is somewhat low in terms of exchanging the primal variable. That is, the primal variable sometimes strongly reflects the nature of data, so the statistical properties of the data can be acquired by hacking the primal variable. (4) It requires high transmission rate. That is, the required transmission rate tends to be high because the primal variable and the dual variables are transmitted.

Next, consider the problem of minimizing cost which is handled in learning of a latent variable of a model to be subjected to machine learning. This minimization problem is formulated as below.

(Problem)

Assume that a cost function G is additively split into a function $G_1$ and a function $G_2$. Here, the functions $G_1, G_2$ are both assumed to be closed proper convex functions (hereinafter, a closed proper convex function is called just a convex function).

$$G(w) = G_1(w) + G_2(w)$$

Here, $w \in R^m$ (m is an integer equal to or greater than 1) holds, and $G_i: R^m \to R \cup \{\infty\}$ (i=1, 2) holds. That is, w is an element of an m-dimensional real vector space $R^m$, and $G_i$ is a function that takes the m-dimensional real vector w as input and outputs a (one-dimensional) real number.

Although the input to $G_i$ was described as being a vector, it may also be a matrix or a tensor. As a matrix and a tensor can be represented with a vector, the following description assumes that the input to $G_i$ is a vector.

The problem of optimizing a latent variable w so as to minimize the cost G is represented as below.

$$\min_{w}(G_1(w) + G_2(w)) \qquad (1\text{-}1)$$

An optimal solution w* (also called a stationary point of w) of this problem is obtained when the subdifferential of the cost G contains a 0 vector (zero vector).

$$0 \in \partial G_1(w) + \partial G_2(w) \qquad (1\text{-}2)$$

Here, $\partial G_i$ represents the subdifferential of $G_i$. The reason for using the symbol "∈" instead of the symbol "=", which represents an equal sign meaning that the input and the output are in one-to-one correspondence, is that when a convex function $G_i$ contains discontinuities, its subdifferential will be in multi-point output correspondence at the discontinuities.

Before describing a conventional method for determining the optimal solution w*, several specific problems associated with Formula (1-1) are introduced.

<<Specific Problem 1: Consensus Problem in Edge Computing>>

Consider a graph G(v,e) with V nodes connected in a given manner (where v is a set of nodes and e is a set of edges).

$$v = \{1, \ldots, V\}$$

$$N(i) = \{j \in v | (i,j) \in e\}$$

Here, N(i) represents a set of indices of nodes connected with the ith node.

FIG. 9 shows a situation in which V nodes (servers) are connected in accordance with an edge structure e (where V=5). The problem of optimizing the whole structure while exchanging latent variables and their auxiliary variable (for example, dual variables), rather than exchanging enormous data accumulated at each node between nodes, is the consensus problem in edge computing.

Cost represented by a convex function present at the ith node is expressed as below.

$$F_{1,i}(i \in v)$$

In this example, for facilitating the understanding of the problem, a square error for teaching data $s_i$ will be used as a specific example of cost $F_{1,i}$.

$$F_{1,i} = \frac{1}{2U(i)} \sum_{u \in u(i)} \|s_{i,u} - p_i^T v_{i,u}\|_2^2$$

Here, T represents transposition and $\|\cdot\|_p$ represents $L_p$ norm. Also, $u(i) = \{1, \ldots, U(i)\}$ holds.

This cost $F_{1,i}$ is the cost function for the problem of optimizing a latent variable $p_i$ ($p_i \in R^{p'}$) using U(i) data tuples $(v_{i,u}, s_{i,u})$ by taking a p'-dimensional vector $v_i \in R^{p'}$ as input data and so as to output teaching data $s_i$. The index shows that data and the number of pieces of data U(i) differ from node to node. In general, though data accumulated at each node is different, they may be the same. A tuple of input data and teaching data will be referred to as learning data. Also, m=p'V holds hereinafter.

Although in this example the problem is formulated using teaching data, it can also be formulated without using teaching data.

For parallel computing by multiple servers positioned at the same location, it can also be formulated as the same problem as the consensus problem mentioned above. For example, this can be the case when parallel calculations are performed using a multitude of computers to rapidly learn models for speech recognition, image recognition, or the like. In this case, the data set accumulated at each server will be basically the same.

In the consensus problem, a stationary point at which the cost is minimized will be searched for while applying restriction so that the value of the latent variable p will be the same among the nodes.

$$\min_{p_i} \sum_{i \in v} F_{1,i}(p_i) \qquad (2\text{-}1)$$

$$\text{s.t. } A_{i|j} p_i + A_{j|i} p_j = 0 \ \forall \ i \in v, \forall \ (i,j) \in e$$

(where e is a set of edges.)

Here, $p_i \in R^{p'}$ and $A_{i|j} \in R^{p' \times p'}$ hold. $A_{i|j}$ is a real number matrix of p'×p' representing consensus. This matrix $A_{i|j}$ can be any matrix, but when there is an intention to "carry out learning so that the value of the latent variable will be the same among the nodes", a simple matrix like the one below can be used, for example.

$$A_{i|j} = \begin{cases} I & (i > j, j \in N(i)) \\ -I & (j > i, j \in N(i)) \end{cases}$$

Here, I is an identity matrix.

In solving a cost minimization problem under a linear constraint like Formula (2-1), the method of Lagrange multiplier is often used. Using a dual variable $v_{i,j} \in R^{p'}$, a Lagrange function L is defined as below.

$$L = \sum_{i \in v} \left( F_{1,i}(p_i) + \sum_{j \in N(i)} \langle v_{i,j}, -A_{i|j} p_i - A_{j|i} p_j \rangle \right)$$

$$= \sum_{i \in v} \left( F_{1,i}(p_i) - \sum_{j \in N(i)} \langle v_{i,j}, A_{i|j} p_i \rangle \right)$$

Solving Formula (2-1) corresponds to solving the problem of Formula (2-2) below (a primal problem). However, this problem is often difficult to solve directly.

When $F_{1,i}$ is a closed proper convex function, strong duality holds, that is, integrity between Formula (2-2) and Formula (2-3) holds at an optimal point. Thus, in general, the problem of Formula (2-3) (a dual problem) is solved instead of solving Formula (2-2).

$$\min_{p_i} \max_{v_{i,j}} L \qquad (2\text{-}2)$$

$$\geq \max_{v_{i,j}} \min_{p_i} L \qquad (2\text{-}3)$$

-continued $$= \max_{v_{i,j}} \min_{p_i} \sum_{i \in v} \left( F_{1,i}(p_i) - \sum_{j \in N(i)} \langle v_{i,j}, A_{i|j} p_i \rangle \right)$$

$$= -\min_{v_{i,j}} \sum_{i \in v} F_{1,i}^* \left( \sum_{j \in N(i)} A_{i|j}^T v_{i,j} \right) \quad (2\text{-}4)$$

Here, $F_{1,i}^*$ represents a convex conjugate function of a convex function $F_{1,i}$, $$F_{1,i}^*\left( \sum_{j \in N(i)} A_{i|j}^T V_{i,j} \right) = \max_{p_i} \left( \sum_{j \in N(i)} \langle v_{i,j}, A_{i|j} p_i \rangle - F_{1,i}(p_i) \right)$$

When $F_{1,i}$ is a convex function, $F_{1,i}^*$ is also a convex function.

Formula (2-4) represents the problem of finding a dual variable $v_{i,j}$ that minimizes the convex function $F_{1,i}^*$. To solve Formula (2-1), Formula (2-4) should be solved; however, with the format of Formula (2-4), it is not possible to enable processing that updates the latent variable for each node asynchronously. Thus, lifting is performed so that the dual variable $v_{i,j}$ belongs to each node. Specifically, the dual variable $v_{i,j}$ is split into a dual variable $\lambda_{i|j} \in R^{p'}$ belonging to the ith node and a dual variable $\lambda_{j|i} \in R^{p'}$ belonging to the jth node, and a restriction to make these variables match each other is added.

$$\lambda_{i|j} = \lambda_{j|i}(i,j) \in e$$

(where e is a set of edges.)

FIGS. 10A and 10B show how the lifting of the dual variable can be performed. FIG. 10A represents that it is the variable $v_{i,j}$ that controls an error in the consensus between a node i and a node j. However, this requires updating while synchronizing the ith latent variable and jth latent variable. Accordingly, in order to enable the ith latent variable and the jth latent variable to be updated asynchronously as well, the undirected edge in FIG. 10A is rewritten into two directed edges as shown in FIG. 10B. As these two edges are generated from a single undirected edge, a restriction for matching is required, but the synchronization problem in updating of variables can be solved.

With the lifting of the dual variable, the problem of Formula (2-4) is rewritten to the following problem (a linear-constrained optimization problem).

$$\min_{\lambda_{i|j}} \sum_{i \in v} F_{1,i}^* \left( \sum_{j \in N(i)} A_{i|j}^T \lambda_{i|j} \right) \text{ s.t. } \lambda_{i|j} = \lambda_{j|i} \; \forall i \in v, \forall (i,j) \in e \quad (2\text{-}5)$$

By using a vector or a matrix to represent variables which have been separately written in V sets, Formula (2-5) is represented as shown below. Of course, the meaning of the formula remains unchanged, representing the same problem.

$$\min_{\lambda} F_1^*(A^T \lambda) \text{ s.t. } \lambda_{i|j} = \lambda_{j|i} \; \forall i \in v, \forall (i,j) \in e \quad (2\text{-}6)$$

Here, a convex conjugate function $F_1^*$ will be as the formula below.

$$F_1^*(A^T \lambda) = \max_p (\langle \lambda, Ap \rangle - F_1(p))$$

Here, $F_1: R^m \to R \cup \{\infty\}$ and $F_1^*: R^m \to R \cup \{\infty\}$ (m=p'V) hold.

Also, the variables that have been written separately for each set of V nodes (that is, $p_i$, $\lambda_{i|j}$, $A_{i|j}$) will be as shown below.

$$p = [p_1^T, \ldots, p_V^T]^T$$

$$\lambda = [\lambda_{1|2}^T, \ldots, \lambda_{1|V}^T, \lambda_{2|1}^T, \ldots, \lambda_{2|V}^T, \ldots, \lambda_{V|1}^T, \ldots, \lambda_{V|V-1}^T]^T$$

$$A = \begin{bmatrix} A_{1|2}^T, \ldots, A_{1|V}^T & & O \\ & A_{2|1}^T, \ldots, A_{2|V}^T & \\ & & \ddots \\ O & & A_{V|1}^T, \ldots, A_{V|V-1}^T \end{bmatrix}^T$$

Here, in describing the restriction that the dual variables after lifting match each other, an indicator function $F_2$ having an appropriate property in terms of matching of the variables is further used. Using the indicator function $F_2$, the problem of Formula (2-6) is reduced to the following problem.

$$\min_{\lambda} F_1^*(A^T \lambda) + F_2(\lambda) \quad (2\text{-}7)$$

Here, the indicator function $F_2$ is defined as follows.

$$F_2(\lambda) = \begin{cases} 0 & (I - P)\lambda = 0 \\ +\infty & (\text{otherwise}) \end{cases}$$

Here, P is a permutation matrix. The elements of the permutation matrix P are all 0 or 1, having the property of $P^2 = I$. Multiplying the vector $\lambda$ with the matrix P is equivalent to processing for interchanging dual variables $\lambda_{i|j}$, $\lambda_{j|i}$ ($\lambda_{j|i} \Leftrightarrow \lambda_{i|j}$) corresponding to the edges between the node i and the node j as:

$$[\lambda_{2|1}^T, \ldots, \lambda_{V|1}^T, \lambda_{1|2}^T, \ldots, \lambda_{V|2}^T, \ldots, \lambda_{1|V}^T, \ldots, \lambda_{V-1|V}^T]^T =$$
$$P[\lambda_{1|2}^T, \ldots, \lambda_{1|V}^T, \lambda_{2|1}^T, \ldots, \lambda_{2|V}^T, \ldots, \lambda_{V|1}^T, \ldots, \lambda_{V|V-1}^T]^T$$

It can be seen here that by applying replacement like the one below to Formula (2-7), the consensus problem in edge computing (that is, Formula (2-7)) is reduced to Formula (1-1).

$$w \leftarrow \lambda$$

$$G_1(w) = F_1^*(A^T w)$$

$$G_2(w) = F_2(w)$$

The following is another example.

<<Specific Problem 2: Generic Model Generation Problem in Recognition Task for Image/Speech/Language>>

As a method of generating a generic model in recognition task for image/speech/language or the like, learning of the latent variable p using a cost such as the one below is known to be effective (Reference Non-patent Literature 1). (Reference Non-patent Literature 1: V. Vapnik, "Principles of Risk Minimization for Learning Theory", Advances in Neural Information Processing Systems 4 (NIPS1991), pp. 831-838, 1992.)

$$\min_p \left( \frac{1}{n} \sum_{i=1}^n F_1(\langle a_i, p \rangle) + F_2(p) \right) \quad (2\text{-}8)$$

$$= \min_p \max_\lambda \left( \frac{1}{n} \langle \lambda, Ap \rangle - \frac{1}{n} \sum_{i=1}^n F_1^*(\lambda) + F_2(p) \right)$$

$$= -\min_\lambda \left( \frac{1}{n} \sum_{i=1}^n F_1^*(\lambda) + F_2^*\left(\frac{1}{n} A^T \lambda\right) \right) \quad (2\text{-}9)$$

Here, $p \in \mathbb{R}^m$ represents the latent variable, $\lambda \in \mathbb{R}^m$ represents the dual variable, and $A = [a_1, \ldots, a_n]^T \in \mathbb{R}^{n \times m}$ represents input data.

It can be seen that by applying replacement like the one below to Formula (2-8), the generic model generation problem in recognition task for image/speech/language (that is, Formula (2-8)) is reduced to Formula (1-1).

$$w \leftarrow p$$

$$G_1(w) = \frac{1}{n} \sum_{i=1}^n F_1(\langle a_i, w \rangle)$$

$$G_2(w) = F_2(w)$$

It can be also seen that Formula (2-9) is also reduced to Formula (1-1) by applying replacement like the one below.

$$w \leftarrow \lambda$$

$$G_1(w) = \frac{1}{n} \sum_{i=1}^n F_1^*(w)$$

$$G_2(w) = F_2^*\left(\frac{1}{n} A^T w\right)$$

For example, a square error or cross-entropy can be used for $F_1$, and $L_1$ norm can be used as a regularization term for $F_2$. Of course, $F_1$ and $F_2$ are not limited to them.

$$F_1(\langle a_i, p \rangle) = \frac{1}{2} \|\langle a_i, p \rangle - s\|_2^2$$

$$F_2(p) = \|p\|_1$$

Here, s is teaching data for desired output information. $a_i$ is a vector constituting the aforementioned input data $A = [a_1, \ldots, a_n]^T \in \mathbb{R}^{n \times m}$.

This can be also used for a task other than recognition task, for example, for removal of noise in image/speech.

<<Conventional Method for Determining Optimal Solution w*>>

In this section, a conventional solution is briefly described. As mentioned earlier, the problem to be solved is Formula (1-1). Also, the optimal solution w* of the problem represented by Formula (1-1) (the stationary point of w) is obtained when the subdifferential of the cost G contains a 0 vector (zero vector) as shown by Formula (1-2). When $G_i$ is a convex function, the subdifferential $\partial G_i$ of $G_i$ will be a monotone operator.

In order to solve Formula (1-2) to determine the optimal solution w*, the subdifferential is converted to a continuous linear mapping. This method of conversion is called monotone operator splitting (Non-patent Literature 4). While there are various methods of monotone operator splitting, two kinds of monotone operator splitting are shown herein: Peaceman-Rachford (P-R) type and Douglus-Rachford (D-R) type, which can ensure the nonexpansiveness of the cost associated with recursive updating of variables (that is, a property that the cost decreases along with updating of the variables).

Although a specific derivation procedure is omitted, transforming Formula (1-2) provides P-R type monotone operator splitting and D-R type monotone operator splitting. In the transformation, a Resolvent operator $\Omega_n$ and a Cayley operator $\omega_n$ are used (n=1, 2).

$$\Omega_n = (I + \kappa \partial G_n)^{-1} (\kappa > 0)$$

$$\Psi_n = 2\Omega_n - I$$

Here, I represents an identity operator, and $^{-1}$ represents an inverse operator.

An auxiliary variable z ($z \in \mathbb{R}^m$) for w ($w \in \mathbb{R}^m$) is also introduced. Their relationship is connected by the Resolvent operator as below.

$$w \in \Omega_1(z)$$

The P-R type monotone operator splitting and the D-R type monotone operator splitting are respectively represented by Formulas (3-1) and (3-2).

$$z \in \Psi_2 \Psi_1(z) \quad (3\text{-}1)$$

$$z \in \alpha \Psi_2 \Psi_1(z) + (1-\alpha) z (\alpha \in (0,1)) \quad (3\text{-}2)$$

From Formulas (3-1) and (3-2), it can be seen that introduction of an averaging operator into the P-R type monotone operator splitting provides the D-R type monotone operator splitting.

In the following, taking the consensus problem in edge computing as an example, a variable updating algorithm which is a recursive variable update rule derived from Formulas (3-1) and (3-2) is described. This consensus problem is represented by Formula (2-7) but with $\lambda$ replaced by w, as shown below.

$$\min_w F_1^*(A^T w) + F_2(w) \quad (2\text{-}7')$$

$$F_2(w) = \begin{cases} 0 & (I-P)w = 0 \\ +\infty & (\text{otherwise}) \end{cases}$$

$$G_1(w) = F_1^*(A^T w)$$

$$G_2(w) = F_2(w)$$

Then, a Resolvent operator $\Omega_2$ and a Cayley operator $\Psi_2$ will be as follows.

$$\Omega_2 = (I + \kappa \partial F_2)^{-1} (\kappa > 0)$$

$$\Psi_2 = 2\Omega_2 - I = P$$

If the indicator function $F_2$ is used, that the Cayley operator $\Psi_2$ corresponds to the permutation matrix P is shown in Non-patent Literature 2.

When represented as recursive variable update rules, Formula (3-1) and Formula (3-2) will be the following. Formula (3-5) corresponds to the P-R type monotone operator splitting of Formula (3-1), and Formula (3-6) corresponds to the D-R type monotone operator splitting of Formula (3-2).

$$w^{t+1} = \Omega_1(z^t) = (I + \kappa \partial G_1)^{-1}(z^t) \tag{3-3}$$

$$\lambda^{t+1} = \Psi_1(z^t) = (2\Omega_1 - I)(z^t) = 2w^{t+1} - z^t \tag{3-4}$$

$$z^{t+1} = \begin{cases} \Psi_2(\lambda^{t+1}) = P\lambda^{t+1} & (3\text{-}5) \\ \alpha\Psi_2(\lambda^{t+1}) + (1-\alpha)z^t = \alpha P\lambda^{t+1} + (1-\alpha)z^t & (3\text{-}6) \end{cases}$$

Here, the variables w, λ, z (w∈R$^m$, λ∈R$^m$, z∈R$^m$, m=p'V) are variables that are obtained through the Resolvent operator or the Cayley operator, and they are all dual variables. t is a variable representing the number of updates performed.

As can be seen from the definition of the function $F_1^*$, Formula (3-3) contains updating of the latent variable p and the dual variable w. As a way of updating these variables, a method described in Non-patent Literature 2 is shown. Formula (3-3) is transformed in the following manner.

$$(I + \kappa \partial G_1)(w) \in z \tag{3-7}$$

$$0 \in \kappa \partial G_1(w) + w - z$$

$$w^{t+1} = \operatorname*{argmin}_w \left( G_1(w) + \frac{1}{2\kappa} \|w - z^t\|_2^2 \right)$$

$$= \operatorname*{argmin}_w \left( F_1^*(A^T w) + \frac{1}{2\kappa} \|w - z^t\|_2^2 \right)$$

In deriving the third formula from the second formula in the transformation above, integral form was used.

Since $F_1^*$ contains optimization calculation for the latent variable p, there are two ways to solve Formula (3-7). Here, a method that optimizes the latent variable p first and fixes p at its optimal value before optimizing the dual variable w will be derived. For sequential optimization calculation for the latent variable p (that is, for calculating $p^{t+1}$ from $p^t$), a penalty term related to p is added to the cost contained in $F_1^*$ and calculation is performed.

$$p^{t+1} = \operatorname*{argmin}_p \left( F_1(p) - \langle z^t, Ap \rangle + \frac{1}{2\gamma} \|Ap\|_2^2 \right) \tag{3-8}$$

Here, the third term in argmin on the right side of Formula (3-8) is the penalty term, with γ>0. Use of the penalty term enables sequential optimization calculation for the latent variable p.

Then, with the latent variable p fixed, optimization of the dual variable w contained in Formula (3-7) is performed.

$$w^{t+1} = \operatorname*{argmin}_w \left( F_1^*(A^T w) + \frac{1}{2\kappa} \|w - z^t\|_2^2 \right) \tag{3-9}$$

$$= \operatorname*{argmin}_w \left( \langle w, Ap^{t+1} \rangle - F_1(p^{t+1}) + \frac{1}{2\kappa} \|w - z^t\|_2^2 \right)$$

$$= z^t - \kappa Ap^{t+1}$$

Formula (3-4) can be calculated in the following manner.

$$\lambda t+1 = 2w^{t+1} - z^t = z^t - 2\kappa Ap^{t+1} \tag{3-10}$$

As seen from Formula (3-10), λ can now be calculated without using w.

From the foregoing, the recursive variable update rule (Formula (3-3) to Formula (3-6)) will be as follows.

$$p^{t+1} = \operatorname*{argmin}_p \left( F_1(p) - \langle z^t, Ap \rangle + \frac{1}{2\gamma} \|Ap\|_2^2 \right) \tag{3-8}$$

$$\lambda^{t+1} = z^t - 2\kappa Ap^{t+1} \tag{3-10}$$

$$z^{t+1} = \begin{cases} P\lambda^{t+1} & (3\text{-}5) \\ \alpha P\lambda^{t+1} + (1-\alpha)z^t & (3\text{-}6) \end{cases}$$

Enabling this update rule to update the variables on a per-node basis provides the algorithm shown in FIG. 11. Note that Transmit$_{j \to i}\{\cdot\}$ represents an operation to transmit the variables from the node j to the node i.

PRIOR ART LITERATURE

Non-Patent Literature

Non-patent Literature 1: S. Boyd, N. Parikh, E. Chu, B. Peleato and J. Eckstein, "Distributed Optimization and Statistical Learning via the Alternating Direction Method of Multipliers", Foundations and Trends in Machine Learning, 3(1):1-122, 2011.

Non-patent Literature 2: T. Sherson, R. Heusdens, and W. B. Kleijn, "Derivation and Analysis of the Primal-Dual Method of Multipliers Based on Monotone Operator Theory", arXiv:1706.02654

Non-patent Literature 3: Takafumi Kanamori, Taiji Suzuki, Ichiro Takeuchi, and Issei Sato, "Continuous Optimization for Machine Learning", Kodansha Ltd., 2016.

Non-patent Literature 4: E. K. Ryu and S. Boyd, "Primer on Monotone Operator Methods", Appl. Comput. Math., 15(1):3-43, January 2016.

SUMMARY OF THE INVENTION

Problems to be Solved by the Invention

A first challenge is described first. The techniques of Non-patent Literatures 1 and 2 mentioned above do not provide very high confidentiality of information because the primal variables are sent and received between nodes. This is the first challenge.

Next, a second challenge is described. In the techniques of Non-patent Literatures 1 and 2 mentioned above, machine learning cannot be performed when the cost function is a non-convex function. This is the second challenge.

Next, a third challenge is described. The conventional variable update rule is generated based on monotone operator splitting with the Resolvent operator or the Cayley operator. Such a conventional variable update rule has the problem of taking time for convergence to the optimal solution in some cases. That is, it has the problem of taking time to learn latent variables. This is the third challenge.

Therefore, an object of the present invention is to provide machine learning techniques which allow machine learning to be performed even when the cost function is not a convex function.

Means to Solve the Problems

An aspect of the present invention includes a plurality of node portions which learn mapping that uses one common primal variable by machine learning based on their respective input data while sending and receiving information to and from each other. The machine learning is performed so as to minimize, instead of a cost function of a non-convex function originally corresponding to the machine learning, a proxy convex function serving as an upper bound on the cost function. The proxy convex function is represented by a formula of a first-order gradient of the cost function with respect to the primal variable or by a formula of a first-order gradient and a formula of a second-order gradient of the cost function with respect to the primal variable.

Effects of the Invention

The present invention enables machine learning to be performed even when the cost function is not a convex function by using a proxy convex function serving as an upper bound on the cost function, instead of the cost function.

BRIEF DESCRIPTION OF THE DRAWINGS

FIG. 11 shows a conventional variable updating algorithm related to consensus problem in edge computing.

FIG. 12 shows a variable updating algorithm of the present application related to consensus problem in edge computing.

FIG. 13 shows a variable updating algorithm of the present application related to consensus problem in edge computing.

DETAILED DESCRIPTION OF THE EMBODIMENTS

Figure 1:
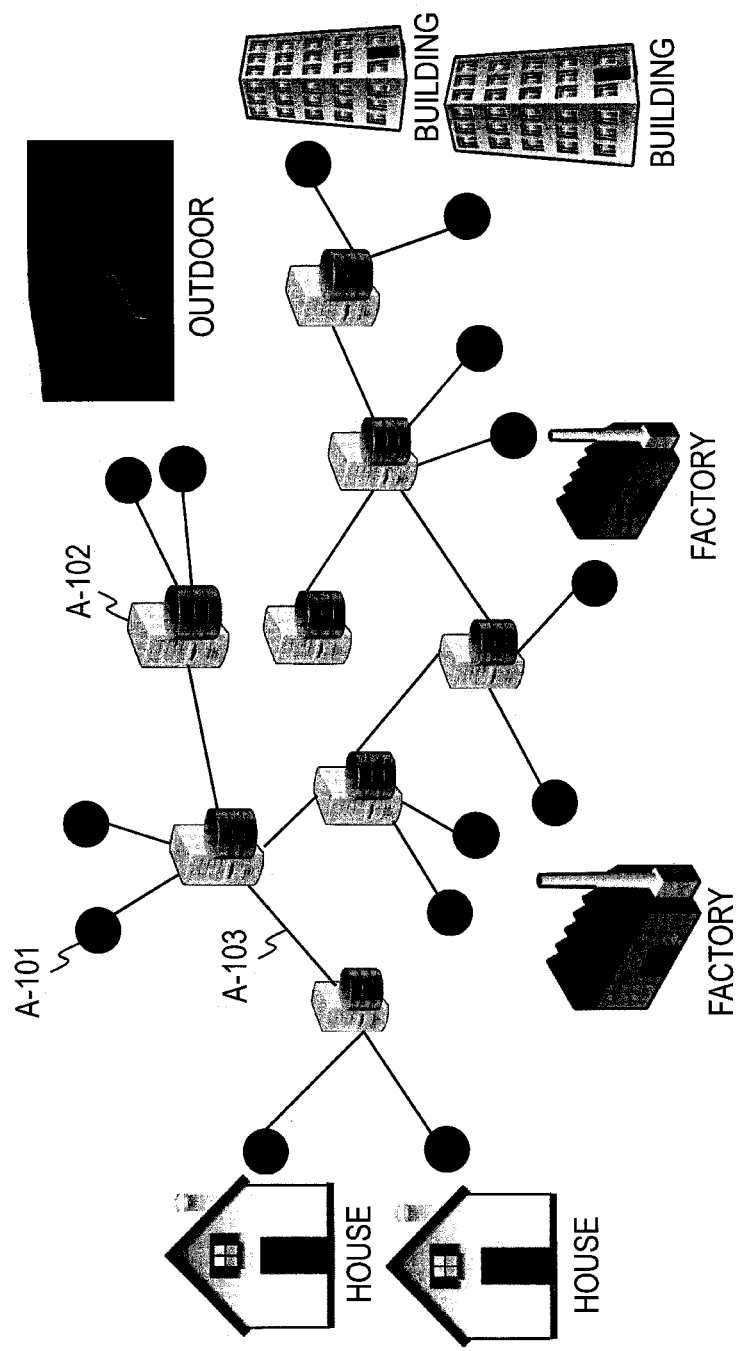
FIG. 1 is a diagram for describing a conventional technique.
Figure 2:
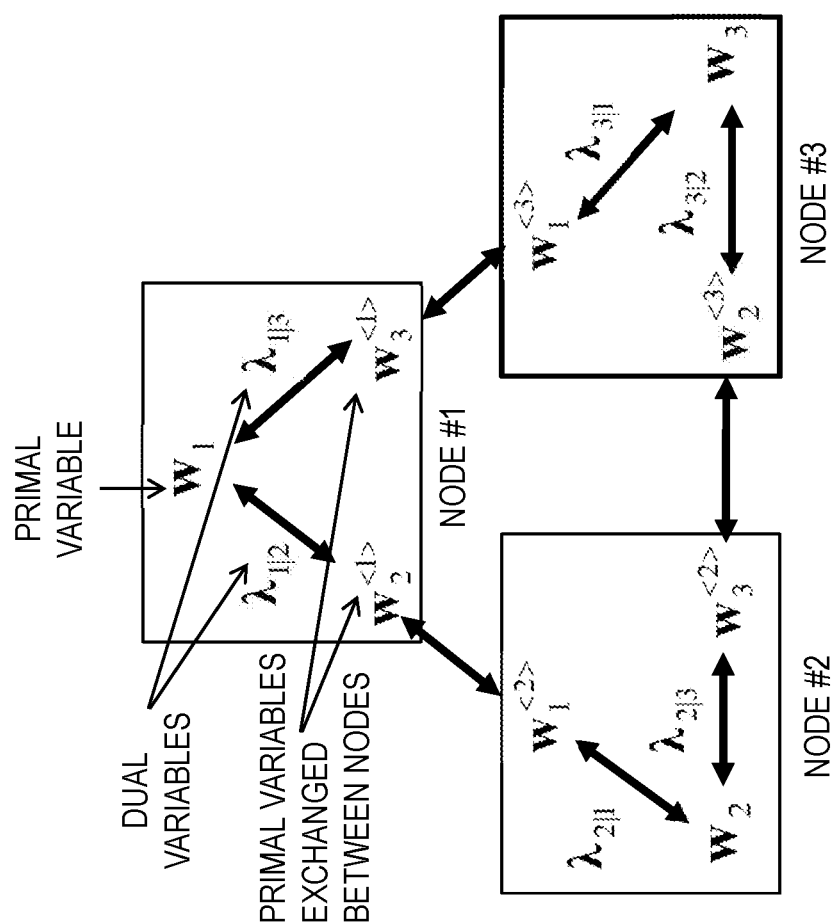
FIG. 2 is a diagram for describing a conventional technique.
Figure 3:
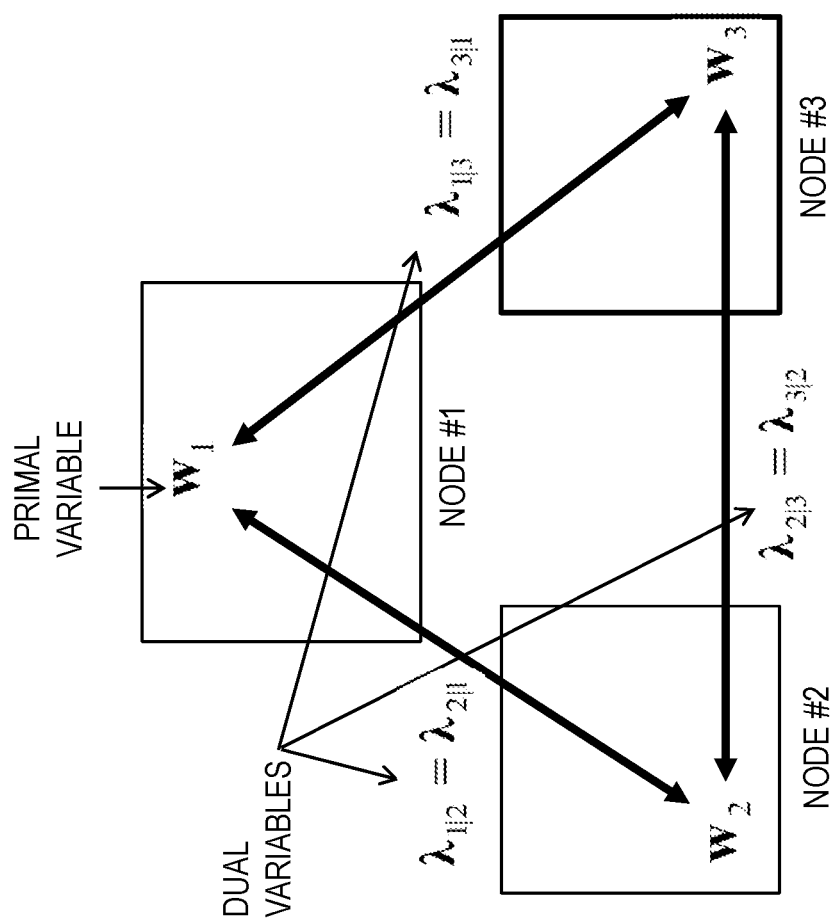
FIG. 3 is a diagram for describing a conventional technique.

A first embodiment as an embodiment of this invention is now described with reference to drawings.

Technical Background

A consensus algorithm with enhanced confidentiality is described below. This consensus algorithm is a transformation of the conventional PDMM.

First, definitions of the symbols to be used in the following description are described.

V is a predetermined positive integer equal to or greater than 2, with ~V={1, . . . , V}.

B is a predetermined positive integer, with b=1, . . . , B and ~B={1, . . . , B}.

A set of node portions connected with a node portion i is represented as ~N(i).

The bth vector constituting a dual variable $\lambda_{i|j}$ at the node portion i with respect to a node portion j is represented as $\lambda_{i|j,b}$, and the dual variable $\lambda_{i|j,b}$ after the t+1th update is represented as $\lambda_{i|j,b}^{(t+1)}$.

A cost function corresponding to the node portion i used in machine learning is represented as $f_i$.

A dual auxiliary variable $z_{i|j}$ is introduced as an auxiliary variable for the dual variable $\lambda_{i|j}$ where the bth vector constituting the dual auxiliary variable $z_{i|j}$ is represented as $z_{i|j,b}$, and the dual auxiliary variable $z_{i|j,b}$ after the t+1th update is represented as $z_{i|j,b}^{(t+1)}$. The basic properties of $z_{i|j}$ are the same as those of $\lambda_{i|j}$.

A dual auxiliary variable $y_{i|j}$ is introduced as an auxiliary variable for the dual variable $\lambda_{i|j}$, where the bth vector constituting the dual auxiliary variable $y_{i|j}$ is represented as $y_{i|j,b}$, and the dual auxiliary variable $y_{i|j,b}$ after the t+1th update is represented as $y_{i|j,b}^{(t+1)}$. The basic properties of $y_{i|j}$ are the same as those of $\lambda_{i|j}$.

The bth element of a primal variable $w_i$ of the node portion i is represented as $w_{i,b}$ and the bth element of the optimal solution of $w_i$ is represented as $w_{i,b}^*$.

$A_{i|j}$ is defined by the formula below.

$$A_{i|j} = \begin{cases} I & (i > j, \, j \in \tilde{N}(j)) \\ -I & (i < j, \, j \in \tilde{N}(j)) \\ O & (\text{otherwise}) \end{cases}$$

I is an identity matrix, O is a zero matrix, and $\sigma_1$ is a predetermined positive number. T is the total number of updates and is a positive integer, but is not a constant when online learning is assumed.

As the problem to be solved is the same as that of the conventional PDMM, it is presented again.

$$\min_{\lambda_b} f^*(-A^T \lambda_b) + \delta_{(I-P)}(\lambda_b),$$

$$\delta_{(I-P)}(\lambda_b) = \begin{cases} 0 & (I-P)\lambda_b = 0 \\ +\infty & \text{otherwise} \end{cases}$$

It is also similar to the conventional PDMM in that this problem is solved by an operator splitting method. In the following, an example of using P-R splitting, one of the operator splitting methods, is described. For the auxiliary variables for the dual variable $\lambda_b$, two kinds of dual auxiliary variables $y_b$, $z_b$ are used hereinafter.

A step of optimizing the variables (the primal variable, the dual variable, and the dual auxiliary variables) based on P-R splitting can be written by the following.

$$z_b \in C_2 C_1 z_b$$

In the above formula, the symbol "∈" does not represent the elements of a set but means substituting the operation result of the right side into the left side. Although such a manipulation is usually represented with "=", an irreversible conversion could be performed when a discontinuous closed proper convex function is used as the cost function (an operation which is not a one-to-one correspondence can be possibly performed). As "=" is generally a symbol used for a conversion (function) with one-to-one correspondence, the symbol of "e" will be used herein in order to distinguish from it.

Here, $C_n$ (n=1, 2) is a Cayley operator.

$$C_n \in 2R_n - I (n=1,2)$$

$R_n$ (n=1, 2) is a Resolvent operator.

$$R_n \in (I + \sigma_n T_n)^{-1} (n=1,2) \sigma_n > 0$$

$T_n$ (n=1, 2) is a monotone operator. Since f* and $\delta_{(I-P)}$ constituting the problem are both proper convex closed functions, the partial differential with respect to its dual variable will be a monotone operator.

$$T_1 = -A \partial f^*(-A^T) T_2 = \partial \delta_{(I-P)}$$

Although theoretical background is not detailed herein, P-R splitting is an optimization scheme that guarantees fast convergence. A decomposed representation of optimization $z_b \in C_2 C_1 z_b$ by P-R splitting gives the following.

$$\lambda_b \in R_1 z_b = (I + \sigma_1 T_1)^{-1} z_b,$$

$$y_b \in C_1 z_b = (2R_1 - I) z_b = 2\lambda_b - z_b,$$

$$z_b \in C_2 y_b = P y_b$$

As to the correspondence of the Cayley operator $C_2$ to the permutation matrix P in the third formula, its proof is published in Non-patent Literature 2. An update of the dual variable with the Resolvent operator in the topmost formula can be transformed as shown below.

$$z_b \in (I + \sigma_1 T_1) \lambda_b,$$

$$0 \in \lambda_b - z_b + \sigma_1 T_1 \lambda_b,$$

$$0 \in \partial \left( \frac{1}{2\sigma_1} \|\lambda_b - z_b\|_2 + f^*(-A^T \lambda_b) \right)$$

It is desirable to derive the f* contained in this formula as a closed convex proper function with respect to the dual variables, because it leads to decrease in the amount of information exchanged between nodes. The process is described below. First, definition of f* is presented again.

$$f^*(-A^T \lambda_b) = \max_{w_b} (-\lambda_b^T A w_b - f(w_b))$$

As one instance, f* will be the following when the least square problem is handled as cost.

$$f^*(-A^T \lambda_b) = \max_{w_b} \left( -\lambda_b^T A w_b - \frac{1}{2} \|s_b - X^T w_b\|_2 \right)$$

In the following, for facilitating description, an update formula when the least square problem is handled as cost is derived.

Differentiating the inside of the parentheses, the optimal solution of w is obtained by the following. Thus, the optimal solution w* of w when the least square problem is handled as cost is represented by a formula of the dual variables.

$$w_b^* = [XX^T]^{-1}(X s_b - A^T \lambda_b)$$

Substituting this w* into f* enables f* to be represented as a function of $\lambda$. Here, $Q = XX^T$ holds.

$$f^*(-A^T \lambda_b) = -\lambda_b^T A w_b^* - f(w_b^*)$$
$$= -\lambda_b^T A [XX^T]^{-1} (X s_b - A^T \lambda_b) -$$
$$\frac{1}{2} \|s_b - X^T [XX^T]^{-1} (X s_b - A^T \lambda_b)\|_2$$
$$= -\lambda_b^T A Q^{-1} (X s_b - A^T \lambda_b) - \frac{1}{2} \|s_b - X^T Q^{-1} (X s_b - A^T \lambda_b)\|_2$$

Here, $Q = XX^T$ holds.

The update formula for the dual variables contained in P-R splitting is presented again.

$$\lambda_b^* = \underset{\lambda_b}{\mathrm{argmin}} \left( \frac{1}{2\sigma_1} \|\lambda_b - z_b\|_2 + f^*(-A^T \lambda_b) \right),$$

When the least square problem is handled as cost, differentiating the inside of the parentheses with respect to the dual variables gives the following.

$$\frac{1}{\sigma_1} (\lambda_b - z_b) - A Q^{-1} (X s_b - A^T \lambda_b) +$$
$$A Q^{-1} A^T \lambda_b - A Q^{-1} X (s_b - X^T Q^{-1} (X s_b - A^T \lambda_b)) =$$
$$\frac{1}{\sigma_1} (\lambda_b - z_b) - A Q^{-1} (X s_b - A^T \lambda_b) + A Q^{-1} A^T \lambda_b - A Q^{-1} X s_b +$$
$$A Q^{-1} X s_b - A Q^{-1} A^T \lambda_b = \frac{1}{\sigma_1} (\lambda_b - z_b) - A Q^{-1} (X s_b - A^T \lambda_b) = 0$$

Thus, optimization for the dual variables when handling the least square problem as cost is obtained by the following.

$$\lambda_b^* = \left( \frac{1}{\sigma_1} I + A Q^{-1} A^T \right)^{-1} \left( A Q^{-1} X s_b + \frac{1}{\sigma_1} z_b \right)$$

This idea means that the primal variable w is also implicitly optimized in the course of optimization of the dual variable $\lambda$. Then, by just exchanging the dual auxiliary variable y between nodes, a distributed optimization process based on P-R splitting can be achieved. At this point, the algorithm can be rewritten as follows. Here, it is described in general form.

Assuming that updates are to be made T times, processing from (1) to (5) below is performed for t∈{0, . . . , T−1}. Processing for (2) updating the primal variable does not have to be performed. This is because w*, or the optimal solution of w, is represented by the formula of λ and hence does not require an update of w in the process of optimizing λ. (When λ has been optimized, it means that w has also been implicitly optimized.)

(1) Update the dual variables (here, the cost is described in general form without being limited to a least square problem).

for $i \in \tilde{V}, j \in \tilde{N}(i), b \in \tilde{B}$, $$\lambda_{i|j,b}^{(t+1)} = \arg\min_{\lambda_{i|j,b}} \left( \frac{1}{2\sigma_1} \|\lambda_{i|j,b} - z_{i|j,b}\|_2 - \sum_{j \in \tilde{N}(i)} \lambda_{i|j,b}^T A_{i|j} w_{i,b}^* - f_i(w_{i,b}^*) \right),$$

(2) Update the primal variable (here, the cost is described in general form without being limited to a least square problem).

for $i \in \tilde{V}, b \in \tilde{B}$, $$w_{i,b}^{(t+1)} = \arg\max_{w_{i,b}} \left( -\sum_{j \in \tilde{N}(i)} \lambda_{i|j,b}^{(t+1)T} A_{i|j} w_{i,b} - f_i(w_{i,b}) \right)$$

(3) Update the dual auxiliary variable for $i \in \tilde{V}, j \in \tilde{N}(i), b \in \tilde{B}$, $$y_{i|j,b}^{(t+1)} = 2\lambda_{i|j,b}^{(t+1)} - z_{i|j,b}^{(t+1)},$$

(4) Although it need not be performed every time and it can be done independently for each edge (asynchronously), the dual auxiliary variable is updated between nodes. Here, with "·" being arbitrary information, Node$_j$←Node$_i$(·) means that the ith node portion i sends information "·" to the node portion j.

for $i \in \tilde{V}, j \in \tilde{N}(i), b \in \tilde{B}$,

Node$_j$←Node$_i(y_{i|j,b}^{(t+1)})$ (5) Update the dual auxiliary variable using the exchanged information for $i \in \tilde{V}, j \in \tilde{N}(i), b \in \tilde{B}$, $$z_{i|j,b}^{(t+1)} = y_{j|i,b}^{(t+1)}$$

For the last step (5), replacement with the operation below provides Douglas Rachford (D-R) splitting with which high stability is expected in the convergence process at the cost of lower convergence. For β, ½ is typically used.

$$z_{i|j,b}^{(t+1)} = \beta y_{j|i,b}^{(t+1)} + (1-\beta) z_{i|j,b}^{(t)} (0 \le \beta \le 1)$$

For the above-described updates of the primal variable and the dual variables, a cost function of general form is used. When the cost function below is used, the consensus algorithm will be as follows.

$$f_i(w_{i,b}) = \frac{1}{2} \|s_{i,b} - x_i^T w_{i,b}\|_2$$

Assuming that updates are to be made T times, processing from (1) to (5) below is performed for t∈{0, . . . , T−1}. Note that processing for (2) updating the primal variable does not have to be performed. This is because w*, or the optimal solution of w, is represented by the formula of λ and hence does not require an update of w in the process of optimizing λ. (When λ has been optimized, it means that w has also been implicitly optimized.)

(1) Update the dual variables for $i \in \tilde{V}, j \in \tilde{N}(i), b \in \tilde{B}$, $$\lambda_{i|j,b}^{(t+1)} = \left( \frac{1}{\sigma_1} I + A_{i|j} Q_i^{-1} A_{i|j}^T \right)^{-1} \left( A_{i|j} Q_i^{-1} x_i s_{i,b} + \frac{1}{\sigma_1} z_{i|j,b}^{(t)} \right)$$

(2) Update the primal variable for $i \in \tilde{V}, b \in \tilde{B}$, $$w_{i,b}^{(t+1)} = Q_i^{-1} \left( x_i s_{i,b} - \sum_{j \in \tilde{N}(i)} A_{i|j}^T \lambda_{i|j,b}^{(t+1)} \right)$$

(3) Update the dual auxiliary variable for $i \in \tilde{V}, j \in \tilde{N}(i), b \in \tilde{B}$, $$y_{i|j,b}^{(t+1)} = 2\lambda_{i|j,b}^{(t+1)} - z_{i|j,b}^{(t+1)},$$

(4) Although it need not be performed every time and it can be done independently for each edge (asynchronously), the dual auxiliary variable is updated between nodes.

for $i \in \tilde{V}, j \in \tilde{N}(i), b \in \tilde{B}$,

Node$_j$←Node$_i(y_{i|j,b}^{(t+1)})$ (5) Update the dual auxiliary variable using the exchanged information for $i \in \tilde{V}, j \in \tilde{N}(i), b \in \tilde{B}$, $$z_{i|j,b}^{(t+1)} y_{j|i,b}^{(t+1)}$$

For the last step (5), replacement with the operation below provides Douglas Rachford (D-R) splitting with which high stability is expected in the convergence process at the cost of lower convergence. For β, ½ is typically used.

$$z_{i|j,b}^{(t+1)} = \beta y_{j|i,b}^{(t+1)} + (1-\beta) z_{i|j,b}^{(t)} (0 \le \beta \le 1)$$

While the dual auxiliary variable y is exchanged between nodes, the properties of the variable can be said to be equivalent to those of the dual variable λ. The dual variable is computed as follows.

$$\lambda_b^* = \arg\min_{\lambda_b} \left( \frac{1}{2\sigma_1} \|\lambda_b - z_b\|_2 + f^*(-A^T \lambda_b) \right),$$

$$f^*(-A^T \lambda_b) = \max_{w_b} \left( -\lambda_b^T A w_b - f(w_b) \right)$$

While the primal variable w often strongly reflects the statistical properties of data, the statistical properties of the dual variables depend on the corresponding data after Legendre transformation. Since Legendre transformation requires knowledge on the structure of the function in order to be able to return the dual variables to the primal variable, transmitting dual variables and their dual auxiliary variables between nodes can be said to be data communication of high confidentiality.

First Embodiment

Figure 5:
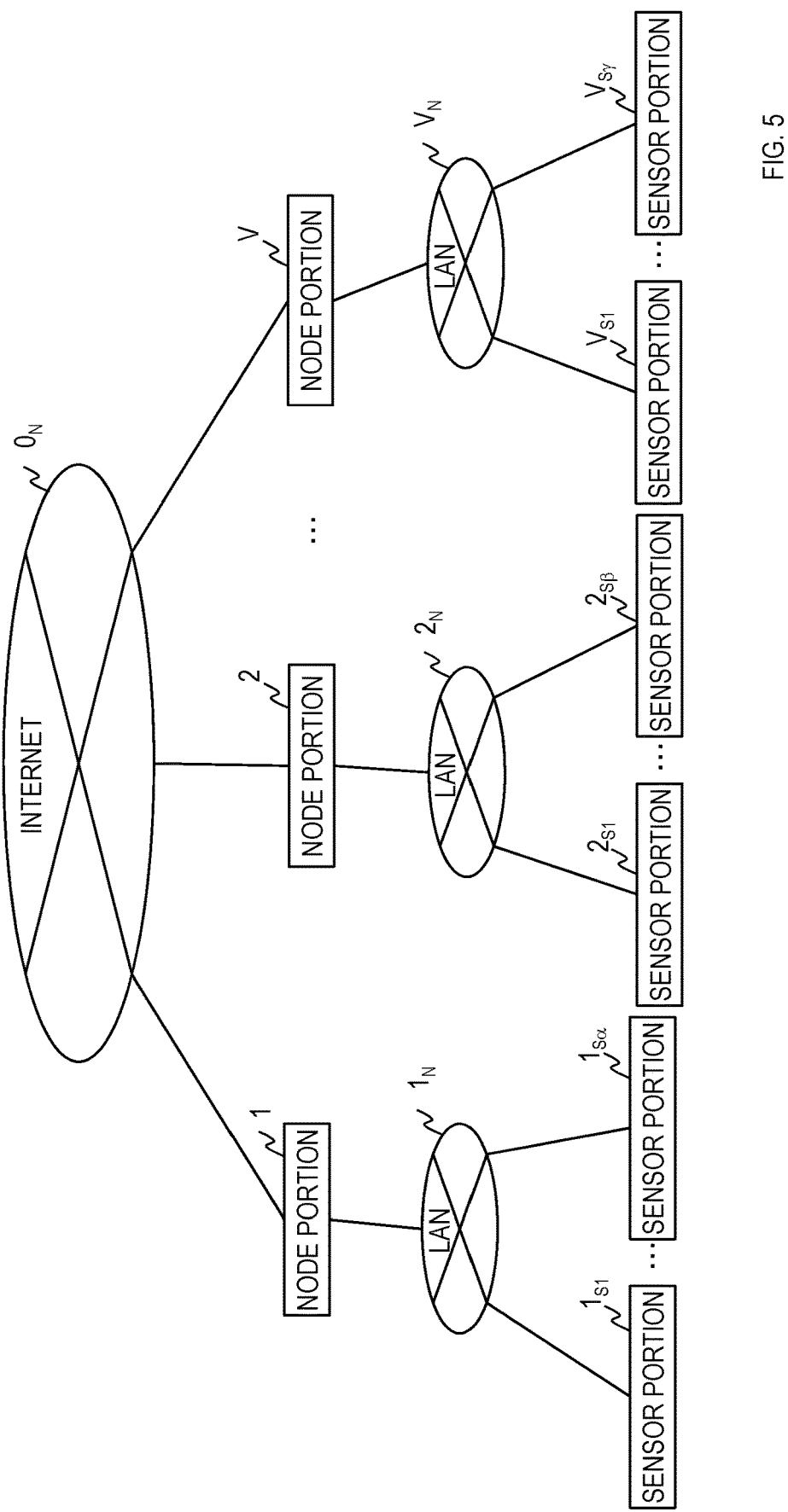
FIG. 5 is a block diagram for describing an example of a machine learning system.
Figure 6:
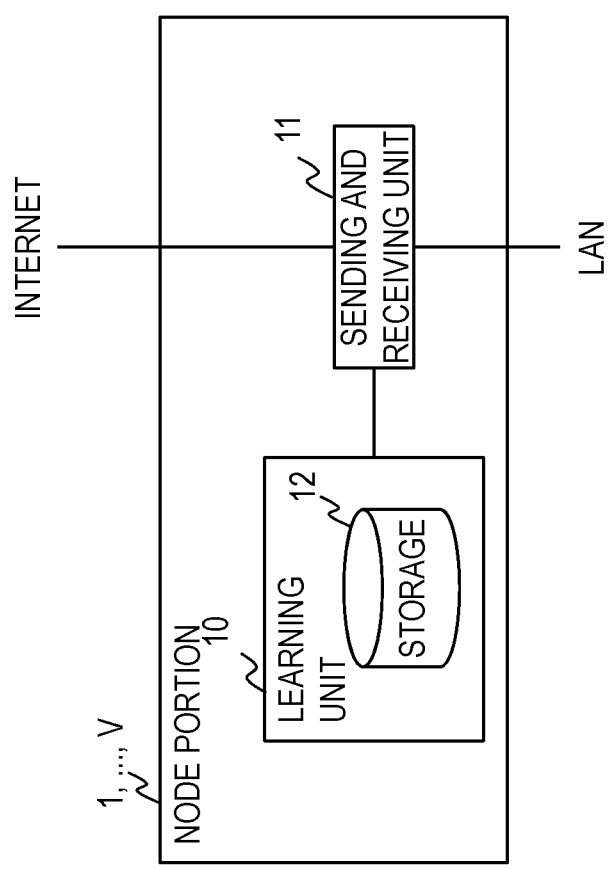
FIG. 6 is a block diagram for describing an example of a node portion.

As shown in FIG. 5, the machine learning system includes multiple node portions 1, . . . , V, multiple sensor portions $1_{S1}, \ldots, 1_{S\alpha}, 2_{S1}, \ldots, 2_{S\beta}, V_{S1}, \ldots, V_{S\gamma}$, the internet $0_N$ and LANs $1_N, \ldots, V_N$, for example. Each of the multiple node portions $1, \ldots, V$ is an information processing device such as a server or a PC. Each of the node portions $1, \ldots, V$ has a learning unit 10 and a sending and receiving unit 11, with a storage 12 provided in the learning unit 10, as shown in FIG. 6. It is assumed that data necessary for the processing and calculations described below is stored in the storage 12.

The sensor portions $1_{S1}, \ldots, 1_{S\alpha}, 2_{S1}, \ldots, 2_{S\beta}, V_{S1}, \ldots, V_{S\gamma}$ are a multitude of sensors (for example, microphones, cameras, and thermometers) which are placed in a distributed manner across various environments (for example, houses, factories, outdoors, and buildings). In the example of FIG. 5, the sensor portions $1_{S1}, \ldots, 1_{S\alpha}$ are sensors corresponding to the node portion 1. That is, the sensor portions $1_{S1}, \ldots, 1_{S\alpha}$ are sensors for acquiring data to be used in machine learning at the learning unit 10 of the node portion 1, each of the sensor portions $1_{S1}, \ldots, 1_{S\gamma}$ being connected with the node portion 1 by the LAN $1_N$. The same applies to the other sensor portions. Data acquired through those sensor portions $1_{S1}, \ldots, 1_{S\alpha}, 2_{S1}, \ldots, 2_{S\beta}, V_{S1}, \ldots, V_{S\gamma}$ are accumulated in the multiple node portions $1, \ldots, V$ (for example, servers and PCs). Note that data is not limited to those acquired from the sensor portions $1_{S1}, \ldots, 1_{S\alpha}, 2_{S1}, \ldots, 2_{S\beta}, V_{S1}, \ldots, V_{S\gamma}$ but may be character data and the like acquired from input devices, Web, or the like. Also, while the sensor portions $1_{S1}, \ldots, 1_{S\alpha}, 2_{S1}, \ldots, 2_{S\beta}, V_{S1}, \ldots, V_{S\gamma}$ are connected with the node portions $1, \ldots, V$ by the LANs $1_N, \ldots, V_N$ in the example of FIG. 5, the sensor portions $1_{S1}, \ldots, 1_{S\alpha}, 2_{S1}, \ldots, 2_{S\beta}, V_{S1}, \ldots, V_{S\gamma}$ may also be connected with the node portions $1, \ldots, V$ over the internet $0_N$ or by any other means of connection; what is required is that data acquired by the sensor portions $1_{S1}, \ldots, 1_{S\alpha}, 2_{S1}, \ldots, 2_{S\beta}, V_{S1}, \ldots, V_{S\gamma}$ is available for use by the node portions $1, \ldots, V$.

Although the node portions $1, \ldots, V$ are connected over the internet $0_N$ in the example of FIG. 5, the node portions $1, \ldots, V$ may also be loosely connected, instead of being fully connected; they only have to be in a relationship that allows exchange of some pieces of data between them. Connecting structure of the edges is not limited; it can be any structure such as a tree or cyclic/circle structure. In short, all the node portions $1, \ldots, V$ are directly or indirectly connected. That is, the connecting structure of the edges is not a divided structure.

Figure 7:
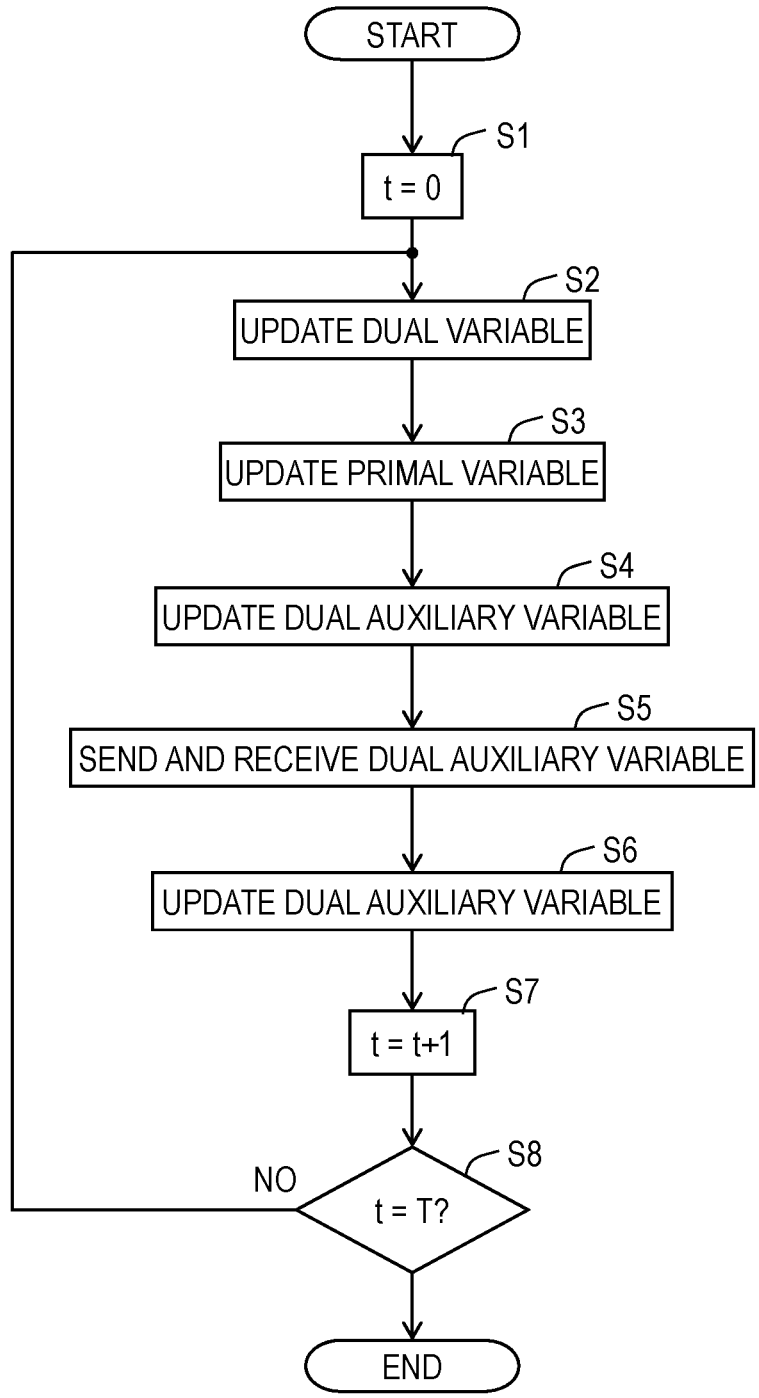
FIG. 7 is a flow diagram for describing an example of a machine learning method.

The multiple node portions $1, \ldots, V$ perform a machine learning process as described below while receiving data from the sending and receiving unit 11, sending data from the sending and receiving unit 11, reading data from the storage 12, and writing data to the storage 12 as necessary. The machine learning process is implemented, for example, by the execution of the processing at step S1 to step S8 of FIG. 7 by the multiple node portions $1, \ldots, V$.

The node portions $1, \ldots, V$ set t=0 (step S1).

The node portion i (more particularly, the learning unit 10 of the node portion i) performs an update of the dual variable according to the formula below using data acquired by the sensor portion corresponding to the node portion i (step S2). That is, the node portion i performs the calculation of $\lambda_{i|j,b}^{(t+1)}$ defined by the formula below, for each of i∈~V, j∈~N(i), and b∈~B.

for $i \in \tilde{V}$, $j \in \tilde{N}(i)$, $b \in \tilde{B}$, $$\lambda_{i|j,b}^{(t+1)} = \arg\min_{\lambda_{i|j,b}} \left( \frac{1}{2\sigma_1} \|\lambda_{i|j,b} - z_{i|j,b}\|_2 - \sum_{j \in \tilde{N}(i)} \lambda_{i|j,b}^T A_{i|j} w_{i,b}^* - f_i(w_{i,b}^*) \right),$$

The node portion i (more particularly, the learning unit 10 of the node portion i) performs an update of the primal variable according to the formula below (step S3). That is, the node portion i performs the calculation of $w_{i,b}^{(t+1)}$ defined by the formula below, for each of i∈~V and b∈~B. The processing at step S3 is performed in a case where the primal variable is necessary. In other words, the processing at step S3 need not be performed every time.

for $i \in \tilde{V}$, $b \in \tilde{B}$, $$w_{i,b}^{(t+1)} = \arg\max_{w_{i,b}} \left( -\sum_{j \in \tilde{N}(i)} \lambda_{i|j,b}^{(t+1)T} A_{i|j} w_{i,b} - f_i(w_{i,b}) \right)$$

The node portion i (more particularly, the learning unit 10 of the node portion i) performs an update of the dual auxiliary variable according to the formula below (step S4). That is, the node portion i performs the calculation of $y_{i|j,b}^{(t+1)}$ defined by the formula below, for each of i∈~V, j∈~N(i), and b∈~B. This processing at step S4 need not be performed except for a case where the dual auxiliary variable $y_{i|j,b}^{(t+1)}$ is sent at step S5.

for $i \in \tilde{V}, j \in \tilde{N}(i), b \in \tilde{B}$, $$y_{i|j,b}^{(t+1)} = 2\lambda_{i|j,b}^{(t+1)} - z_{i|j,b}^{(t+1)},$$

The node portion i (more particularly, the sending and receiving unit 11 of the node portion i) performs at least either one of processing for sending the dual auxiliary variable $y_{i|j,b}^{(t+1)}$ to another node portion j and processing for receiving a dual auxiliary variable $y_{j|i,b}^{(t+1)}$ sent by another node portion j, that is, information is exchanged between the node portions as shown by the formula below (step S5). For example, the node portion i operates to send the dual auxiliary variable $y_{i|j,b}^{(t+1)}$ acquired by the learning unit 10 of the node portion i to the node portion j from the sending and receiving unit 11 of the node portion i, and to input the dual auxiliary variable received by the sending and receiving unit 11 of the node portion i from the node portion j into the learning unit 10 of the node portion i as the dual auxiliary variable $y_{j|i,b}^{(t+1)}$. Note that the processing at step S5 need not be performed every time and can be done asynchronously between nodes. For example, all the node portions i may perform both the processing for sending the dual auxiliary variable $y_{i|j,b}^{(t+1)}$ acquired by the node portion i to another node portion j and the processing for receiving the dual auxiliary variable $y_{j|i,b}^{(t+1)}$ output by another node portion j only when t is an even number, and none of the node portion i may send or receive the dual auxiliary variable when t is an odd number. Also, rather than all the node portions i, j, only some of the node portions i may perform the processing shown by the formula below to only some of node portions j. In other words, with i∈~V, j∈~N(i), and b∈~B, at least one node portion i sends the dual auxiliary variable $y_{i|j,b}^{(t+1)}$ to at least one node portion j and receives the dual auxiliary variable $y_{j|i,b}^{(t+1)}$ output by the node portion j.

for $i \in \tilde{V}, j \in \tilde{N}(i), b \in \tilde{B}$, $$\text{Node}_j \leftarrow \text{Node}_i(y_{i|j,b}^{(t+1)})$$

The node portion i (more particularly, the learning unit 10 of the node portion i) performs an update of the dual auxiliary variable according to the formula below (step S6). That is, with $i \in {\sim}V$, $j \in {\sim}N(i)$, and $b \in {\sim}B$, the node portion i performs processing for setting $z_{i|j,b}^{(t+1)} = y_{j|i,b}^{(t+1)}$. The processing at step S6 need not be performed except for a case where the dual auxiliary variable $y_{j|i,b}^{(t+1)}$ was received at step S5. That is, the processing at step S6 only needs to be performed by the node portion i that has received the dual auxiliary variable $y_{j|i,b}^{(t+1)}$.

for $i \in \tilde{V}, j \in \tilde{N}(i), b \in \tilde{B}$, $$z_{i|j,b}^{(t+1)} = y_{j|i,b}^{(t+1)}$$

The node portions 1, . . . , V set t=t+1 (step S7). That is, the node portions 1, . . . , V increment t by one.

The node portions 1, . . . , V determine whether t=T (step S8), and if t=T, ends the processing. If not t=T, it returns to the processing at step S2.

In this manner, in a machine learning system including multiple node portions which have input data stored therein and which learn mapping using the primal variable w by machine learning based on teaching data and the input data while sending and receiving information to and from each other, the multiple node portions i perform machine learning such that the primal variable is also optimized if dual variables used in machine learning are optimized and while sending and receiving, not the primal variable, but the dual variables to and from each other. This prevents the primal variable from being sent and received between node portions i, so that machine learning of higher confidentiality than conventional techniques can be effected.

MODIFICATIONS

First Modification

When the following cost function, rather than the cost function in general form, is used, $$f_i(w_{i,b}) = \tfrac{1}{2}\|s_{i,b} - x_i^T w_{i,b}\|_2$$

at step S2, the node portion i performs an update of the dual variable according to the formula below.

for $i \in \tilde{V}, \ j \in \tilde{N}(i), \ b \in \tilde{B}$, $$\lambda_{i|j,b}^{(t+1)} = \left(\tfrac{1}{\sigma_1} I + A_{i|j} Q_i^{-1} A_{i|j}^T\right)^{-1} \left(A_{i|j} Q_i^{-1} x_i s_{i,b} + \tfrac{1}{\sigma_1} z_{i|j,b}^{(t)}\right)$$

At step S3, the node portion i performs an update of the primal variable according to the formula below.

for $i \in \tilde{V}, b \in \tilde{B}$, $$w_{i,b}^{(t+1)} = Q_i^{-1}\left(x_i s_{i,b} - \sum_{j \in \tilde{N}(i)} A_{i|j}^T \lambda_{i|j,b}^{(t+1)}\right)$$

Second Modification

With i=1, . . . , V, $D_i$ pieces of data are accumulated in the node portion i; however, $D_i$ may change with time, which can address online optimization as well. Then, the cost function can be written as:

$$f_i(w_{i,b}) = \sum_{d=1}^{D_i} \tfrac{1}{2}\|s_{i,d,b} - x_{i,d}^T w_{i,b}\|_2.$$

Third Modification

At step S5, the node portion i may send and receive the dual variable $\lambda_{i|j,b}^{(t+1)}$, not the dual auxiliary variable $y_{i|j,b}^{(t+1)}$.

In that case, processing at step S6 is not performed. Processing at the steps other than step S6 is performed as described above.

Fourth Modification

In the following, an arrangement for compressing the transmission volume is described.

As an optimization process converges, an update difference approaches 0. By making use of this nature to perform a lossy compression process, the transmission volume would be further kept low.

While various methods are conceivable for compressing information, when based on the idea of transmitting the update difference to each other, there are (i) a flooring-based compression process and (ii) an entropy coding-based compression process.

First, assuming that reference data is updated from time to time, difference data relative to the data is defined as a variable v. Here, $v_{i|j,b}^{(t+1)}$ is update difference information. The $v_{i|j,b}^{(t+1)}$ tends to tilt toward a number close to 0 as convergence proceeds. The $v_{i|j,b}^{(t+1)}$ is the very information to be exchanged between nodes. $m_{i|j,b}^{(export)}$ is reference information already acquired.

$$v_{i|j,b}^{(t+1)} = y_{i|j,b}^{(t+1)} - m_{i|j,b}^{(export)},$$

To this v, a compression process C is applied.

$$u_{i|j,b}^{(t+1)} = C(v_{i|j,b}^{(t+1)})$$

(i) In the case of the flooring-based compression process, processing like comparing each of the elements constituting v with a threshold thr and setting it to 0 if it is equal to or smaller than the threshold is performed. thr is a predetermined number greater than 0 and a very small number such as $1 \times 10^{-5}$.

$$C(V_{i|j,b,l}^{(t+1)}) = \begin{cases} V_{i|j,b,l}^{(t+1)}, & (|V_{i|j,b,l}^{(t+1)}| > thr) \\ 0, & (\text{otherwise}) \end{cases}$$

(ii) In the case of the entropy coding-based compression process, u is generated by performing processing like assigning a symbol in accordance with a probability of appearance. For example, u is generated by assigning a short symbol when the probability of appearance is relative to the value.

Then, the consensus algorithm for the case of describing the cost function in general form will be as follows.

Assuming that updates are to be made T times, processing from (1) to (10) below is performed for $t \in \{0, \ldots, T-1\}$. Processing for (2) updating the primal variable does not have to be performed. This is because w*, or the optimal solution of w, is represented by the formula of $\lambda$ and hence does not require an update of w in the process of optimizing $\lambda$. (When $\lambda$ has been optimized, it means that w has also been implicitly optimized.)

(1) Update the dual variables (here, the cost is described in general form without being limited to a least square problem).

for $i \in \tilde{V}, j \in \tilde{N}(i), b \in \tilde{B}$, $$\lambda_{i|j,b}^{(t+1)} = \underset{\lambda_{i|j,b}}{\arg\min} = \left( \frac{1}{2\sigma_1} \|\lambda_{i|j,b} - z_{i|j,b}\|_2 - \sum_{j \in \tilde{N}(i)} \lambda_{i|j,b}^T A_{i|j} w_{i,b}^* - f_i(w_{i,b}^*) \right),$$

(2) Update the primal variable (here, the cost is described in general form without being limited to a least square problem).

for $i \in \tilde{V}, b \in \tilde{B}$, $$w_{i,b}^{(t+1)} = \underset{w_{i,b}}{\arg\max} \left( - \sum_{j \in \tilde{N}(i)} \lambda_{i|j,b}^{(t+1)T} A_{i|j} w_{i,b} - f_i(w_{i,b}) \right)$$

(3) Update the dual auxiliary variable for $i \in \tilde{V}, j \in \tilde{N}(i), b \in \tilde{B}$, $$y_{i|j,b}^{(t+1)} = 2\lambda_{i|j,b}^{(t+1)} - z_{i|j,b}^{(t+1)},$$

When mod (t, $T_{interval}$)=0 holds, processing from (4) to (6) below is performed. That is, the reference data is occasionally updated. Here, $T_{interval}$ is a predetermined positive integer.

(4) Update the reference data for $i \in \tilde{V}, j \in \tilde{N}(i), b \in \tilde{B}$, $$m_{i|j,b}^{(export)} = y_{i|j,b}^{(t+1)}, m_{i|j,b}^{(import)} = y_{j|i,b}^{(t+1)}$$

(5) Exchange information between nodes (which may be done independently for each edge (asynchronously)).

for $i \in \tilde{V}, j \in \tilde{N}(i), b \in \tilde{B}$,

Node$_j \leftarrow$ Node$_i(m_{i|j,b}^{(export)})$ (6) Update the dual auxiliary variable using the exchanged information for $i \in \tilde{V}, j \in \tilde{N}(i), b \in \tilde{B}$, $$z_{i|j,b}^{(t+1)} = m_{j|i,b}^{(import)}$$

If mod (t, $T_{interval}$)=0 does not hold, processing from (7) to (10) below is performed. That is, the update difference is transmitted to each other at almost all times.

(7) Calculate the update difference for $i \in \tilde{V}, j \in \tilde{N}(i), b \in \tilde{B}$, $$v_{i|j,b}^{(t+1)} = y_{i|j,b}^{(t+1)} - m_{i|j,b}^{(export)},$$

(8) Compress data for $i \in \tilde{V}, j \in \tilde{N}(i), b \in \tilde{B}$, $$u_{i|j,b}^{(t+1)} = C(v_{i|j,b}^{(t+1)})$$

(9) Exchange the compressed data between nodes for $i \in \tilde{V}, j \in \tilde{N}(i), b \in \tilde{B}$, Node$_j \leftarrow$ Node$_i(u_{i|j,b}^{(t+1)})$

(10) Update the dual auxiliary variable using the exchanged information for $i \in \tilde{V}, j \in \tilde{N}(i), b \in \tilde{B}$, $$z_{i|j,b}^{(t+1)} = m_{j|i,b}^{(import)} + u_{j|i,b}^{(t+1)}$$

Figure 8:
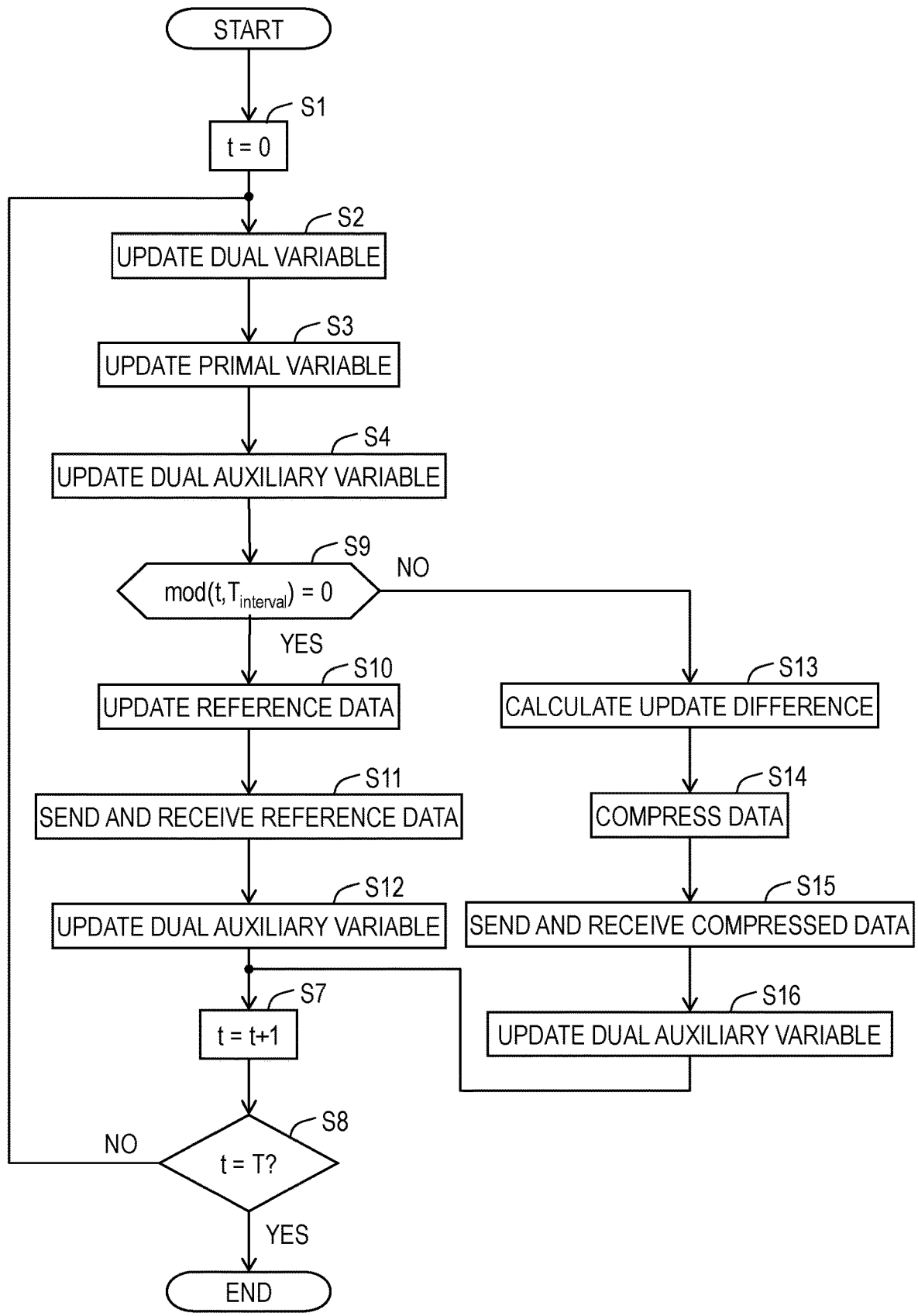
FIG. 8 is a flow diagram for describing a modification of the machine learning method.
Figure 9:
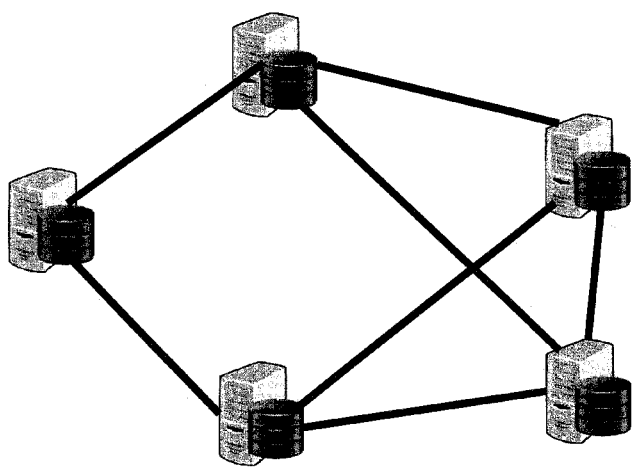
FIG. 9 shows an example of edge computing.
Figure 10A:
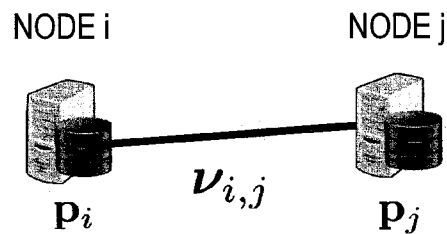
FIG. 10A shows how lifting of a dual variable is performed.
Figure 10B:
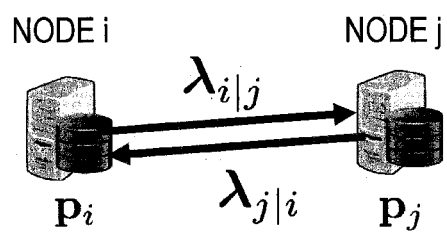
FIG. 10B shows how lifting of a dual variable is performed.

To reduce the transmission volume in this manner, in the above-described embodiment, the node portion i may perform processing from step S9 to step S16 as described below instead of the processing from step S5 to step S6. As the other processing is similar to those in the embodiment above, overlapping descriptions are omitted here. FIG. 8 shows a flow diagram of an example of a machine learning method with the transmission volume reduced.

The node portions 1, . . . , V determine whether mod (t, $T_{interval}$)=0 (step S9).

If mod (t, $T_{interval}$)=0 holds, the node portion i (more particularly, the learning unit 10 of the node portion i) performs an update of the reference data according to the formula below (step S10). That is, the node portion i performs an update of the reference data for each of i∈~V, j∈~N(i), and b∈~B according to the formula below (step S10).

for $i \in \tilde{V}, j \in \tilde{N}(i), b \in \tilde{B}$, $$m_{i|j,b}^{(export)} = y_{i|j,b}^{(t+1)}, m_{i|j,b}^{(import)} = y_{j|i,b}^{(t+1)}$$

The node portion i (more particularly, the sending and receiving unit 11 of the node portion i) performs at least either one of processing for sending $m_{i|j,b}^{(export)}$ to another node portion j and processing for receiving $m_{j|i,b}^{(import)}$ sent by another node portion j, that is, information is exchanged between the node portions as shown by the formula below (step S11). For example, the node portion i operates to send the $m_{i|j,b}^{(export)}$ acquired by the learning unit 10 of the node portion i to the node portion j from the sending and receiving unit 11 of the node portion i, and to input the $m_{j|i,b}^{(import)}$ received by the sending and receiving unit 11 of the node portion i from the node portion j into the learning unit 10 of the node portion i. Also, rather than all the node portions i, j, only some of the node portions i may perform the processing shown by the formula below to only some of node portions j. In other words, with i∈~V, j∈~N(i), and b∈~B, at least one node portion i sends the $m_{i|j,b}^{(export)}$ to at least one node portion j and receives the $m_{j|i,b}^{(import)}$ output by the node portion j (step S11).

for $i \in \tilde{V}, j \in \tilde{N}(i), b \in \tilde{B}$,

Node$_j \leftarrow$ Node$_i(m_{i|j,b}^{(export)})$

The node portion i (more particularly, the learning unit 10 of the node portion i) performs an update of the dual auxiliary variable $z_{i|j,b}^{(t+1)}$ using the exchanged information for each of i∈~V, j∈~N(i), and b∈~B as shown by the formula below (step S12).

for $i \in \tilde{V}, j \in \tilde{N}(i), b \in \tilde{B}$,

Node$_j \leftarrow$ Node$_i(m_{i|j,b}^{(export)})$

If mod (t, $T_{interval}$)=0 does not hold, the node portion i (more particularly, the learning unit 10 of the node portion i) calculates the update difference according to the formula below (step S13). That is, the node portion i performs the calculation of $v_{i|j,b}^{(t+1)}$ defined by the formula below, for each of i∈~V, j∈~N(i), and b∈~B.

for $i \in \tilde{V}, j \in \tilde{N}(i), b \in \tilde{B}$, $$v_{i|j,b}^{(t+1)} = y_{i|j,b}^{(t+1)} - m_{i|j,b}^{(export)},$$

The node portion i (more particularly, the learning unit 10 of the node portion i) generates a code $u_{i|j,b}^{(t+1)}$ by compressing data according to the formula below for each of i∈~V, j∈~N(i), and b∈~B (step S14). This data compression may be lossy. Here, C means a predetermined compression process, such as the flooring-based compression process and entropy coding-based compression process.

for $i \in \tilde{V}, j \in \tilde{N}(i), b \in \tilde{B}$, $i_{i|j,b}^{(t+1)} = C(v_{i|j,b}^{(t+1)})$ The node portion i (more particularly, the sending and receiving unit 11 of the node portion i) performs at least either one of processing for sending $u_{i|j,b}^{(t+1)}$ to another node portion j and processing for receiving $u_{j|i,b}^{(t+1)}$ sent by another node portion j, that is, compressed data is exchanged between the node portions according to by the formula below (step S15). For example, the node portion i operates to send the $u_{i|j,b}^{(t+1)}$ acquired by the learning unit 10 of the node portion i to the node portion j from the sending and receiving unit 11 of the node portion i, and to input the $u_{j|i,b}^{(t+1)}$ received by the sending and receiving unit 11 of the node portion i from the node portion j into the learning unit 10 of the node portion i. Also, rather than all the node portions i, j, only some of the node portions i may perform the processing shown by the formula below to only some of node portions j. In other words, with $i \in \sim V$, $j \in \sim N(i)$, and $b \in \sim B$, at least one node portion i sends the code $u_{i|j,b}^{(t+1)}$ to at least one node portion j and receives the code $u_{j|i,b}^{(t+1)}$ output by the node portion j (step S15).

for $i \in \tilde{V}, j \in \tilde{N}(i), b \in \tilde{B}$,

Node$_j \leftarrow$ Node$_i(u_{i|j,b}^{(t+1)})$

The node portion i (more particularly, the learning unit 10 of the node portion i) performs an update of the dual auxiliary variable $z_{i|j,b}^{(t+1)}$ according to the formula below for each of $i \in \sim V$, $j \in \sim N(i)$, and $b \in \sim B$ (step S16).

for $i \in \tilde{V}, j \in \tilde{N}(i), b \in \tilde{B}$, $z_{i|j,b}^{(t+1)} = m_{j|i,b}^{(import)} + u_{j|i,b}^{(t+1)}$ At step 12, the node portion i may perform the D-R splitting-based update illustrated below. For β, ½ is typically used.

$z_{i|j,b}^{(t+1)} = \beta m_{i|j,b}^{(import)} + (1-\beta) z_{i|j,b}^{(t)} (0 \leq \beta \leq 1)$ At step S16, the node portion i may also perform the D-R splitting-based update illustrated below. For β, ½ is typically used.

$z_{i|j,b}^{(t+1)} = \beta(m_{i|j,b}^{(import)} + u_{j|i,b}^{(t+1)}) + (1-\beta) z_{i|j,b}^{(t)}$
$(0 \leq \beta \leq 1)$ It goes without saying that other modifications may be made within the scope of the present invention.

<<Programs and Recording Media>>

The machine learning system may be embodied by one computer. In this case, processing details of functions to be provided by the components of the machine learning system are described by a program. By the program then being executed on the computer, the processing of the machine learning system is embodied on the computer.

The program describing the processing details can be recorded on a computer-readable recording medium. The computer-readable recording medium may be any kind, such as a magnetic recording device, an optical disk, a magneto-optical recording medium, or a semiconductor memory.

Processing by the units may be configured by executing a predetermined program on a computer or at least part of the processing may be embodied with hardware.

A second embodiment as an embodiment of this invention is now described with reference to drawings.

<Technical Background>

A consensus algorithm which is also applicable to optimization for a non-convex function is described below.

First, definitions of the symbols to be used in the following description are described.

V is a predetermined positive integer equal to or greater than 2, with $\sim V = \{1, \ldots, V\}$.

B is a predetermined positive integer, with b=1, . . . , B and $\sim B = \{1, \ldots, B\}$.

A set of node portions connected with a node portion i is represented as $\sim N(i)$.

The bth vector constituting a dual variable $\lambda_{i|j}$ at the node portion i with respect to a node portion j is represented as $\lambda_{i|j,b}$, and the dual variable $\lambda_{i|j,b}$ after the t+1th update is represented as $\lambda_{i|j,b}^{(t+1)}$.

A dual auxiliary variable $z_{i|j}$ is introduced as an auxiliary variable for the dual variable $\lambda_{i|j}$, where the bth vector constituting the dual auxiliary variable $z_{i|j}$ is represented as $z_{i|j,b}$, and the dual auxiliary variable $z_{i|j,b}$ after the t+1th update is represented as $z_{i|j,b}^{(t+1)}$. The basic properties of are the same as those of $\lambda_{i|j}$.

A dual auxiliary variable $y_{i|j}$ is introduced as an auxiliary variable for the dual variable $\lambda_{i|j}$, where the bth vector constituting the dual auxiliary variable $y_{i|j}$ is represented as $y_{i|j,b}$, and the dual auxiliary variable $y_{i|j,b}$ after the t+1th update is represented as $y_{i|j,b}^{(t+1)}$. The basic properties of $y_{i|j}$ are the same as those of $\lambda_{i|j}$.

The bth element of a primal variable $w_i$ of the node portion i is represented as $w_{i,b}$ and the dual auxiliary variable $w_{i,b}$ after the tth update is represented as $w_{i,b}^{(t)}$.

The cost function corresponding to the node portion i used in machine learning is represented as $f_i$, and the first-order gradient of the cost function $f_i$ with respect to $w_{i,b}^{(t)}$ is represented as $\nabla f_i(w_{i,b}^{(t)})$.

$A_{i|j}$ is defined by the formula below.

$$A_{i|j} = \begin{cases} I & (i > j, \ j \in \tilde{N}(i)) \\ -I & (i < j, \ j \in \tilde{N}(i)) \\ O & (\text{otherwise}) \end{cases}$$

I is an identity matrix, O is a zero matrix, and $\sigma_1$ is a predetermined positive number. T is the total number of updates and is a positive integer, but is not a constant when online learning is assumed. η is assumed to be a positive number.

The basic idea is to replace a non-convex function with a convex function. This manipulation is based on the concept of the proximal gradient method which is found in Section 15.3 of Non-patent Literature 3. Assume that the gradient of the function f is Lipschitz continuity as shown below. Here, f may also be a non-convex function.

$$\|\nabla f_i(w_{i,b}^{(t)}) - \nabla f_i(w_{i,b})\|_1 \leq \frac{1}{\eta} \|w_{i,b}^{(t)} - w_{i,b}\|_1, (\eta > 0)$$

Here, η represents how smooth the gradient of $f_i$ is, and this is an assumption that is satisfied in many cases if η is a sufficiently small value. For example, h=0.001 is assumed. When the formula above is satisfied, $f_i$ is called a 1/η smooth function.

When $f_i$ is a 1/η smooth function, the inequality relationship below holds.

$$f_i(w_{i,b}) - f_i(w_{i,b}^{(t)}) - \langle \nabla f_i(w_{i,b}^{(t)}), w_{i,b} - w_{i,b}^{(t)} \rangle =$$

$$\int_0^1 \langle \nabla f_i(w_{i,b}^{(t)} + t(w_{i,b} - w_{i,b}^{(t)})) - \nabla f_i(w_{i,b}^{(t)}), w_{i,b} - w_{i,b}^{(t)} \rangle dt \leq$$

$$\frac{1}{\eta} \|w_{i,b} - w_{i,b}^{(t)}\|_2^2 \int_0^1 |t| dt = \frac{1}{2\eta} \|w_{i,b} - w_{i,b}^{(t)}\|_2^2$$

From this, the following can be derived. Here, with x and y being arbitrary vectors, <x,y> represents an inner product of x and y. The smaller the value of η is, the greater the gradient of the convex function on the right side is (a sharper function), thus satisfying the condition of being the upper bound on cost. Accordingly, η may be a small value. However, as one feature, if η is too small, the update step becomes smaller and hence more time is required to arrive at the optimal solution.

$$f_i(w_{i,b}) \leq f_i(w_{i,b}^{(t)}) + \langle \nabla f_i(w_{i,b}^{(t)}), w_{i,b} - w_{i,b}^{(t)} \rangle + \frac{1}{2\eta} \|w_{i,b} - w_{i,b}^{(t)}\|_2^2$$

This formula indicates that a convex function serving as the upper bound on the cost function $f_i$ (the right side) has been derived. Even if $f_i$ is a non-convex function, the concept of the consensus-based edge computing of PDMM could be introduced into a non-convex function by adopting a means of minimizing the proxy convex function serving as the upper bound (the right side) instead.

Here, as complementary description, what is meant by optimizing a proxy convex function serving as the upper bound on the cost function $f_i$ instead of the cost function $f_i$ is explained.

Figure 4:
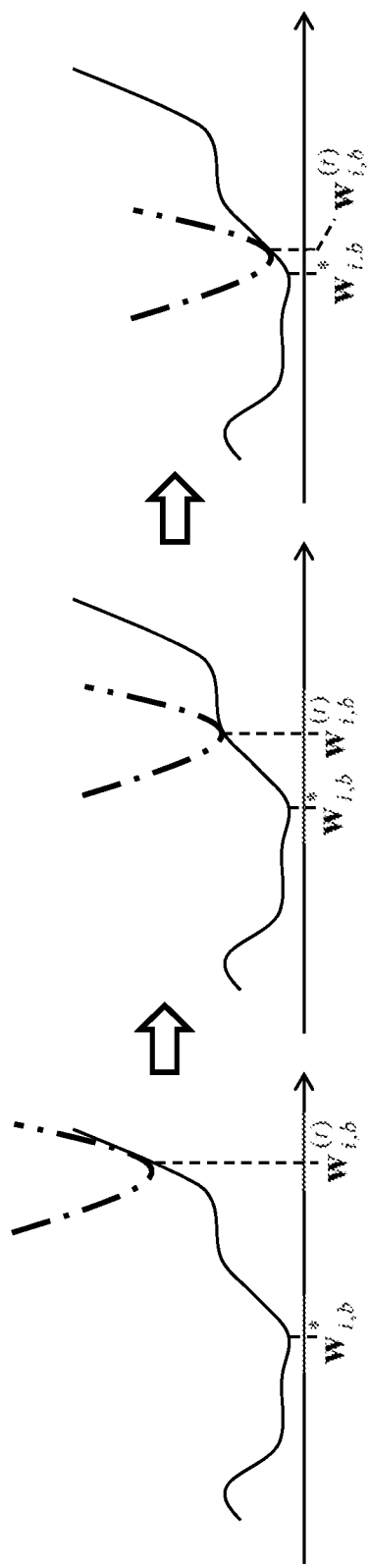
FIG. 4 is a diagram for describing technical background.

In FIG. 4, a solid line represents the original cost function $f_i$. In FIG. 4, the cost function $f_i$ is written as a non-convex function. In FIG. 4, a dot-dashed line represents the proxy convex function $g_i$ serving as the upper bound.

$$g_i(w_{i,b}) = f_i(w_{i,b}^{(t)}) + \langle \nabla f_i(w_{i,b}^{(t)}), w_{i,b} - w_{i,b}^{(t)} \rangle + \frac{1}{2\eta} \|w_{i,b} - w_{i,b}^{(t)}\|_2^2$$

Here, $f_i(w_{i,b}^{(t)})$ is function output at update time t and is computable. $\nabla f_i(w_{i,b}^{(t)})$ is the gradient of the function at the update time t and is computable in the framework of probabilistic optimization when a DNN is assumed.

Thus, the proxy convex function $g_i$ above can be calculated as long as the first-order gradient with respect to $f_i$ can be calculated. This is applicable to a DNN.

The proxy function may be something other than the above-mentioned one. The proxy convex function $g_i$ shown above represents the upper bound on the original cost, and has an advantage of only requiring the first-order gradient of the cost function to be determined. This is also an advantage of applicability to a non-convex function as well.

If a second-order of the cost function can be determined, however, a proxy function like the one below may be used. The underlined portion of the formula below is used as the proxy function.

$$f_i(w_{i,b}) \approx$$

$$f_i(w_{i,b}^{(t)}) + \langle \nabla f_i(w_{i,b}^{(t)}), w_{i,b} - w_{i,b}^{(t)} \rangle + \underline{(w_{i,b} - w_{i,b}^{(t)})^T \nabla^2 f_i(w_{i,b}^{(t)})(w_{i,b} - w_{i,b}^{(t)})}$$

This is an approximate function (not the upper bound) represented with second-order Taylor expansion. When this proxy function is used, a gap with decreasing the original cost is expected to become smaller because the proxy function has higher accuracy of approximation relative to the original cost function.

The concept of a proxy convex function is that it is a convex function not contradictory to minimization of the original cost function, and can be implemented with an idea such as the upper bound and approximation. Specifically, it is a convex function that can be calculated using a first-order, or in some cases, a second-order gradient of the original cost function with respect to the primal variable.

In the following, derivation of the PDMM algorithm when the cost function is replaced by the proxy convex function $g_i$ is described.

$$g_i(w_{i,b}) = f_i(w_{i,b}^{(t)}) + \langle \nabla f_i(w_{i,b}^{(t)}), w_{i,b} - w_{i,b}^{(t)} \rangle + \frac{1}{2\eta} \|w_{i,b} - w_{i,b}^{(t)}\|_2^2$$

Then, the dual problem can be written by the following.

$$\max_{\lambda_{i|j,b}} \min_{w_{i,b}} \sum_{i \in V} g_i(w_{i,b}) + \sum_{j \in N(i)} \lambda_{i|j,b}^T \left( \frac{1}{2} A_{i|j} w_{i,b} + \frac{1}{2} A_{j|i} w_{j,b} \right) =$$

$$\max_{\lambda_{i|j,b}} \min_{w_{i,b}} \sum_{i \in V} g_i(w_{i,b}) + \sum_{j \in N(i)} \lambda_{i|j,b}^T A_{i|j} w_{i,b} = \max_{\lambda_b} \min_{w_b} g(w_b) + \lambda_b^T A w_b$$

The definitions of variables are as shown below. Note that the f below is an example and other f may be used.

$$f(w_b) = \frac{1}{2} \|s_b - X^T w_b\|_2,$$

$$\nabla f(w_b^{(t)}) = -X(s_b - X^T w_b^{(t)})$$

$$g(w_b) = f(w_b^{(t)}) + \langle \nabla f(w_b^{(t)}), w_b - w_b^{(t)} \rangle + \frac{1}{2\eta} \|w_b - w_b^{(t)}\|_2$$

$$s_b = [s_{1,b}, \ldots, s_{V,b}]^T,$$

$$w_b = [w_{1,b}^T, \ldots, w_{V,b}^T]^T,$$

$$\lambda_b = [\lambda_{1|2,b}^T, \ldots, \lambda_{1|V,b}^T, \lambda_{2|1,b}^T, \ldots, \lambda_{2|V,b}^T, \ldots, \lambda_{V|1,b}^T, \ldots, \lambda_{V|V-1,b}^T]^T,$$

$$X = \begin{bmatrix} x_1 & & O \\ & \ddots & \\ O & & x_V \end{bmatrix},$$

$$A = \begin{bmatrix} A_{1|2} & & & & & O \\ \vdots & & & & & \\ A_{1|V} & & & & & \\ & A_{2|1} & & & & \\ & \vdots & & & & \\ & A_{2|V} & & & & \\ & & \ddots & & & \\ & & & A_{V|1} & & \\ & & & \vdots & & \\ O & & & A_{V|V-1} & & \end{bmatrix}$$

The condition that consensus is formed for each of the primal variable and the dual variable can be written by the following.

$$A_{i|j} = \begin{cases} 1 & (i > j, j \in \tilde{N}(i)) \\ -1 & (i < j, j \in \tilde{N}(i)), \; \lambda_{i|j,b} = \lambda_{j|i,b}, \; (i \in \tilde{V}, j \in \tilde{N}(i), b \in \tilde{B}) \\ 0 & (\text{otherwise}) \end{cases}$$

By solving the convex conjugate function g* of the function g, the optimal solution of w is derived.

$$g^*(-A^T\lambda_b) = \max_{w_b}(-\lambda_b^T A w_b - g(w_b)) =$$

$$\max_{w_b}\left(-\lambda_b^T A w_b - f(w_b^{(t)}) - \langle \nabla f(w_b^{(t)}), w_b - w_b^{(t)} \rangle - \frac{1}{2\eta}\|w_b - w_b^{(t)}\|_2\right)$$

The w that maximizes the inside of the parentheses is the following.

$$w_b^* = w_b^{(t)} - \eta(\nabla f(w_b^{(t)}) + A^T\lambda_b),$$

This process can be written being divided for each node.

$$w_{i,b}^{(t+1)} = w_{i,b}^{(t)} - \eta\left(\nabla f_i(w_{i,b}^{(t)}) + \sum_{j \in \tilde{N}(i)} A_{i|j}^T \lambda_{i|j,b}^{(t+1)}\right)$$

Substituting this into a dual function gives the formula below. It is thus turned into a proper convex closed function with respect to the dual variable λ.

$$g^*(-A^T\lambda_b) = -\lambda_b^T A(w_b^{(t)} - \eta(\nabla f(w_b^{(t)}) + A^T\lambda_b)) - f(w_b^{(t)}) +$$

$$\langle \nabla f(w_b^{(t)}), \eta(\nabla f(w_b^{(t)}) + A^T\lambda_b)\rangle - \frac{1}{2\eta}\|\nabla f(w_b^{(t)}) + A^T\lambda_b\|_2$$

The original dual problem can be written by the following.

$$\min_{\lambda_b} g^*(-A^T\lambda_b) \text{ s.t. } \lambda_{i|j} = \lambda_{j|i}$$

To solve this problem, a cost like the one below is designed as with PDMM.

$$\min_{\lambda_b} g^*(-A^T\lambda_b) + \delta_{(I-P)}(\lambda_b), \; \delta_{(I-P)}(\lambda_b) = \begin{cases} 0 & (I-P)\lambda_b = 0 \\ +\infty & \text{otherwise} \end{cases}$$

In the case of solving this problem by P-R splitting, it consists of the following operations as already described for the conventional method.

$$\lambda_b \in R_1 z_b = (I + \sigma_1 T_1)^{-1} z_b,$$

$$y_b \in C_1 z_b = (2R_1 - I)z_b = 2\lambda_b - z_b, T_1 = -A\partial f^*(-A^T)$$

$$z_b \in C_2 y_b = P y_b$$

In the above formula, the symbol "∈" does not represent the elements of a set but means substituting the operation result of the right side into the left side. Although such a manipulation is usually represented with "=", an irreversible conversion could be performed when a discontinuous closed proper convex function is used as the cost function (an operation which is not a one-to-one correspondence can be possibly performed). As "=" is generally a symbol used for a conversion (function) with one-to-one correspondence, the symbol of "∈" will be used herein in order to distinguish from it.

Among them, the topmost operation corresponds to the following.

$$0 \in \partial\left(\frac{1}{2\sigma_1}\|\lambda_b - z_b\|_2 + g^*(-A^T\lambda_b)\right)$$

The g* is presented again.

$$g^*(-A^T\lambda_b) = \max_{w_b}(-\lambda_b^T A w_b - g(w_b)) =$$

$$\max_{w_b}\left(-\lambda_b^T A w_b - f(w_b^{(t)}) - \langle \nabla f(w_b^{(t)}), w_b - w_b^{(t)} \rangle - \frac{1}{2\eta}\|w_b - w_b^{(t)}\|_2\right)$$

The w that maximizes the inside of the parentheses (the optimal solution of the primal variable) is determined. That is, determining $w_b^*$ with which the differential of the inside of the parentheses in the formula above is 0 gives the following:

$$-A^T\lambda_b - \nabla f(w_b^{(t)}) - \frac{1}{\eta}(w_b - w_b^{(t)}) = 0,$$

$$w_b^* = w_b^{(t)} - \eta(\nabla f(w_b^{(t)}) + A^T\lambda_b)$$

Next, the optimal solution of the dual variable satisfying the topmost operation of P-R splitting is derived.

$$\lambda_b^* = \underset{\lambda_b}{\operatorname{argmin}}\left(\frac{1}{2\sigma_1}\|\lambda_b - z_b\|_2 - \lambda_b^T A w_b^* - \right.$$

$$\left. f(w_b^{(t)}) - \langle \nabla f(w_b^{(t)}), w_b^* - w_b^{(t)}\rangle - \frac{1}{2\eta}\|w_b^* - w_b^{(t)}\|_2\right)$$

Differentiating the inside of the parentheses with respect to the dual variable gives the formula below, though the intermediate calculations are omitted.

$$\lambda_b^* = \left(\frac{1}{\sigma_1}I + \eta A A^T\right)^{-1}\left[A(w_b^{(t)} - \eta\nabla f(w_b^{(t)})) + \frac{1}{\sigma_1}z_b\right]$$

Splitting it into operations for the respective nodes, a variable optimization algorithm can be obtained using the proxy convex function based on P-R splitting. This algorithm is also called Quadratic PDMM. The Quadratic PDMM will be as follows.

Assuming that updates are to be made T times, processing from (1) to (5) below is performed for $t \in \{0, \ldots, T-1\}$.

(1) Update the dual variables for $i \in \tilde{V}, j \in \tilde{N}(i), b \in \tilde{B}$, $$\lambda_{i|j,b}^{(t+1)} = \left(\frac{1}{\sigma_1}I + \eta A_{i|j}A_{i|j}^T\right)^{-1}\left[A_{i|j}(w_{i,b}^{(t)} - \eta \nabla f_i(w_{i,b}^{(t)})) + \frac{1}{\sigma_1}z_{i|j,b}^{(t)}\right]$$

(2) Update the primal variable for $i \in \tilde{V}, b \in \tilde{B}$, $$w_{i,b}^{(t+1)} = w_{i,b}^{(t)} - \eta\left(\nabla f_i(w_{i,b}^{(t)}) + \sum_{j\in\tilde{N}(i)} A_{i|j}^T \lambda_{i|j,b}^{(t+1)}\right)$$

(3) Update the dual auxiliary variable for $i \in \tilde{V}, j \in \tilde{N}(i), b \in \tilde{B}$, $$y_{i|j,b}^{(t+1)} = 2\lambda_{i|j,b}^{(t+1)} - z_{i|j,b}^{(t+1)},$$

(4) Although it need not be performed every time and it can be done independently for each edge (asynchronously), the dual auxiliary variable is updated between nodes.

for $i \in \tilde{V}, j \in \tilde{N}(i), b \in \tilde{B}$, $$\text{Node}_j \leftarrow \text{Node}_i(y_{i|j,b}^{(t+1)})$$

(5) Update the dual auxiliary variable using the exchanged information for $i \in \tilde{V}, j \in \tilde{N}(i), b \in \tilde{B}$, $$z_{i|j,b}^{(t+1)} = y_{j|i,b}^{(t+1)}$$

For the last step (5), replacement with the operation below provides Douglas Rachford (D-R) splitting with which high stability is expected in the convergence process at the cost of lower convergence. For $\beta$, ½ is typically used.

$$z_{i|j,b}^{(t+1)} = \beta y_{j|i,b}^{(t+1)} + (1-\beta)z_{i|j,b}^{(t)} \quad (0 \le \beta \le 1)$$

The Quadratic-PDMM algorithm can be said to provide high confidentiality in that the proxy convex function changes at each update time.

A convergence rate is derived in order to show that the Quadratic-PDMM algorithm also converges when there are heterogeneous data sets among nodes. The problem was a cost minimization problem consisting of two kinds of convex functions as shown below.

$$\min_\lambda \underbrace{g^*(-A^T\lambda_b) + \delta_{(I-P)}(\lambda_b)}_{G(-A^T\lambda_b)}$$

First, we show that g is a $1/\eta$ strong convex function.

If $g(w_b) - (1/(2\eta))\|w_b\|_2$ is a convex function, it is equivalent to g being a $1/\eta$-strong convex function (see Section 2.2.5 of Non-patent Literature 3, for instance).

$$g(w_b) - \frac{1}{2\eta}\|w_b\|_2^2 =$$

-continued $$f(w_b^{(t)}) + \langle \nabla f(w_b^{(t)}), w_b - w_b^{(t)}\rangle + \frac{1}{2\eta}\|w_b - w_b^{(t)}\|_2 - \frac{1}{2\eta}\|w_b\|_2 =$$

$$f(w_b^{(t)}) + \langle \nabla f(w_b^{(t)}), w_b - w_b^{(t)}\rangle + \frac{1}{2\eta}\|w_b^{(t)}\|_2 - 2\eta\|w_b\|_1\|w_b^{(t)}\|_1\cos\theta$$

Here, since $\eta$ is assumed to be sufficiently small, $\cos\theta$ would be a negative value.

$$\cos\theta < 0$$

Then, $g(w_b) - (1/(2\eta))\|w_b\|_2$ is a convex function, so g would be a $1/\eta$-strong convex function.

Next, from Section 2.2.5 of Non-patent Literature 3, it is known that when g is a $1/\eta$ strong convex function, g* will be a $\eta$-smooth function. Then, the following properties are satisfied.

$$g^*(-A^T\lambda_b) \le g^*(-A^T\lambda_b^{(t)}) +$$

$$\langle \nabla g^*(-A^T\lambda_b^{(t)}), -A^T(\lambda_b - \lambda_b^{(t)})\rangle + \frac{1}{2\eta}\|A^T(\lambda_b - \lambda_b^{(t)})\|_2 = g^*(-A^T\lambda_b^{(t)}) +$$

$$\frac{1}{2\eta}\|\eta A^T(\lambda_b - \lambda_b^{(t)}) - \nabla g^*(-A^T\lambda_b^{(t)})\|_2 - \frac{1}{2\eta}\|\nabla g^*(-A^T\lambda_b^{(t)})\|_2 \le$$

$$g^*(-A^T\lambda_b^{(t)}) + \frac{1}{2\eta}\|\eta A^T(\lambda_b - \lambda_b^{(t)}) - \nabla g^*(-A^T\lambda_b^{(t)})\|_2$$

A proximal mapping function is defined as follows.

$$P_\eta(-A^T\lambda_b) = \underset{w_{i,b}}{\text{argmin}}\left\{\frac{1}{\eta}\delta_{(I-P)}(\lambda_b) + \frac{1}{2\eta}\|\eta A^T(\lambda_b - \lambda_b^{(t)}) - \nabla g^*(-A^T\lambda_b^{(t)})\|_2\right\}$$

From the definition of proximal mapping, the following relationship can be obtained.

$$\exists r_b \in \partial \delta_{(I-P)}(P_\eta(-A^T\lambda_b))$$

Then, $$\frac{1}{\eta}r_b + P_\eta(-A^T\lambda_b) + A^T\lambda_b + \frac{1}{\eta}\nabla g^*(-A^T\lambda_b) = 0,$$

$$r_b = -\eta A^T\lambda_b - \nabla g^*(-A^T\lambda_b) - \eta P_\eta(-A^T\lambda_b).$$

As g* is a $\eta$-smooth function, the following relationship is satisfied.

$$g^*(-A^T\lambda_b) - g^*(P_\eta(-A^T\lambda_b)) \ge$$

$$\langle \nabla g^*(-A^T\lambda_b), -A^T\lambda_b - P_\eta(-A^T\lambda_b)\rangle - \frac{\eta}{2}\|P_\eta(-A^T\lambda_b) + A^T\lambda_b\|_2$$

Then, the following relationship is satisfied.

$$G(-A^T\lambda_b^{(t)}) - G(P_\eta(-A^T\lambda_b)) =$$

$$g^*(-A^T\lambda_b^{(t)}) - g^*(P_\eta(-A^T\lambda_b)) + \delta_{(I-P)}(\lambda_b^{(t)}) - \delta_{(I-P)}(P_\eta(-A^T\lambda_b)) =$$

$$g^*(-A^T\lambda_b^{(t)}) - g^*(-A^T\lambda_b) + g^*(-A^T\lambda_b) - g^*(P_\eta(-A^T\lambda_b)) + \delta_{(I-P)}(\lambda_b^{(t)}) -$$

$$\delta_{(I-P)}(P_\eta(-A^T\lambda_b)) \ge \langle \nabla g^*(-A^T\lambda_b), -A^T\lambda_b^{(t)} + A^T\lambda_b\rangle +$$

$$\langle \nabla g^*(-A^T\lambda_b), -A^T\lambda_b - P_\eta(-A^T\lambda_b)\rangle -$$

-continued $$\frac{\eta}{2}\|P_\eta(-A^T\lambda_b) + A^T\lambda_b\|_2 + \langle r_b, -A^T\lambda_b^{(t)} - P_\eta(-A^T\lambda_b)\rangle =$$

$$\langle \nabla g^*(-A^T\lambda_b), -A^T\lambda_b^{(t)} + A^T\lambda_b - A^T\lambda_b - P_\eta(-A^T\lambda_b)\rangle +$$

$$\langle -\eta A^T\lambda_b - \nabla g^*(-A^T\lambda_b) - \eta P_\eta(-A^T\lambda_b), -A^T\lambda_b^{(t)} - P_\eta(-A^T\lambda_b)\rangle -$$

$$\frac{\eta}{2}\|P_\eta(-A^T\lambda_b) + A^T\lambda_b\|_2 =$$

$$\langle \eta(-A^T\lambda_b - P_\eta(-A^T\lambda_b)), -A^T\lambda_b^{(t)} - P_\eta(-A^T\lambda_b)\rangle -$$

$$\frac{\eta}{2}\|A^T\lambda_b\|_2 - \frac{\eta}{2}\|P_\eta(-A^T\lambda_b)\|_2 - \eta P_\eta(-A^T\lambda_b)^T A^T\lambda_b =$$

$$\frac{\eta}{2}\|P_\eta(-A^T\lambda_b)\|_2 - \frac{\eta}{2}\|A^T\lambda_b\|_2 + \eta P_\eta(-A^T\lambda_b)^T A^T\lambda_b^{(t)} +$$

$$\eta \lambda_b^T A \, A^T\lambda_b^{(t)} = \frac{\eta}{2}\|P_\eta(-A^T\lambda_b) + A^T\lambda_b^{(t)}\|_2 - \frac{\eta}{2}\|A^T\lambda_b^{(t)} - A^T\lambda_b\|_2$$

Substitutions:

$$\lambda_b \leftarrow \lambda_b^{(t-1)}, \lambda_b^{(t)} \leftarrow \lambda_b^*, -A^T\lambda_b^{(t)} = P_\eta(-A^T\lambda_b^{(t-1)}),$$

give the following relationship.

$$G(-A^T\lambda_b^*) - G(-A^T\lambda_b^{(t)}) \geq \frac{\eta}{2}\|A^T(\lambda_b^{(t)} - \lambda_b^*)\|_2 - \frac{\eta}{2}\|A^T(\lambda_b^{(t-1)} - \lambda_b^*)\|_2$$

G is made up of g*, which is a η-smooth function, and the indicator function δ having very strong convexity. Since the indicator function is contained in G, G can be said to be a function with strong convexity. Assuming that G is a ξ-strong convex function, the following is satisfied.

$$G(-A^T\lambda_b^{(t)}) - \frac{\xi}{2}\|A^T(-\lambda_b^* + \lambda_b^{(t)})\|_2 \geq G(-A^T\lambda_b^*)$$

Then, the following is satisfied.

$$-\frac{\xi}{2}\|A^T(-\lambda_b^* + \lambda_b^{(t)})\|_2 \geq G(-A^T\lambda_b^*) - G(-A^T\lambda_b^{(t)}) \geq$$

$$\frac{\eta}{2}\|A^T(\lambda_b^{(t)} - \lambda_b^*)\|_2 - \frac{\eta}{2}\|A^T(\lambda_b^{(t-1)} - \lambda_b^*)\|_2$$

Thus, the following is derived.

$$(\xi+\eta)\|A^T(\lambda_b^{(t)} - \lambda_b^*)\|_2 \geq \eta \|A^T(\lambda_b^{(t-1)} - \lambda_b^*)\|_2$$

Transforming the formula, the convergence rate is determined.

$$\|A^T(\lambda_b^{(t)} - \lambda_b^*)\|_2 \geq \left(\frac{\eta}{\eta+\xi}\right)^t \|A^T(\lambda_b^{(0)} - \lambda_b^*)\|_2$$

Since it is assumed that is a sufficiently great value and η is a sufficiently small value, the convergence rate is high. Additionally, as there is no variable that depends on the heterogeneity of data sets in the formula, it is supposed that convergence is reached without depending on the statistical properties of the data sets.

Second Embodiment

As shown in FIG. 5, the machine learning system includes multiple node portions 1, . . . , V, multiple sensor portions $1_{S1}, \ldots, 1_{S\alpha}, 2_{S1}, \ldots, 2_{S\beta}, V_{S1}, \ldots, V_{S\gamma}$, the internet $0_N$, and LANs $1_N, \ldots, V_N$, for example. Each of the multiple node portions 1, . . . , V is an information processing device such as a server or a PC. Each of the node portions 1, . . . , V has a learning unit 10 and a sending and receiving unit 11, with a storage 12 provided in the learning unit 10, as shown in FIG. 6. It is assumed that data necessary for the processing and calculations described below is stored in the storage 12.

The sensor portions $1_{S1}, \ldots, 1_{S\alpha}, 2_{S1}, \ldots, 2_{S\beta}, V_{S1}, \ldots, V_{S\gamma}$ are a multitude of sensors (for example, microphones, cameras, and thermometers) which are placed in a distributed manner across various environments (for example, houses, factories, outdoors, and buildings). In the example of FIG. 5, the sensor portions $1_{S1}, \ldots, 1_{S\alpha}$ are sensors corresponding to the node portion 1. That is, the sensor portions $1_{S1}, \ldots, 1_{S\alpha}$ are sensors for acquiring data to be used in machine learning at the learning unit 10 of the node portion 1, each of the sensor portions $1_{S1}, \ldots, 1_{S\gamma}$ being connected with the node portion 1 by the LAN $1_N$. The same applies to the other sensor portions. Data acquired through those sensor portions $1_{S1}, \ldots, 1_{S\alpha}, 2_{S1}, \ldots, 2_{S\beta}, V_{S1}, \ldots, V_{S\gamma}$ are accumulated in the multiple node portions 1, . . . , V (for example, servers and PCs). Note that data is not limited to those acquired from the sensor portions $1_{S1}, \ldots, 1_{S\alpha}, 2_{S1}, \ldots, 2_{S\beta}, V_{S1}, \ldots, V_{S\gamma}$ but may be character data and the like acquired from input devices, Web, or the like. Also, while the sensor portions $1_{S1}, \ldots, 1_{S\alpha}, 2_{S1}, \ldots, 2_{S\beta}, V_{S1}, \ldots, V_{S\gamma}$ are connected with the node portions 1, . . . , V by the LANs $1_N, \ldots, V_N$ in the example of FIG. 5, the sensor portions $1_{S1}, \ldots, 1_{S\alpha}, 2_{S1}, \ldots, 2_{S\beta}, V_{S1}, \ldots, V_{S\gamma}$ may also be connected with the node portions 1, . . . , V over the internet $0_N$ or by any other means of connection; what is required is that data acquired by the sensor portions $1_{S1}, \ldots, 1_{S\alpha}, 2_{S1}, \ldots, 2_{S\beta}, V_{S1}, \ldots, V_{S\gamma}$ is available for use by the node portions 1, . . . , V.

Although the node portions 1, . . . , V are connected over the internet ON in the example of FIG. 5, the node portions 1, . . . , V may also be loosely connected, instead of being fully connected; they only have to be in a relationship that allows exchange of some pieces of data between them. Connecting structure of the edges is not limited; it can be any structure such as a tree or cyclic/circle structure. In short, all the node portions 1, . . . , V are directly or indirectly connected. That is, the connecting structure of the edges is not a divided structure.

The multiple node portions 1, . . . , V perform a machine learning process as described below while receiving data from the sending and receiving unit 11, sending data from the sending and receiving unit 11, reading data from the storage 12, and writing data to the storage 12 as necessary. The machine learning process is implemented, for example, by the execution of the processing at step S1 to step S8 of FIG. 7 by the multiple node portions 1, . . . , V.

The node portions 1, . . . , V set t=0 (step S1).

The node portion i (more particularly, the learning unit 10 of the node portion i) performs an update of the dual variable according to the formula below using data acquired by the sensor portion corresponding to the node portion i (step S2). That is, the node portion i performs the calculation of $\lambda_{ij,b}^{(t+1)}$ defined by the formula below, for each of i∈~V, j∈~N(i), and b∈~B.

for $i \in \tilde{V}, j \in \tilde{N}(i), b \in \tilde{B}$, $$\lambda_{i|j,b}^{(t+1)} = \left(\frac{1}{\sigma_1}I + \eta A_{i|j}A_{i|j}^T\right)^{-1}\left[A_{i|j}(w_{i,b}^{(t)} - \eta \nabla f_i(w_{i,b}^{(t)})) + \frac{1}{\sigma_1}z_{i|j,b}^{(t)}\right]$$

The node portion i (more particularly, the learning unit 10 of the node portion i) performs an update of the primal variable according to the formula below (step S3). That is, the node portion i performs the calculation of $w_{i,b}^{(t+1)}$ defined by the formula below, for each of $i \in \tilde{V}$ and $b \in \tilde{B}$.

for $i \in \tilde{V}, b \in \tilde{B}$, $$w_{i,b}^{(t+1)} = w_{i,b}^{(t)} - \eta\left(\nabla f_i(w_{i,b}^{(t)}) + \sum_{j \in \tilde{N}(i)} A_{i|j}^T \lambda_{i|j,b}^{(t+1)}\right)$$

The node portion i (more particularly, the learning unit 10 of the node portion i) performs an update of the dual auxiliary variable according to the formula below (step S4). That is, the node portion i performs the calculation of $y_{i|j,b}^{(t+1)}$ defined by the formula below, for each of $i \in \tilde{V}$, $j \in \tilde{N}(i)$, and $b \in \tilde{B}$. This processing at step S4 need not be performed except for a case where the dual auxiliary variable $y_{i|j,b}^{(t+1)}$ is sent at step S5.

for $i \in \tilde{V}, j \in \tilde{N}(i), b \in \tilde{B}$, $$y_{i|j,b}^{(t+1)} = 2\lambda_{i|j,b}^{(t+1)} - z_{i|j,b}^{(t+1)},$$

The node portion i (more particularly, the sending and receiving unit 11 of the node portion i) performs at least either one of processing for sending the dual auxiliary variable $y_{i|j,b}^{(t+1)}$ to another node portion j and processing for receiving a dual auxiliary variable $y_{j|i,b}^{(t+1)}$ sent by another node portion j, that is, information is exchanged between the node portions as shown by the formula below (step S5). For example, the node portion i operates to send the dual auxiliary variable $y_{i|j,b}^{(t+1)}$ acquired by the learning unit 10 of the node portion i to the node portion j from the sending and receiving unit 11 of the node portion i, and to input the dual auxiliary variable received by the sending and receiving unit 11 of the node portion i from the node portion j into the learning unit 10 of the node portion i as the dual auxiliary variable $y_{j|i,b}^{(t+1)}$. Note that the processing at step S5 need not be performed every time and can be done asynchronously between nodes. For example, all the node portions i may perform both the processing for sending the dual auxiliary variable $y_{i|j,b}^{(t+1)}$ acquired by the node portion i to another node portion j and the processing for receiving the dual auxiliary variable $y_{j|i,b}^{(t+1)}$ output by another node portion j only when t is an even number, and none of the node portion i may send or receive the dual auxiliary variable when t is an odd number. Also, rather than all the node portions i, j, only some of the node portions i may perform the processing shown by the formula below to only some of node portions j. In other words, with $i \in \tilde{V}$, $j \in \tilde{N}(i)$, and $b \in \tilde{B}$, at least one node portion i sends the dual auxiliary variable $y_{i|j,b}^{(t+1)}$ to at least one node portion j and receives the dual auxiliary variable $y_{j|i,b}^{(t+1)}$ output by the node portion j.

for $i \in \tilde{V}, j \in \tilde{N}(i), b \in \tilde{B}$, $\text{Node}_j \leftarrow \text{Node}_i(y_{i|j,b}^{(t+1)})$ The node portion i (more particularly, the learning unit 10 of the node portion i) performs an update of the dual auxiliary variable according to the formula below (step S6). That is, with $i \in \tilde{V}$, $j \in \tilde{N}(i)$, and $b \in \tilde{B}$, the node portion i performs processing for setting $z_{i|j,b}^{(t+1)} = y_{j|i,b}^{(t+1)}$. The processing at step S6 need not be performed except for a case where the dual auxiliary variable $y_{j|i,b}^{(t+1)}$ was received at step S5. That is, the processing at step S6 only needs to be performed by the node portion i that has received the dual auxiliary variable $y_{j|i,b}^{(t+1)}$.

for $i \in \tilde{V}, j \in \tilde{N}(i), b \in \tilde{B}$, $z_{i|j,b}^{(t+1)} = y_{j|i,b}^{(t+1)}$ The node portions 1, . . . , V set t=t+1 (step S7). That is, the node portions 1, . . . , V increment t by one.

The node portions 1, . . . , V determine whether t=T (step S8), and if t=T, ends the processing. If not t=T, it returns to the processing at step S2.

In this manner, in a machine learning system including multiple node portions which have input data stored therein and which learn mapping using the primal variable by machine learning based on teaching data and the above-described input data while sending and receiving information to and from each other, machine learning is performed so as to minimize, instead of a cost function used in machine learning, a proxy convex function serving as the upper bound on the cost function. In other words, in a machine learning method including a step in which a plurality of node portions learn mapping that uses one common primal variable by machine learning based on their respective input data while sending and receiving information to and from each other, the plurality of node portions perform the machine learning so as to minimize, instead of a cost function of a non-convex function originally corresponding to the machine learning, a proxy convex function serving as an upper bound on the cost function.

The proxy convex function is represented by a formula of a first-order gradient of the cost function with respect to the primal variable or by a formula of a first-order gradient and a formula of a second-order gradient of the cost function with respect to the primal variable.

By using a proxy convex function serving as the upper bound on the cost function instead of the cost function, machine learning can be performed even when the cost function is not a convex function. The primal variable is not sent and received between node portions i, so that machine learning of higher confidentiality than conventional techniques can be effected.

MODIFICATIONS

First Modification

With i=1, . . . , V, $D_i$ pieces of data are accumulated in the node portion i; however, $D_i$ may change with time, which can address online optimization as well. Then, the cost function can be written as:

$$f_i(w_{i,b}) = \sum_{d=1}^{D_i} \frac{1}{2}\|s_{i,d,b} - x_{i,d}^T w_{i,b}\|_2.$$

Second Modification

At step S5, the node portion i may send and receive the dual variable $\lambda_{i|j,b}^{(t+1)}$, not the dual auxiliary variable $y_{i|j,b}^{(t+1)}$.

In that case, processing at step S6 is not performed. Processing at the steps other than step S6 is performed as described above.

Third Modification

In the following, an arrangement for compressing the transmission volume is described.

As an optimization process converges, an update difference approaches 0. By making use of this nature to perform a lossy compression process, the transmission volume would be further kept low.

While various methods are conceivable for compressing information, when based on the idea of transmitting the update difference to each other, there are (i) a flooring-based compression process and (ii) an entropy coding-based compression process.

First, assuming that reference data is updated from time to time, difference data relative to the data is defined as a variable v. Here, $v_{i|j,b}^{(t+1)}$ is update difference information. The $v_{i|j,b}^{(t+1)}$ tends to tilt toward a number close to 0 as convergence proceeds. The $v_{i|j,b}^{(t+1)}$ is the very information to be exchanged between nodes. $m_{i|j,b}^{(export)}$ is reference information already acquired.

$$v_{i|j,b}^{(t+1)} = y_{i|j,b}^{(t+1)} - m_{i|j,b}^{(export)},$$

To this v, a compression process C is applied.

$$u_{i|j,b}^{(t+1)} = C(v_{i|j,b}^{(t+1)})$$

(i) In the case of the flooring-based compression process, processing like comparing each of the elements constituting v with a threshold thr and setting it to 0 if it is equal to or smaller than the threshold is performed. thr is a predetermined number greater than 0 and a very small number such as $1 \times 10^{-5}$.

$$C(V_{i|j,b,l}^{(t+1)}) = \begin{cases} V_{i|j,b,l}^{(t+1)}, & (|V_{i|j,b,l}^{(t+1)}| > thr) \\ 0, & (\text{otherwise}) \end{cases}$$

(ii) In the case of the entropy coding-based compression process, u is generated by performing processing like assigning a symbol in accordance with a probability of appearance. For example, u is generated by assigning a short symbol when the probability of appearance is relative to the value.

Then, the consensus algorithm for the case of describing the cost function in general form will be as follows.

Assuming that updates are to be made T times, processing from (1) to (10) below is performed for $t \in \{0, \ldots, T-1\}$.

(1) Update the dual variables for $i \in \tilde{V}, j \in \tilde{N}(i), b \in \tilde{B}$, $$\lambda_{i|j,b}^{(t+1)} = \left(\frac{1}{\sigma_1}I + \eta A_{i|j}A_{i|j}^T\right)^{-1}\left[A_{i|j}(w_{i,b}^{(t)} - \eta \nabla f_i(w_{i,b}^{(t)})) + \frac{1}{\sigma_1}z_{i|j,b}^{(t)}\right]$$

(2) Update the primal variable for $i \in \tilde{V}, b \in \tilde{B}$, $$w_{i,b}^{(t+1)} = w_{i,b}^{(t)} - \eta\left(\nabla f_i(w_{i,b}^{(t)}) + \sum_{j \in \tilde{N}(i)} A_{i|j}^T \lambda_{i|j,b}^{(t+1)}\right)$$

(3) Update the dual auxiliary variable for $i \in \tilde{V}, j \in \tilde{N}(i), b \in \tilde{B}$, $$y_{i|j,b}^{(t+1)} = 2\lambda_{i|j,b}^{(t+1)} - z_{i|j,b}^{(t+1)},$$

When mod $(t, T_{interval})=0$ holds, processing from (4) to (6) below is performed. That is, the reference data is occasionally updated. Here, $T_{interval}$ is a predetermined positive integer.

(4) Update the reference data for $i \in \tilde{V}, j \in \tilde{N}(i), b \in \tilde{B}$, $$m_{i|j,b}^{(export)} = y_{i|j,b}^{(t+1)}, m_{i|j,b}^{(import)} = y_{j|i,b}^{(t+1)}$$

(5) Exchange information between nodes (which may be done independently for each edge (asynchronously)).

for $i \in \tilde{V}, j \in \tilde{N}(i), b \in \tilde{B}$, $$\text{Node}_j \leftarrow \text{Node}_i(m_{i|j,b}^{(export)})$$

(6) Update the dual auxiliary variable using the exchanged information for $i \in \tilde{V}, j \in \tilde{N}(i), b \in \tilde{B}$, $$z_{i|j,b}^{(t+1)} = m_{j|i,b}^{(import)}$$

If mod $(t, T_{interval})=0$ does not hold, processing from (7) to (10) below is performed. That is, the update difference is transmitted to each other at almost all times.

(7) Calculate the update difference for $i \in \tilde{V}, j \in \tilde{N}(i), b \in \tilde{B}$, $$v_{i|j,b}^{(t+1)} = y_{i|j,b}^{(t+1)} - m_{i|j,b}^{(export)},$$

(8) Compress data for $i \in \tilde{V}, j \in \tilde{N}(i), b \in \tilde{B}$, $$u_{i|j,b}^{(t+1)} = C(v_{i|j,b}^{(t+1)})$$

(9) Exchange the compressed data between nodes for $i \in \tilde{V}, j \in \tilde{N}(i), b \in \tilde{B}$, $$z_{i|j,b}^{(t+1)} = m_{j|i,b}^{(import)} + u_{j|i,b}^{(t+1)}$$

(10) Update the dual auxiliary variable using the exchanged information for $i \in \tilde{V}, j \in \tilde{N}(i), b \in \tilde{B}$, $$z_{i|j,b}^{(t+1)} = m_{j|i,b}^{(import)} + u_{j|i,b}^{(t+1)}$$

To reduce the transmission volume in this manner, in the above-described embodiment, the node portion i may perform processing from step S9 to step S16 as described below instead of the processing from step S5 to step S6. As the other processing is similar to those in the embodiment above, overlapping descriptions are omitted here. FIG. 8 shows a flow diagram of an example of a machine learning method with the transmission volume reduced.

The node portions 1, . . . , V determine whether mod $(t, T_{interval})=0$ (step S9).

If mod $(t, T_{interval})=0$ holds, the node portion i (more particularly, the learning unit 10 of the node portion i) performs an update of the reference data according to the formula below (step S10). That is, the node portion i performs an update of the reference data for each of $i \in \sim V$, $j \in \sim N(i)$, and $b \in \sim B$ according to the formula below (step S10).

for $i \in \tilde{V}, j \in \tilde{N}(i), b \in \tilde{B}$, $$m_{i|j,b}^{(export)} = y_{i|j,b}^{(t+1)}, m_{i|j,b}^{(import)} = y_{j|i,b}^{(t+1)}$$

The node portion i (more particularly, the sending and receiving unit 11 of the node portion i) performs at least either one of processing for sending $m_{i|j,b}^{(export)}$ to another node portion j and processing for receiving $m_{j|i,b}^{(import)}$ sent by another node portion j, that is, information is exchanged between the node portions as shown by the formula below (step S11). For example, the node portion i operates to send the $m_{i|j,b}^{(export)}$ acquired by the learning unit 10 of the node portion i to the node portion j from the sending and receiving unit 11 of the node portion i, and to input the $m_{j|i,b}^{(import)}$ received by the sending and receiving unit 11 of the node portion i from the node portion j into the learning unit 10 of the node portion i. Also, rather than all the node portions i, j, only some of the node portions i may perform the processing shown by the formula below to only some of node portions j. In other words, with i∈~V, j∈~N(i), and b∈~B, at least one node portion i sends the $m_{i|j,b}^{(export)}$ to at least one node portion j and receives the $m_{j|i,b}^{(import)}$ output by the node portion j (step S11).

for $i \in \tilde{V}, j \in \tilde{N}(i), b \in \tilde{B}$,

Node$_j$←Node$_i(m_{i|j,b}^{(export)})$

The node portion i (more particularly, the learning unit 10 of the node portion i) performs an update of the dual auxiliary variable $z_{i|j,b}^{(t+1)}$ using the exchanged information for each of i∈~V, j∈~N(i), and b∈~B as shown by the formula below (step S12).

for $i \in \tilde{V}, j \in \tilde{N}(i), b \in \tilde{B}$, $z_{i|j,b}^{(t+1)} = m_{j|i,b}^{(import)}$ If mod (t, $T_{interval}$)=0 does not hold, the node portion i (more particularly, the learning unit 10 of the node portion i) calculates the update difference according to the formula below (step S13). That is, the node portion i performs the calculation of $v_{i|j,b}^{(t+1)}$ defined by the formula below, for each of i∈~V, j∈~N(i), and b∈~B.

for $i \in \tilde{V}, j \in \tilde{N}(i), b \in \tilde{B}$, $v_{i|j,b}^{(t+1)} = y_{i|j,b}^{(t+1)} - m_{i|j,b}^{(export)}$, The node portion i (more particularly, the learning unit 10 of the node portion i) generates a code $m_{i|j,b}^{(t+1)}$ by compressing data according to the formula below for each of i∈~V, j∈~N(i), and b∈~B (step S14). This data compression may be lossy. Here, C means a predetermined compression process, such as the flooring-based compression process and entropy coding-based compression process.

for $i \in \tilde{V}, j \in \tilde{N}(i), b \in \tilde{B}$, $u_{i|j,b}^{(t+1)} = C(v_{i|j,b}^{(t+1)})$ The node portion i (more particularly, the sending and receiving unit 11 of the node portion i) performs at least either one of processing for sending $u_{i|j,b}^{(t+1)}$ to another node portion j and processing for receiving $u_{j|i,b}^{(t+1)}$ sent by another node portion j, that is, compressed data is exchanged between the node portions according to by the formula below (step S15). For example, the node portion i operates to send the $u_{i|j,b}^{(t+1)}$ acquired by the learning unit 10 of the node portion i to the node portion j from the sending and receiving unit 11 of the node portion i, and to input the $u_{j|i,b}^{(t+1)}$ received by the sending and receiving unit 11 of the node portion i from the node portion j into the learning unit 10 of the node portion i. Also, rather than all the node portions i, j, only some of the node portions i may perform the processing shown by the formula below to only some of node portions j. In other words, with i∈~V, j∈~N(i), and b∈~B, at least one node portion i sends the code $u_{i|j,b}^{(t+1)}$ to at least one node portion j and receives the code $u_{j|i,b}^{(t+1)}$ output by the node portion j (step S15).

for $i \in \tilde{V}, j \in \tilde{N}(i), b \in \tilde{B}$,

Node$_j$←Node$_i(u_{i|j,b}^{(t+1)})$

The node portion i (more particularly, the learning unit 10 of the node portion i) performs an update of the dual auxiliary variable $z_{i|j,b}^{(t+1)}$ according to the formula below for each of i∈~V, j∈~N(i), and b∈~B (step S16).

for $i \in \tilde{V}, j \in \tilde{N}(i), b \in \tilde{B}$, $z_{i|j,b}^{(t+1)} = m_{j|i,b}^{(import)} + u_{j|i,b}^{(t+1)}$ At step 12, the node portion i may perform the D-R splitting-based update illustrated below. For β, ½ is typically used.

$z_{i|j,b}^{(t+1)} = \beta m_{i|j,b}^{(import)} + (1-\beta) z_{i|j,b}^{(t)} (0 \le \beta \le 1)$ At step S16, the node portion i may also perform the D-R splitting-based update illustrated below. For β, ½ is typically used.

$z_{i|j,b}^{(t+1)} = \beta(m_{i|j,b}^{(import)} + u_{j|i,b}^{(t+1)}) + (1-\beta) z_{i|j,b}^{(t)}$
$(0 \le \beta \le 1)$ It goes without saying that other modifications may be made within the scope of the present invention.

<<Programs and Recording Media>>

The machine learning system may be embodied by one computer. In this case, processing details of functions to be provided by the components of the machine learning system are described by a program. By the program then being executed on the computer, the processing of the machine learning system is embodied on the computer.

The program describing the processing details can be recorded on a computer-readable recording medium. The computer-readable recording medium may be any kind, such as a magnetic recording device, an optical disk, a magneto-optical recording medium, or a semiconductor memory.

Processing by the units may be configured by executing a predetermined program on a computer or at least part of the processing may be embodied with hardware.

Third and fourth embodiments as embodiments of the present invention are now described in detail. Components having the same functionality are given the same reference characters and overlapping descriptions are omitted.

Before describing the embodiments, notation used in the present specification is described.

The symbol "_" (an underscore) represents a subscript. For example, $x^{y\_z}$ means that $y_z$ is a superscript to x, and $x_{y\_z}$ means that $y_z$ is a subscript to x.

Technical Background

The present application uses a Bregman Resolvent operator or a Bregman Cayley operator, instead of using the Resolvent operator or the Cayley operator. That is, it configures a variable update rule based on monotone operator splitting with the Bregman Resolvent operator or the Bregman Cayley operator. This is described in more detail below.

1: Definitions of Bregman Resolvent Operator and Bregman Cayley Operator

First, Bregman divergence B is discussed. The Bregman divergence B is defined as shown below using a strictly convex function D, which is continuous and differentiable (hereinafter, a continuous and differentiable strictly convex function will be just called a strictly convex function).

$$B(w\|z)=D(w)-D(z)-\langle \partial D(z),w-z\rangle \quad (4\text{-}1)$$

The function D can be any strictly convex function. Euclidean distance is also a kind of Bregman divergence. For explicitly showing that the Bregman divergence B is defined using the function D, it is sometimes denoted as Bregman divergence $B_D$.

The strictly convex function D is a function having a sort of continuity. Specifically, the strictly convex function D has the properties of strong convex (SC) and Lipschitz smooth (LS). These properties can be represented as follows.

(Property 1) Using second-order Taylor expansion, the approximate formula below holds around a point w for the function D.

$$D(w+\delta)=D(w)+\langle \partial D(w),\delta \rangle +\tfrac{1}{2}\langle H_D(w)\,\delta,\delta\rangle +o(\|\delta\|_2^2)$$
$$(\delta \to 0) \quad (4\text{-}2)$$

Here, the Hessian matrix $H_D(w)$ ($H_D(w) \in \mathbb{R}^{m \times m}$) is a positive definite matrix.

$$0 \prec H_D(w) \prec +\infty$$

For matrices A, B, the formula below indicates that matrix B−A is positive definite.

$$A \prec B$$

(Property 2) The LS (upper bound) and SC (lower bound) of the function D can be represented as below using an arbitrary vector $h \in \mathbb{R}^m$.

$$D(w)+\langle \partial D(w),h\rangle +\tfrac{1}{2}\langle K_D h,h\rangle \leq D(w+h) \quad (4\text{-}3)$$

$$D(w+h) \leq D(w)+\langle \partial D(w),h\rangle +\tfrac{1}{2}\langle M_D h,h\rangle \quad (4\text{-}4)$$

Here, the Hessian matrices $K_D$, $M_D$ ($K_D \in \mathbb{R}^{m \times m}$, $M_D \in \mathbb{R}^{m \times m}$) are positive definite matrices. With the Hessian matrix $H_D(w)$, the following relationship holds.

$$0 \prec K_D \preceq H_D(w) \preceq M_D \prec +\infty$$

Next, using the Bregman divergence, the Resolvent operator and the Cayley operator are generalized. The generalized Resolvent operator and the generalized Cayley operator are respectively called Bregman Resolvent operator and Bregman Cayley operator. For the Bregman Resolvent operator, description can be found in Reference Non-patent Literature 2.

(Reference Non-patent Literature 2: H. H. Bauschke, J. M. Borwein, and P. L. Combettes, "Bregman Monotone Optimization Algorithms", SIAM Journal on Control and Optimization, Vol. 42, Issue 2, pp. 596-636, 2003.)

A Bregman Resolvent operator $R_n$ and a Bregman Cayley operator $C_n$ are given by the formulas below.

$$R_n=(\partial D+\partial G_n)^{-1}\partial D$$

$$C_n=2R_n-I$$

Defining the function D with squared $L_2$ norm as below, the Bregman divergence B corresponds to Euclidean distance, and the Bregman Resolvent operator $R_n$ and the Bregman Cayley operator $C_n$ respectively correspond to the Resolvent operator $\Omega_n$ and the Cayley operator $\Psi_n$. This will be described more specifically. The subdifferential of the function D will be:

$$D(w)=\frac{1}{2\kappa}\|w\|_2^2$$

$$\partial D = \frac{1}{\kappa}I.$$

Substituting the subdifferential of the function D into the Bregman Resolvent operator $R_n$ and the Bregman Cayley operator $C_n$ gives the Resolvent operator $\Omega_n$ and the Cayley operator $\Psi_n$, respectively.

$$R_n=(\partial D+\partial G_n)^{-1}\partial D = \left(\frac{1}{\kappa}(I+\kappa \partial G_n)\right)^{-1}\frac{1}{\kappa}I=(I+\kappa \partial G_n)^{-1}=\Omega_n$$

$$C_n=2R_n-I=2\Omega_n-I=\Psi_n$$

2: Convergence Rates of Bregman Resolvent Operator and Bregman Cayley Operator

Here, two cases are described regarding the convergence rates of the Bregman Resolvent operator and the Bregman Cayley operator.

[Case 1]: A function $G_1$ is a strictly convex function, that is, strong convex (SC) and Lipschitz smooth (LS).

Then, the following properties hold as mentioned earlier.

(Property 1) Using second-order Taylor expansion, the approximate formula below holds around a point w for the function $G_1$.

$$G_1(W+\delta)=G_1(w)+\langle \partial G_1(w),\delta\rangle +\tfrac{1}{2}\langle H_{G_1}(w)\,\delta,\delta\rangle +o$$
$$(\|\delta\|_2^2)\,(\delta \to 0) \quad (4\text{-}5)$$

(Property 2) The LS (upper bound) and SC (lower bound) of the function $G_1$ can be represented as below using an arbitrary vector $h \in \mathbb{R}^m$.

$$G_1(w)+\langle \partial G_1(w),h\rangle +\tfrac{1}{2}\langle K_{G_1}h,h\rangle \leq G_1(w+h) \quad (4\text{-}6)$$

$$G_1(w+h)\leq G_1(w)+\langle G_1(w),h\rangle +\tfrac{1}{2}\langle M_{G_1}h,h\rangle \quad (4\text{-}7)$$

Here, the Hessian matrices $H_{G\_1}(w)$, $K_{G\_1}$, $M_{G\_1}$ have the following relationship.

$$0 \prec K_{G_1} \preceq H_{G_1}(w) \preceq M_{G_1} \prec +\infty$$

Using these two properties, Theorem 1 and Theorem 2 below can be proved.

(Theorem 1) When the function $G_1$ is both SC and LS, the Bregman Resolvent operator $R_1$ has the following convergence rate.

$$\frac{1}{1+\sigma_{max,1}}\|z^t - z^{t-1}\|_2 \leq \quad (4\text{-}8)$$

$$\|R_1(z^t)-R_1(z^{t-1})\|_2 \leq \frac{1}{1+\sigma_{min,1}}\|z^t - z^{t-1}\|_2$$

The coefficients $\sigma_{max,1}$, $\sigma_{min,1}$ contained in Formula (4-8) are given by the formulas below. Here, $\Lambda_{max}$ represents the maximum eigenvalue and $\Lambda_{min}$ represents the minimum eigenvalue.

$$\sigma_{max,1}=\Lambda_{max}(K_D^{-1}M_{G_1}) \quad (4\text{-}9)$$

$$\sigma_{min,1}=\Lambda_{min}(M_D^{-1}K_{G_1}) \quad (4\text{-}10)$$

For the strictly convex function D, one that satisfies the following condition is used.

$$0<\sigma_{min,1}\leq \sigma_{max,1}\leq 1 \quad (4\text{-}11)$$

(Theorem 2) When the function $G_1$ is both SC and LS, the Bregman Cayley operator $C_1$ has the following convergence rate.

$$\|C_1(z^t)-C_1(z^{t-1})\|_2^2 \le \eta_1 \|z^t-z^{t-1}\|_2^2 \quad (4\text{-}12)$$

The coefficient $\eta_1$ contained in Formula (4-12) is given by the formula below.

$$\eta_1 = 1 - \frac{4\sigma_{min,1}}{(1+\sigma_{max,1})^2} \quad (4\text{-}13)$$

The coefficients $\sigma_{max,1}$, $\sigma_{min,1}$ are respectively given by Formula (4-9) and Formula (4-10).

[Case 2]: The functions $G_1$, $G_2$ are both strictly convex functions, that is, both are strong convex (SC) and Lipschitz smooth (LS).

For the function $G_1$, the properties 1 and 2 represented by Formulas (4-5) to (4-7) hold. Similarly, for the function $G_2$, the properties 1 and 2 represented by Formulas (4-14) to (4-16) hold.

(Property 1) Using second-order Taylor expansion, the approximate formula below holds around a point w for the function $G_2$.

$$G_2(w+\delta) = G_2(w) + \langle \partial G_2(w), \delta \rangle + \tfrac{1}{2}\langle H_{G_2}(w)\,\delta, \delta \rangle + o(\|\delta\|_2^2)$$

$$(\delta \to 0) \quad (4\text{-}14)$$

(Property 2) The LS (upper bound) and SC (lower bound) of the function $G_2$ can be represented as below using an arbitrary vector $h \in \mathbb{R}^m$.

$$G_2(w) + \langle \partial G_2(w), h \rangle + \tfrac{1}{2}\langle K_{G_2} h, h \rangle \le G_2(w+h) \quad (4\text{-}15)$$

$$G_2(w+h) \le G_2(w) + \langle \partial G_2(w), h \rangle + \tfrac{1}{2}\langle M_{G_2} h, h \rangle \quad (4\text{-}16)$$

Here, the Hessian matrices $H_{G\_2}(w)$, $K_{G\_2}$, $M_{G\_2}$ have the following relationship.

$$O \prec K_{G_2} \preceq H_{G_2}(w) \preceq M_{G_2} \prec +\infty$$

A theorem similar to Theorem 1 and Theorem 2, which hold for the function $G_1$, also holds for the function $G_2$.

(Theorem 3) When the function $G_2$ is both SC and LS, the Bregman Resolvent operator $R_2$ has the following convergence rate.

$$\frac{1}{1+\sigma_{max,2}}\|x^t-x^{t-1}\|_2 \le \quad (4\text{-}17)$$

$$\|R_2(x^t)-R_2(x^{t-1})\|_2 \le \frac{1}{1+\sigma_{min,2}}\|x^t-x^{t-1}\|_2$$

The coefficients $\sigma_{max,2}$, $\sigma_{min,2}$ contained in Formula (4-17) are given by the formulas below.

$$\sigma_{max,2} = \Lambda_{max}(K_D^{-1} M_{G_2}) \quad (4\text{-}18)$$

$$\sigma_{min,2} = \Lambda_{min}(M_D^{-1} K_{G_2}) \quad (4\text{-}19)$$

For the strictly convex function D, one that satisfies the following condition is used.

$$0 \le \sigma_{min,2} \le \sigma_{max,2} \le 1$$

(Theorem 4) When the function $G_2$ is both SC and LS, the Bregman Cayley operator $C_2$ has the following convergence rate.

$$\|C_2(x^t)-C_2(x^{t-1})\|_2^2 \le \eta_2 \|x^t-x^{t-1}\|_2^2 \quad (4\text{-}20)$$

The coefficient $\eta_2$ contained in Formula (4-20) is given by the formula below.

$$\eta_2 = 1 - \frac{4\sigma_{min,2}}{(1+\sigma_{max,2})^2} \quad (4\text{-}21)$$

The coefficients $\sigma_{max,2}$, $\sigma_{min,2}$ are respectively given by Formula (4-18) and Formula (4-19).

3: Variable Update Rules of Generalized P-R Type Monotone Operator Splitting And Generalized D-R Type Monotone Operator Splitting and their Convergence Rates By transforming Formula (1-2) using the Bregman Resolvent operator and the Bregman Cayley operator, P-R type monotone operator splitting and D-R type monotone operator splitting are derived. The P-R type monotone operator splitting and D-R type monotone operator splitting described herein correspond to generalization of P-R type monotone operator splitting and D-R type monotone operator splitting by means of Bregman divergence. In the following, they will be respectively called generalized P-R type monotone operator splitting and generalized D-R type monotone operator splitting.

[Generalized P-R Type Monotone Operator Splitting]

Formula (1-2) is transformed in the following manner.

$$0 \in \partial G_1(w) + \partial G_2(w)$$

$$0 \in (\partial D + \partial G_2)(w) - (\partial D - \partial G_1)(w)$$

$$0 \in \partial D^{-1}(\partial D + \partial G_2)(w) - \partial D^{-1}(2\partial D - (\partial D + \partial G_1))(w)$$

$$0 \in \partial D^{-1}(\partial D + \partial G_2)(w) - \{2(\partial D + \partial G_1)^{-1}\partial D - I\}\partial D^{-1}(\partial D + \partial G_1)(w) \quad (1\text{-}2)$$

Here, an auxiliary variable z ($z \in \mathbb{R}^m$) for w ($w \in \mathbb{R}^m$) having the relationship below is introduced.

$$w \in R_1(z)$$

This is further transformed with the variable z.

$$0 \in \partial D^{-1}(\partial D + \partial G_2) R_1(z) - C_1(z)$$

$$0 \in R_1(z) - R_2 C_1(z)$$

$$0 \in \tfrac{1}{2}(C_1+I)(z) - \tfrac{1}{2}(C_2+I)C_1(z)$$

$$0 \in z - C_2 C_1(z)$$

This provides generalized P-R type monotone operator splitting as shown below.

$$z \in C_2 C_1(z) \quad (4\text{-}22)$$

From Formula (4-22) and Formula (3-1), it can be seen that Formula (3-1) with its Cayley operator replaced with the Bregman Cayley operator represents Formula (4-22).

The variable update rule for generalized P-R type monotone operator splitting is obtained by decomposing Formula (4-22) with the auxiliary variables x, y, z ($x \in \mathbb{R}^m$, $y \in \mathbb{R}^m$, $z \in \mathbb{R}^m$) for w ($\in \mathbb{R}^m$).

$$w^{t+1} = R_1(z^t) = (\partial D + \partial G_1)^{-1}\partial D(z^t) \quad (4\text{-}23)$$

$$x^{t+1} = C_1(z^t) = (2R_1-I)(z^t) = 2w^{t+1}-z^t \quad (4\text{-}24)$$

$$y^{t+1} = R_2(x^{t+1}) = (\partial D + \partial G_2)^{-1}\partial D(x^{t+1}) \quad (4\text{-}26)$$

$$z^{t+1} = C_2(x^{t+1}) = (2R_2-I)(x^{t+1}) = 2y^{t+1}-x^{t+1} \quad (4\text{-}26)$$

The operation of Formula (4-23) is substantiated. Specifically, it is transformed as follows.

$$(\partial D + \partial G_1)(w) \in \partial D(z)$$

$$0 \in \partial G_1(w) + \partial D(w) - \partial D(z)$$

Further rendering it into integral form gives the following.

$$w^{t+1} = \underset{w}{\mathrm{argmin}}(G_1(w) + B(w\|z^t)) \qquad (4\text{-}27)$$
$$= \underset{w}{\mathrm{argmin}}(G_1(w) + D(w) - \langle \partial D(z^t), w \rangle)$$

Similar substantiation of the operation of Formula (4-25) gives the following.

$$y^{t+1} = \underset{y}{\mathrm{argmin}}(G_2(y) + B(y\|x^{t+1})) \qquad (4\text{-}28)$$
$$= \underset{y}{\mathrm{argmin}}(G_2(y) + D(y) - \langle \partial D(x^{t+1}), y \rangle)$$

Next, the convergence rate of generalized P-R type monotone operator splitting is discussed. The convergence rate is derived for Case 1 and Case 2 separately. Case 1 is described first. For Case 1, only the nonexpansiveness of a Bregman Cayley operator $C_1$ can be assumed (that is, Theorem 2 holds but Theorem 4 does not hold). Therefore, from Formulas (4-23) to (4-26), the convergence rate of $z^t$ is represented by the inequality below.

$$\|z^{t+1} - z^t\|_2^2 \leq \eta_1 \|z^t - z^{t-1}\|_2^2 \qquad (4\text{-}29)$$

From Formula (4-29), the error between $z^t$ and the stationary point $z^*$ of $z$ can be evaluated as follows.

$$\|z^t - z^*\|_2^2 = \|z^t - z^{t+1} + z^{t+1} - z^{t+2} + \ldots - z^*\|_2^2 \leq \sum_{l=t}^{\infty} \|z^l - z^{l+1}\|_2^2 \leq \qquad (4\text{-}30)$$
$$\left(\sum_{j=1}^{\infty} \eta_1^j\right)\|z^{t+1} - z^{t+2}\|_2^2 = \frac{\eta_1}{1-\eta_1}\|z^{t+1} - z^{t+2}\|_2^2$$

Similarly, the error between $z^{t+}$ and the stationary point $z^*$ of $z$ can be evaluated as follows.

$$\|z^{t+1} - z^*\|_2^2 = \qquad (4\text{-}31)$$
$$\|z^{t+1} - z^{t+2} + z^{t+2} - z^{t+3} + \ldots - z^*\|_2^2 \leq \sum_{l=t}^{\infty} \|z^{l+1} - z^{l+2}\|_2^2 \leq$$
$$\left(\sum_{j=0}^{\infty} \eta_1^j\right)\|z^{t+1} - z^{t+2}\|_2^2 = \frac{1}{1-\eta_1}\|z^{t+1} - z^{t+2}\|_2^2$$

From Formula (4-30) and Formula (4-31), the following relationship is obtained.

$$\|z^{t+1} - z^*\|_2^2 \leq \eta_1 \|z^t - z^*\|_2^2 \qquad (4\text{-}32)$$

Thus, the error (convergence rate) after going through t updates is represented by the following.

$$\|z^t - z^*\|_2^2 \leq \eta_1^t \|z^0 - z^*\|_2^2 \qquad (4\text{-}33)$$

Next, Case 2 is discussed. For Case 2, the nonexpansiveness of the Bregman Cayley operators $C_1, C_2$ can be ensured (that is, both Theorem 2 and Theorem 4 hold). Therefore, from Formulas (4-23) to (4-26), the convergence rate of $z^t$ is represented by the inequality below.

$$\|z^{t+1} - z^t\|_2^2 \leq \eta_1 \eta_2 \|z^t - z^{t-1}\|_2^2 \qquad (4\text{-}34)$$

As with Case 1, the following relationship is obtained.

$$\|z^{t+1} - z^*\|_2^2 \leq \eta_1 \eta_2 \|z^t - z^*\|_2^2 \qquad (4\text{-}35)$$

$$\|z^t - z^*\|_2^2 \leq (\eta_1 \eta_2)^t \|z^0 - z^*\|_2^2 \qquad (4\text{-}36)$$

As can be seen from Formula (4-33) and Formula (4-36), the convergence rate can be increased both in Case 1 and Case 2 if $\eta_i$ can be made small.

[Generalized D-R Type Monotone Operator Splitting]

Generalized D-R type monotone operator splitting can be acquired by adding an averaging operator to Formula (4-22).

$$z \in \alpha C_2 C_1(z) + (1-\alpha)z (\alpha \in (0,1)) \qquad (4\text{-}37)$$

From Formula (4-37) and Formula (3-2), it can be seen that Formula (3-2) with its Cayley operator replaced with the Bregman Cayley operator represents Formula (4-37).

The variable update rule for generalized D-R type monotone operator splitting is obtained by decomposing Formula (4-37) with the auxiliary variables x, y, z ($x \in \mathbb{R}^m$, $y \in \mathbb{R}^m$, $z \in \mathbb{R}^m$) for w ($\in \mathbb{R}^m$).

$$w^{t+1} = R_1(z^t) = (\partial D + \partial G_1)^{-1} \partial D(z^t) \qquad (4\text{-}38)$$

$$x^{t+1} = C_1(z^t) = (2R_1 - I)(z^t) = 2w^{t+1} - z^t \qquad (4\text{-}39)$$

$$y^{t+1} = R_2(x^{t+1}) = (\partial D + \partial G_2)^{-1} \partial D(x^{t+1}) \qquad (4\text{-}40)$$

$$z^{t+1} = \alpha C_2(x^{t+1}) + (1-\alpha)z^t \qquad (4\text{-}41)$$
$$= \alpha(2y^{t+1} - x^{t+1}) + (1-\alpha)z^t$$

Next, the convergence rate of generalized D-R type monotone operator splitting is discussed. The convergence rate is derived for Case 1 and Case 2 separately. Case 1 is described first. For Case 1, only the nonexpansiveness of a Bregman Cayley operator $C_1$ can be assumed (that is, Theorem 2 holds but Theorem 4 does not hold). Therefore, from Formulas (4-38) to (4-41), the convergence rate of $z^t$ is represented by the inequality below.

$$\|z^{t+1} - z^*\|_2^2 = \|\alpha C_2 C_1(z^t) + (1-\alpha)z^t - z^*\|_2^2 \leq \qquad (4\text{-}42)$$
$$\alpha \|C_2 C_1(z^t) - z^*\|_2^2 + (1-\alpha)\|z^t - z^*\|_2^2 \leq$$
$$\alpha \eta_1 \|z^t - z^*\|_2^2 + (1-\alpha)\|z^t - z^*\|_2^2 = (1-\alpha+\alpha\eta_1)\|z^t - z^*\|_2^2$$

Thus, the error (convergence rate) after going through t updates is represented by the following.

$$\|z^t - z^*\|_2^2 \leq (1-\alpha+\alpha\eta_1)^t \|z^0 - z^*\|_2^2 \qquad (4\text{-}43)$$

Next, Case 2 is discussed. For Case 2, the nonexpansiveness of the Bregman Cayley operators $C_1, C_2$ can be ensured (that is, both Theorem 2 and Theorem 4 hold). Therefore, from Formulas (4-38) to (4-41), the convergence rate of $z^t$ is represented by the inequality below.

$$\|z^{t+1} - z^*\|_2^2 \leq (1-\alpha+\alpha\eta_1)\|z^t - z^*\|_2^2 \qquad (4\text{-}44)$$

$$\|z^t - z^*\|_2^2 \leq (1-\alpha+\alpha\eta_1)^t \|z^0 - z^*\|_2^2 \qquad (4\text{-}45)$$

As can be seen from Formula (4-43) and Formula (4-45), if $\eta_i$ can be made small, the convergence rate can be increased by bringing α close to 1 in both Case 1 and Case 2. Bringing α close to 1 means bringing generalized D-R type monotone operator splitting close to generalized P-R type monotone operator splitting.

<<4: Bregman Divergence Design for Gaining High Convergence Rate>>

An optimal solution can be determined by using a variable update rule based on generalized P-R type monotone operator splitting or generalized D-R type monotone operator splitting. Herein, design of Bregman divergence (design of the function D) with which the optimal solution can be determined faster is described. Specifically, two design methods are shown.

First, results from the foregoing discussion are summarized. In both Case 1 and Case 2, by bringing $\eta_1$ given by Formula (4-13) and 12 given by Formula (4-21) close to 0, the optimal solution is converged at a high convergence rate either with the variable update rule by generalized P-R type monotone operator splitting or with the variable update rule by generalized D-R type monotone operator splitting.

$$\eta_1 = 1 - \frac{4\sigma_{min,1}}{(1+\sigma_{max,1})^2} (0 < \sigma_{min,1} \le \sigma_{max,1} \le 1) \quad (4\text{-}13)$$

$$\eta_2 = 1 - \frac{4\sigma_{min,2}}{(1+\sigma_{max,2})^2} (0 < \sigma_{min,2} \le \sigma_{max,2} \le 1) \quad (4\text{-}21)$$

Such bringing of $\eta_i$ close to 0 can be achieved by bringing eigenvalues $\sigma_{max,i}$, $\sigma_{min,i}$, given by Formulas (4-9), (4-10), (4-18), and (4-19), close to 1. Bringing both the maximum eigenvalue $\sigma_{max,i}$, and the minimum eigenvalue $\sigma_{min,i}$, close to 1 corresponds to smoothing of eigenvalue distribution.

$$\sigma_{max,i} = \sigma_{min,i} = 1 \quad (4\text{-}46)$$

In order to bring the eigenvalues close to 1, the design should be made such that the inverse matrix of the Hessian matrix $H_D$ of the function D will be the inverse matrix of a Hessian matrix $H_{G\_i}$ of the function $G_i$.

$$H_D^{-1}(w)H_{G_i}(w)=I \quad (4\text{-}47)$$

As the function $G_i$ is represented by the approximate formulas of Formulas (4-5) and (4-14), Formula (4-47) can be achieved by representing the function D in a quadratic like the one below and appropriately designing the Hessian matrix $H_D$.

$$D(w)=\tfrac{1}{2}\langle H_D(w)w,w\rangle \quad (4\text{-}48)$$

Substituting Formula (4-48) into Formula (4-1), which is the formula of definition of the Bregman divergence, gives the following.

$$B(w\|z)=D(w)-D(z)-\langle \partial D(z),w-z\rangle = \tfrac{1}{2}\langle H_D(z)(w-z), w-z\rangle \quad (4\text{-}49)$$

[Bregman Divergence Design Following Newton's Method]

In order to satisfy Formula (4-47) most faithfully in designing the Bregman divergence in accordance with Formula (4-49), the Hessian matrix $H_D$ should be designed so as to follow Formula (4-50). This design is analogous to Newton's method, which is well known as an optimization method for second-order convergence properties. Formula (4-50) may be replaced with an approximate calculation method for Hessian matrix, such as BFGS method.

The real number $\varepsilon>0$ corresponds to a parameter that determines the step size of learning and needs to be selected such that the eigenvalue of the Hessian matrix $H_D^{(2GD)}$ is in the range of greater than 0 and equal to or smaller than 1.

Also, while Formula (4-50) uses an arithmetic mean in (case2), a geometric means may be used instead of an arithmetic mean.

$$H_D^{(2GD)}(w) = \begin{cases} H_{G_1}(w) + \varepsilon I & (case1) \\ \sqrt{H_{G_1}(w) + H_{G_2}(w)} + \varepsilon I & (case2) \end{cases} \quad (4\text{-}50')$$

Formula (4-50) (Formula (4-50')) shows that the Hessian matrix $H_D$ is designed for Case 1 and Case 2 separately. In Case 2, it is ideal that Formula (4-47) is satisfied for both the functions $G_1$, $G_2$, but ensuring this is difficult in practice. Thus, for Case 2, design as in Formula (4-50) (Formula (4-50')) has been adopted. This design is preferable because the following mathematical property holds with regard to the Hessian matrix. This is described more specifically. First, the inverse matrix of the Hessian matrix $H_D$ is calculated.

$$H_D^{-1} = \left(\tfrac{1}{2}(H_{G_1} + H_{G_2})\right)^{-1}$$

$$= \tfrac{1}{2}H_{G_1}^{-1}(H_{G_1}^{-1} + H_{G_2}^{-1})^{-1}H_{G_2}^{-1}$$

$$= \tfrac{1}{2}H_{G_2}^{-1}(H_{G_1}^{-1} + H_{G_2}^{-1})^{-1}H_{G_1}^{-1}$$

Then, multiplication of $H_D^{-1}$ and $H_{G\_i}$ as in Formula (4-47) gives the following.

$$H_D^{-1}H_{G_1} = \tfrac{1}{2}(I + H_{G_1}^{-1}H_{G_2})^{-1}$$

$$H_D^{-1}H_{G_2} = \tfrac{1}{2}(I + H_{G_2}^{-1}H_{G_1})^{-1}$$

These two formulas show that Formula (4-47) is more likely to be satisfied as $H_{G\_1}$ and $H_{G\_2}$ are closer to each other.

[Bregman Divergence Design Following the Accelerated Gradient Method]

When the Bregman divergence design following Newton's method is used, the actual variable update rule requires calculation of the inverse matrix of the Hessian matrix $H_D$, which calculation involves very high cost. To overcome this calculation cost problem, the calculation cost for the inverse matrix of the Hessian matrix $H_D$ is to be decreased by trading off some of the reproducibility of Formula (4-47). As an example of such a design, Bregman divergence design following the accelerated gradient method is described. Briefly speaking, this design is to design the Hessian matrix $H_D$ so as to satisfy Formula (4-47) as much as possible while restricting the Hessian matrix $H_D$ to a diagonal matrix. This design is analogous to the accelerated gradient method, known as superlinear convergence.

Various methods for achieving the accelerated gradient method have been proposed. For example, they include momentum method, AdaGrad method, Adam method, and RMSProp method. Herein, design using the RMSProp method is described.

$$H_D^{(2GD)}(w) = \begin{cases} H_{G_1}(w) + \varepsilon I & (case1) \\ \tfrac{1}{2}(H_{G_1}(w) + H_{G_2}(w)) + \varepsilon I & (case2) \end{cases} \quad (4\text{-}50)$$

$$H_D^{(AGD)}(w) = \begin{cases} L_{G_1}(w) + \varepsilon I & (case1) \\ \tfrac{1}{2}(L_{G_1}(w) + L_{G_2}(w)) + \varepsilon I & (case2) \end{cases} \quad (4\text{-}51)$$

The real number ε>0 corresponds to a parameter that determines the step size of learning and needs to be selected such that the eigenvalue of the Hessian matrix $H_D^{(AGD)}$ is in the range of greater than 0 and equal to or smaller than 1.

Also, while Formula (4-51) uses an arithmetic mean in (case2), a geometric means may be used instead of an arithmetic mean.

$$H_D^{(AGD)}(w) = \begin{cases} L_{G_1}(w) + \varepsilon I & (case1) \\ \sqrt{L_{G_1}(w)L_{G_2}(w)} + \varepsilon I & (case2) \end{cases} \quad (4\text{-}51')$$

$L_{G\_1}$ and $L_{G\_2}$ are matrices that are basically assumed to be diagonal matrices, and are designed as follows in the RMSProp method.

$$L_{G_1}(w) \leftarrow \beta L_{G_1}(w) + (1-\beta)\text{diag}(\partial G_1(w)\partial G_1^T(w))$$
$$L_{G_2}(w) \leftarrow \beta L_{G_2}(w) + (1-\beta)\text{diag}(\partial G_2(w)\partial G_2^T(w))$$
$$(\beta \in (0,1))$$

However, if the calculation cost for the inverse matrix of the Hessian matrix $H_D$ can be traded off to some degree, $L_{G\_1}$ and $L_{G\_2}$ need not necessarily be diagonal matrices. They are designed as follows in the RMSProp method when using non-diagonal components as well.

$$L_{G_1}(w) \leftarrow \beta L_{G_1}(w) + (1-\beta)\partial G_1(w)\partial G_1^T(w)$$
$$L_{G_2}(w) \leftarrow \beta L_{G_2}(w) + (1-\beta)\partial G_2(w)\partial G_2^T(w)$$
$$(\beta \in (0,1))$$

<<5: Application to Consensus Problem in Edge Computing>>

In this section, taking the consensus problem in edge computing as an example, a variable updating algorithm which is a recursive variable update rule using monotone operator splitting generalized with Bregman divergence is described.

Recursive variable update rules corresponding to Formula (3-3) to Formula (3-6) are as follows.

$$w^{t+1} = R_1(z^t) \quad (4\text{-}52)$$
$$= \operatorname*{argmin}_{w}(F_1^*(A^T w) + D(w) - \langle \partial D(z^t), w \rangle)$$

$$\lambda^{t+1} = C_1(z^t) = 2w^{t+1} - z^t \quad (4\text{-}53)$$

$$z^{t+1} = \begin{cases} C_2(\lambda^{t+1}) = \partial D^{-1} P \partial D(\lambda^{t+1}) & (4\text{-}54) \\ \alpha C_2(\lambda^{t+1}) + (1-\alpha)z^t = \alpha \partial D^{-1} P \partial D(\lambda^{t+1}) + (1-\alpha)z^t & (4\text{-}55) \end{cases}$$

Formula (4-54) corresponds to generalized P-R type monotone operator splitting, and Formula (4-55) corresponds to generalized D-R type monotone operator splitting.

In the derivation of the variable update rule, the fact that the Bregman Cayley operator $C_2$ satisfies the formula below was employed. While the proof thereof is omitted herein, it is a result that can be gained by applying a proof strategy shown in Non-patent Literature 4 to the Bregman Cayley operator.

$$C_2 = \partial D^{-1} P \partial D \quad (4\text{-}56)$$

The subdifferential of the function D and the inverse operator thereof when using Formula (4-48) are as follows.

$$\partial D = H_D(z) \quad (4\text{-}57)$$

$$\partial D^{-1} = H_D^{-1}(z) \quad (4\text{-}58)$$

Here, the Hessian matrix $H_D(z)$ and the inverse matrix $H_D^{-1}(z)$ thereof are both block diagonalized matrices as shown below.

$$H_D(z) = \text{diag}([H_{D_{1|2}}(z), \ldots, H_{D_{1|V}}(z), H_{D_{2|1}}(z), \ldots, H_{D_{2|V}}(z), \ldots, H_{D_{V|1}}(z), \ldots, H_{D_{V|V-1}}(z)]) \quad (4\text{-}59)$$

$$H_D^{-1}(z) = \text{diag}([H_{D_{1|2}}^{-1}(z), \ldots, H_{D_{1|V}}^{-1}(z), H_{D_{2|1}}^{-1}(z), \ldots, H_{D_{2|V}}^{-1}(z), \ldots, H_{D_{V|1}}^{-1}(z), \ldots, H_{D_{V|V-1}}^{-1}(z)]) \quad (4\text{-}60)$$

In the following, an algorithm that allows the recursive variable update rules of Formulas (4-52) to (4-55) to update the variables for each node asynchronously is described. Formula (4-52) contains updating of the latent variable p and the dual variable w, and for handling of the latent variable p and the dual variable w, the two methods shown below are possible.

[Method 1]

This method performs optimization of p with a penalty term and then optimization of w, as with the conventional methods.

First, optimization of p is performed using a penalty term.

$$p^{t+1} = \operatorname*{argmin}_{p}\left(F_1(p) - \langle z^t, Ap \rangle + \frac{1}{2\gamma}\|Ap\|_2^2\right)(\gamma > 0) \quad (4\text{-}61)$$

Then, optimization of w is performed.

$$w^{t+1} = \operatorname*{argmin}_{w}(F_1^*(A^T w) + D(w) - \langle \partial D(z^t), w \rangle) = \quad (4\text{-}61')$$
$$\operatorname*{argmin}_{w}\left(\langle w, Ap^{t+1} \rangle - F_1(p^{t+1}) + \frac{1}{2}\langle H_D(z^t)w, w \rangle - \langle H_D(z^t)z^t, w \rangle\right) = z^t - H_D^{-1}(z^t)Ap^{t+1}$$

Substituting the result of Formula (4-61') into Formula (4-53) gives the update rule for the dual variable λ below.

$$\lambda^{t+1} = 2w^{t+1} - z^t = z^t - 2H_D^{-1}(z^t)Ap^{t+1} \quad (4\text{-}62)$$

This formula indicates that the dual variable λ can be obtained without using the dual variable w.

Specific representations of the variable update rules of Formulas (4-52) to (4-55) will be as follows.

$$p^{t+1} = \operatorname*{argmin}_{p}\left(F_1(p) - \langle z^t, Ap \rangle + \frac{1}{2\gamma}\|Ap\|_2^2\right) \quad (4\text{-}61)$$

$$\lambda^{t+1} = z^t - 2H_D^{-1}(z^t)Ap^{t+1} \quad (4\text{-}62)$$

$$\xi^{t+1} = PH_D(z^t)\lambda^{t+1} \quad (4\text{-}63)$$

$$z^{t+1} = \begin{cases} H_D^{-1}(z^t)\xi^{t+1} & (4\text{-}64) \\ \alpha H_D^{-1}(z^t)\xi^{t+1} + (1-\alpha)z^t & (4\text{-}65) \end{cases}$$

For Formula (4-54) and Formula (4-55), they have been divided into Formula (4-63), Formula (4-64), and Formula (4-65). This is for enabling updating of the variables for each node asynchronously.

Enabling these update rules to update the variables on a per-node basis provides the algorithm shown in FIG. 12. Preferably, the Hessian matrix $H_D$ in this algorithm is designed using Formula (4-50) or Formula (4-51).

[Method 2]

This method updates the dual variable w and, if necessary, updates the latent variable p.

To solve Formula (4-52), p is represented as a function of w and optimized. Using second-order Taylor expansion, a function $F_1$ is approximately represented as follows.

$$F_1(p) = F_1(p^t) + \langle \partial F_1(p^t), p - p^t \rangle + \tfrac{1}{2} \langle H_{F_1}(p^t)(p - p^t), p - p^t \rangle$$

Substituting this into the function $F_1^*$ gives an optimal value p(w) with p being a function of w as below.

$$p(w) = \operatorname*{argmin}_p (F_1(p) - \langle w, Ap \rangle) = \operatorname*{argmin}_p \Big( F_1(p^t) +$$

$$\langle \partial F_1(p^t), p - p^t \rangle + \frac{1}{2} \langle H_{F_1}(p^t)(p - p^t), p - p^t \rangle - \langle w, Ap \rangle \Big)$$

Differentiating the inside of the parentheses on the right side with respect to p and finding a point where it is 0 (that is, the optimal point) result in the following.

$$p(w) = p^t - H_{F_1}^{-1}(p^t)(\partial F_1(p^t) - A^T w) \quad (4\text{-}66)$$

Substituting this into Formula (4-52) gives an update formula of w.

$$w^{t+1} = \operatorname*{argmin}_w (F_1^*(A^T w) + D(w) - \langle \partial D(z^t), w \rangle) =$$

$$\operatorname*{argmin}_w \Big( \langle w, Ap(w) \rangle - F_1(p(w)) + \frac{1}{2} \langle H_D(z^t)w, w \rangle - \langle H_D(z^t)z^t, w \rangle \Big)$$

Differentiating the inside of the parentheses on the right side with respect to w and finding a point where it is 0 (that is, the optimal point) result in the following.

$$w^{t+1} = z^t - H_D^{-1}(z^t)(A(p^t - H_{F_1}^{-1}(p^t)\partial F_1(p^t))) \quad (4\text{-}67)$$

As p is represented as a function of w from Formula (4-66), the update formula of p will be as follows.

$$p^{t+1} = p^t - H_{F_1}^{-1}(p^t)(\partial F_1(p^t) - A^T w^{t+1}) \quad (4\text{-}68)$$

Substituting Formula (4-67) into Formula (4-53) gives the following update formula.

$$\lambda^{t+1} = 2w^{t+1} - z^t = z^t - 2H_D^{-1}(z^t)(A(p^t - H_{F_1}^{-1}(p^t)\partial F_1(p^t))) \quad (4\text{-}69)$$

Specific representations of the variable update rules from Formula (4-68), Formula (4-69), Formula (4-54), and Formula (4-55) will be as follows.

$$\lambda^{t+1} = z^t - 2H_D^{-1}(z^t)\big(A\big(p^t - H_{F_1}^{-1}(p^t)\partial F_1(p^t)\big)\big) \quad (4\text{-}70)$$

$$p^{t+1} = p^t - H_{F_1}^{-1}(p^t)(\partial F_1(p^t) - A^T w^{t+1}) \quad (4\text{-}71)$$

$$\xi^{t+1} = PH_D(z^t)\lambda^{t+1} \quad (4\text{-}72)$$

$$z^{t+1} = \begin{cases} H_D^{-1}(z^t)\xi^{t+1} & (4\text{-}73) \\ \alpha H_D^{-1}(z^t)\xi^{t+1} + (1-\alpha)z^t & (4\text{-}74) \end{cases}$$

Enabling these update rules to update the variables on a per-node basis provides the algorithm shown in FIG. 13. Preferably, the Hessian matrix $H_D$ in this algorithm is designed using Formula (4-50) or Formula (4-51).

Comparing the algorithm of FIG. 12 with that of FIG. 13, there is difference in the variables that are exchanged between nodes. That is, in the algorithm of FIG. 12, the latent variable and a transformation of the dual variable are exchanged, whereas in the algorithm of FIG. 13, only a transformation of the dual variable is exchanged. Requiring only a transformation of the dual variable to be exchanged, the algorithm of FIG. 13 can be said to be superior to the algorithm of FIG. 12 in terms of concealing/encryption of information.

6: Experiment and Results Thereof

Figure 14:
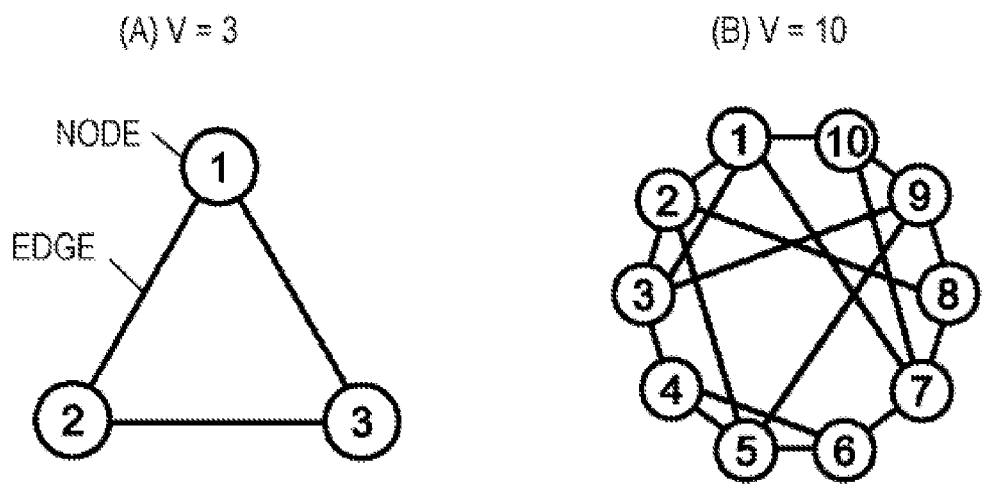
FIG. 14 shows structures of distributed computers used in an experiment.

In order to verify the effect of the variable update rule described thus far, an experiment on the convergence rate was conducted. In the experiment, a distributed computer (an edge computing system) having two kinds of graph structures as shown in FIG. 14 was used. A randomly generated, different data set was placed at each node of the distributed computer, and the convergence rate of the latent variable was measured.

For the cost function $F_1$, the following was used.

$$F_1(P) = \sum_{i \in v} \sum_{u \in u(i)} \frac{1}{2VU(i)} \|s_{i,u} - p_i^T v_{i,u}\|_2^2$$

Here, $v_{i,u}$ and $s_{i,u}$ are the tuple of input data and teaching data at the node i, and $p_i$ is the latent variable at the node i.

For a metric to measure an error of the latent variable, the following was used.

$$E^t = \sum_{i \in v} \frac{1}{2Vm} \|p^* - p_i^t\|_2^2$$

Here, $p^*$ is the optimal value of the latent variable p, $p_i^t$ is the value of the latent variable at the node i obtained after t updates, and $m = p^*V$ holds.

Figure 15:
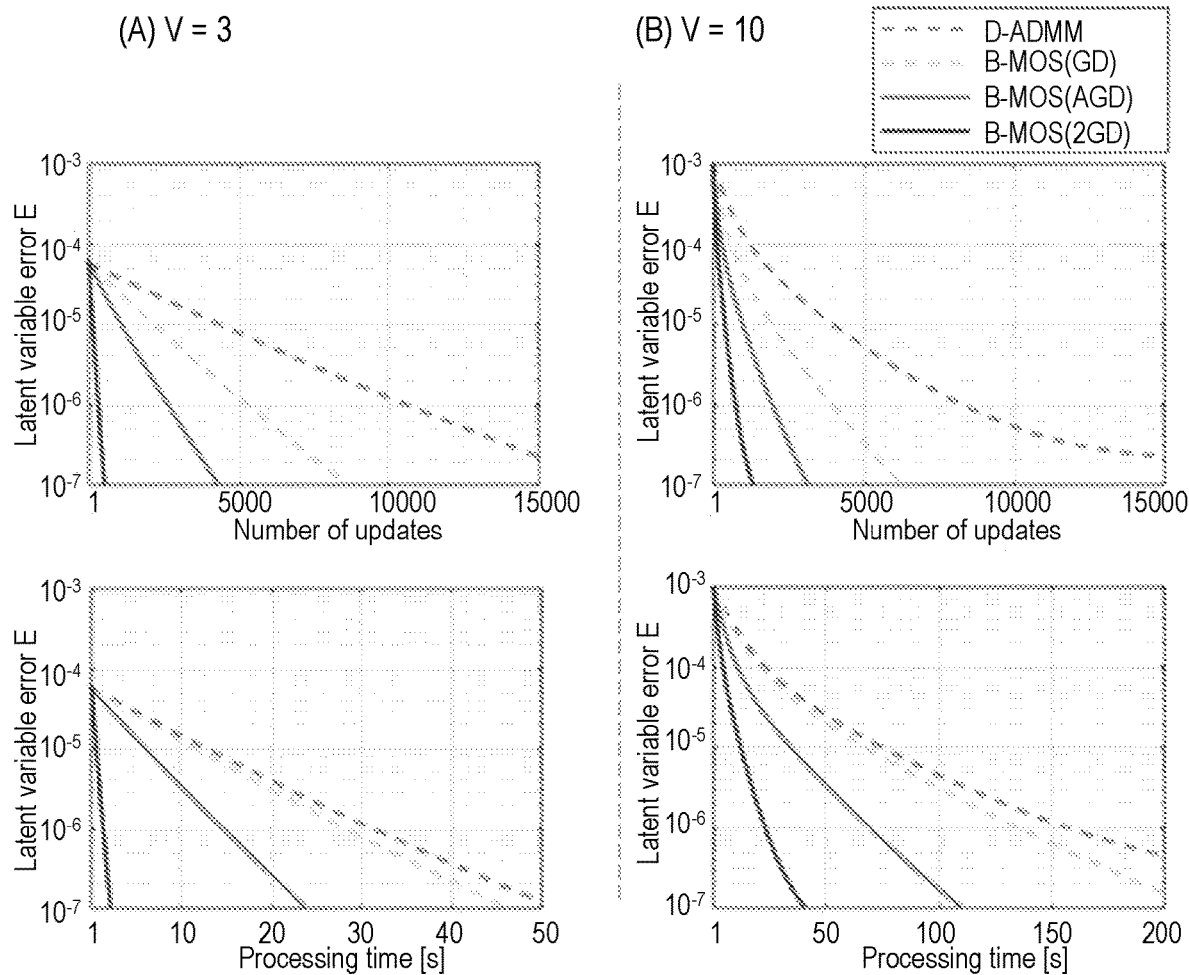
FIG. 15 shows results of the experiment.

FIG. 15 shows the experiment results. B-MOS (GD) indicates a conventional method (the algorithm of FIG. 11), B-MOS (AGD) indicates a method of the present application when the Hessian matrix is designed by the accelerated gradient method (AGD) (the algorithm of FIG. 13), and B-MOS (2GD) indicates a method of the present application when the Hessian matrix is designed by Newton's method (the algorithm of FIG. 13). D-ADMM indicates another conventional method different from B-MOS (GD). As can be seen from the drawings, the methods of the present application provide higher convergence rates than the conventional methods in both of the graph structures. Particularly when the Hessian matrix is designed in accordance with Newton's method, the highest convergence rate is achieved.

7: Representation Using Differential

As it was assumed that the function D was a differentiable strictly convex function at the beginning of <<1: Definitions of Bregman Resolvent operator and Bregman Cayley operator>>, the discussions from <<1: Definitions of Bregman Resolvent operator and Bregman Cayley operator>> to <<5:

Application to consensus problem in edge computing>> still hold if the subdifferential of the function D is replaced with the differential of the function D. Specifically, the description from <<1: Definitions of Bregman Resolvent operator and Bregman Cayley operator>> to <<5: Application to consensus problem in edge computing>> also holds with "the differential of the function D" in place of the description "the subdifferential of the function D". Major formulas with the subdifferential replaced by the differential are shown below.

When the differential of the function D is used, the Bregman divergence B is defined as follows.

$$B(w\|z)=D(w)-D(z)-\langle \nabla D(z), w-z \rangle \quad (4\text{-}1)^*$$

Here, $\nabla$ represents an operation to differentiate the function.

The (Property 1) and (Property 2) of the strictly convex function D can be represented as follows.

(Property 1) Using second-order Taylor expansion, the approximate formula below holds around a point w for the function D.

$$D(w+\delta)=D(w)+\langle \nabla D(w),\delta \rangle + \tfrac{1}{2} \langle H_D(w)\,\delta,\delta \rangle + o(\|\delta\|_2^2) \quad (\delta \to 0) \quad (4\text{-}2)^*$$

(Property 2) The LS (upper bound) and SC (lower bound) of the function D can be represented as below using an arbitrary vector $h \in \mathbb{R}^m$.

$$D(w)+\langle \nabla D(w), h \rangle + \tfrac{1}{2} \langle K_D h, h \rangle \le D(w+h) \quad (4\text{-}3)^*$$

$$D(w+h) \le D(w)+\langle \nabla D(w), h \rangle + \tfrac{1}{2} \langle M_D h, h \rangle \quad (4\text{-}4)^*$$

A Bregman Resolvent operator $R_n$ and a Bregman Cayley operator $C_n$ are given by the formulas below.

$$R_n = (I+(\nabla D)^{-1} \partial G_n)^{-1} = (\nabla D + \partial G_n)^{-1} \nabla D$$

$$C_n = (I+(\nabla D)^{-1} \partial G_n)^{-1}(I-(\nabla D)^{-1} \partial G_n)^{-1} = 2R_n - I$$

When the function D is defined using the square of $L_2$ norm, the function D and the differential of the function D will be as follows.

$$D(w) = \frac{1}{2\kappa}\|w\|_2^2$$

$$\nabla D = \frac{1}{\kappa} I$$

In this case, the Bregman Resolvent operator $R_n$ and the Bregman Cayley operator $C_n$ will be the Resolvent operator $\Omega_n$ and the Cayley operator $\Psi_n$ as in the case of using the subdifferential.

$$R_n = (\nabla D + \partial G_n)^{-1} \nabla D = \left(\frac{1}{\kappa}(I + \kappa \partial G_n)\right)^{-1} \frac{1}{\kappa} I = (I + \kappa \partial G_n)^{-1} = \Omega_n$$

$$C_n = 2R_n - I = 2\Omega_n - I = \Psi_n$$

Generalized P-R type monotone operator splitting will be like the formula below as in the case of subdifferential.

$$z \in C_2 C_1(z) \quad (4\text{-}22)^*$$

The variable update rule for generalized P-R type monotone operator splitting is obtained by decomposing Formula (4-22)* with the auxiliary variables x, y, z ($x \in \mathbb{R}^m$, $y \in \mathbb{R}^m$, $z \in \mathbb{R}^m$) for w ($\in \mathbb{R}^m$).

$$w^{t+1}=R_1(z^t)=(\nabla D+\partial G_1)^{-1}\nabla D(z^t) \quad (4\text{-}23)^*$$

$$x^{t+1}=C_1(z^t)=(2R_1-I)(z^t)=2w^{t+1}-z^t \quad (4\text{-}24)^*$$

$$y^{t+1}=R_2(x^{t+1})=(\nabla D+\partial G_2)^{-1}\nabla D(x^{t+1}) \quad (4\text{-}25)^*$$

$$z^{t+1}=C_2(x^{t+1})=(2R_2-I)(x^{t+1})=2y^{t+1}-x^{t+1} \quad (4\text{-}26)^*$$

Transformation of Formula (4-23)* gives the formula below.

$$w^{t+1} = \underset{w}{\operatorname{argmin}}(G_1(w) + B(w\|z^t)) \quad (4\text{-}27)^*$$
$$= \underset{w}{\operatorname{argmin}}(G_1(w) + D(w) - \langle \nabla D(z^t), w \rangle)$$

Similar transformation of Formula (4-25)* gives the formula below.

$$y^{t+1} = \underset{y}{\operatorname{argmin}}(G_2(y) + B(y\|x^{t+1})) \quad (4\text{-}28)^*$$
$$= \underset{y}{\operatorname{argmin}}(G_2(y) + D(y) - \langle \nabla D(x^{t+1}), y \rangle)$$

Generalized D-R type monotone operator splitting will also be like the formula below as with the case of subdifferential.

$$z \in \alpha C_2 C_1(z)+(1-\alpha)z (\alpha \in (0,1)) \quad (4\text{-}37)^*$$

The variable update rule for generalized D-R type monotone operator splitting is obtained by decomposing Formula (4-37)* with the auxiliary variables x, y, z ($x \in \mathbb{R}^m$, $y \in \mathbb{R}^m$, $z \in \mathbb{R}^m$) for w ($\in \mathbb{R}^m$).

$$w^{t+1} = R_1(z^t) = (\nabla D + \partial G_1)^{-1} \nabla D(z^t) \quad (4\text{-}38)^*$$

$$x^{t+1} = C_1(z^t) = (2R_1 - I)(z^t) = 2w^{t+1} - z^t \quad (4\text{-}39)^*$$

$$y^{t+1} = R_2(x^{t+1}) = (\nabla D + \partial G_2)^{-1} \nabla D(x^{t+1}) \quad (4\text{-}40)^*$$

$$z^{t+1} = \alpha C_2(x^{t+1}) + (1-\alpha) z^t \quad (4\text{-}41)^*$$
$$= \alpha(2y^{t+1} - x^{t+1}) + (1-\alpha) z^t$$

As with the case of subdifferential, representing the function D in the quadratic of Formula (4-48) and substituting it into Formula (4-1)*, which is the formula of definition of the Bregman divergence, gives the following.

$$B(w\|z)=D(w)-D(z)-\langle \nabla D(z), w-z \rangle = \tfrac{1}{2} \langle H_D(z)(w-z), w-z \rangle \quad (4\text{-}49)^*$$

However, update of the function D in Formula (4-48) is not performed at every step. Specifically, in order to satisfy the function D being strong convex, an update of the differential $\nabla D$ of the function D is performed at a certain timing only if the condition represented by the formula below is satisfied. Therefore, an update of the differential $\nabla D$ of the function D is not performed if the condition is not satisfied.

$$\nabla D^t - \nabla D^{t-1} = H_D(w^t) - H_D(w^{t-1}) \succeq O$$

Recursive variable update rules corresponding to Formula (3-3) to Formula (3-6) when applied to the consensus problem in edge computing will be as follows.

$$w^{t+1} = R_1(z^t) \quad (4\text{-}52)^*$$
$$= \underset{w}{\operatorname{argmin}}(F_1^*(A^T w) + D(w) - \langle \nabla D(z^t), w \rangle)$$

-continued $$\lambda^{t+1} = C_1(z^t) = 2w^{t+1} - z^t \quad (4\text{-}53)^*$$

$$z^{t+1} = \begin{cases} C_2(\lambda^{t+1}) = \nabla D^{-1} P \nabla D(\lambda^{t+1}) & (4\text{-}54)^* \\ \alpha C_2(\lambda^{t+1}) + (1-\alpha)z^t = \alpha \nabla D^{-1} P \nabla D(\lambda^{t+1}) + (1-\alpha)z^t & (4\text{-}55)^* \end{cases}$$

In the derivation of the variable update rule, the fact that the Bregman Cayley operator $C_2$ satisfies the formula below was employed.

$$C_2 = \nabla D^{-1} P \nabla D \quad (4\text{-}56)^*$$

The differential of the function D and the inverse operator thereof when using Formula (4-48) are as follows.

$$\nabla D = H_D(z) \quad (4\text{-}57)^*$$

$$\nabla D^{-1} = H_D^{-1}(z) \quad (4\text{-}58)^*$$

8: Bregman Divergence Design with High Order Convexity

The two Bregman divergence design schemes described in <<4: Bregman divergence design for gaining high convergence rate>> discussed how the function D should be designed when the function D to determine the metric of Bregman divergence is limited to a quadratic. In this section, a design of the function D that enables even faster convergence using high order convexity of the second order or higher is described. While the design of a differential $\nabla D$ of the function D is described below, generality is not lost with the description on the design of $\nabla D$ because it is $\nabla D$ that is used in the updating of the variables.

Although they have been implicitly assumed in Formula (4-48) and Formula (4-49)*, in order to prevent the stationary point from being changed with the design of the function D, two aspects are focused: that the function D satisfies $\nabla D(0)=0$ and that the function D is a differentiable strictly convex function. The function $G_i$ is assumed to be differentiable. That is, it is assumed that a differential $\nabla G_i$ of the function $G_i$ exists. Even if the function $G_i$ itself is not differentiable, the function $G_i$ can be safely assumed to be differentiable because the function $G_i$ can be turned into a differentiable function via processing such as smoothing, for example.

Then, by updating $\nabla D$ under the condition represented by the formula below, fast convergence is expected when the function $G_i$ contains convexity of the second order or higher.

$$\nabla D(w) = \nabla G_i(w) - \nabla G_i \quad (0)$$

However, in order to satisfy the function D being strong convex, an update of $\nabla D$ is performed at a certain timing only if the condition represented by the formula below is satisfied. Therefore, an update of $\nabla D$ is not performed if the condition is not satisfied.

$$\nabla D^t - \nabla D^{t-1} \succeq O$$

Practically, when the function $G_i$ is represented as the sum of multiple high-order (the third order or higher) convexities (for example, when the function $G_i$ is represented as a strictly convex function using high-order Taylor expansion), it is often difficult to obtain the optimal solution of w analytically. In such a case, one useful implementation is to represent the function D using a single high-order term only, instead of using a sum. Then, the function D can be represented by the following formula.

$$D(w) = \|w\|_p^p (1 \leq p < \infty)$$

Third Embodiment

Figure 16:
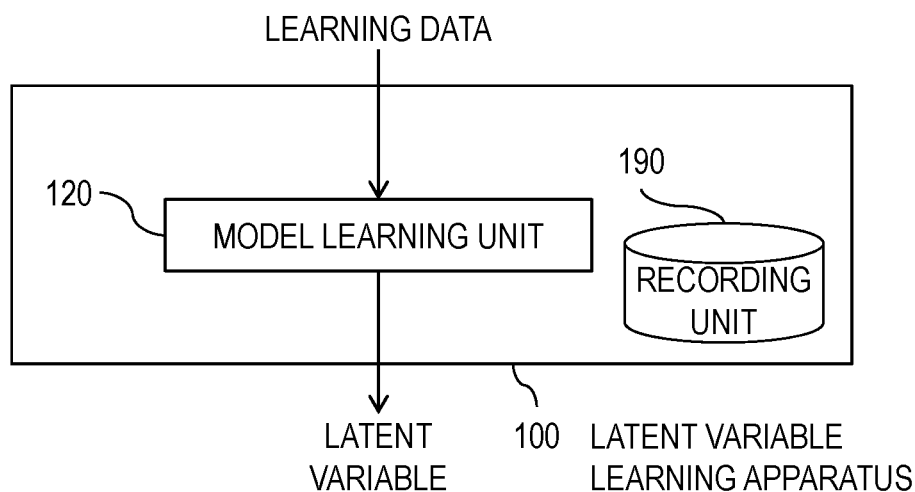
FIG. 16 is a block diagram showing a configuration of a latent variable learning apparatus 100.
Figure 17:
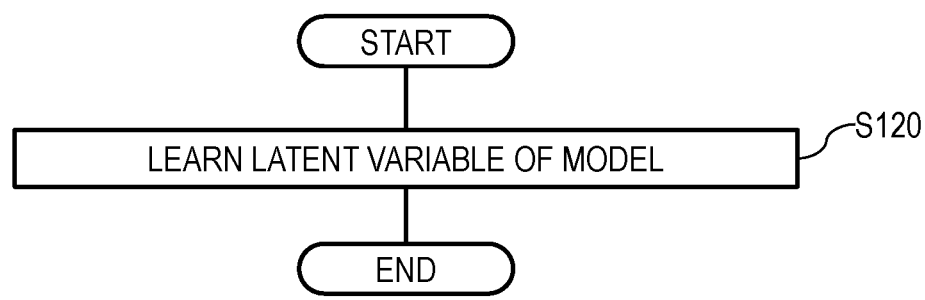
FIG. 17 is a flowchart illustrating operations of the latent variable learning apparatus 100.

Now referring to FIGS. 16 and 17, a latent variable learning apparatus 100 is described. FIG. 16 is a block diagram showing a configuration of the latent variable learning apparatus 100. FIG. 17 is a flowchart illustrating operations of the latent variable learning apparatus 100. As shown in FIG. 16, the latent variable learning apparatus 100 includes a model learning unit 120 and a recording unit 190.

The latent variable learning apparatus 100 uses learning data to learn a latent variable $w \in R^m$ (m being an integer equal to or greater than 1) of a model subjected to machine learning. Herein, a model refers to a function that takes input data as input and outputs output data, and learning data refers to input data for use in the learning of the latent variable of the model or a tuple of input data and output data for use in the learning of the latent variable of the model. When a tuple of input data and output data is used as learning data, the output data may be called teaching data.

According to FIG. 17, the operation of the latent variable learning apparatus 100 is described.

At S120, the model learning unit 120 uses learning data to learn the latent variable w in a predetermined procedure. The procedure is described below specifically.

(Procedure 1)

A learning procedure using Bregman divergence is described here.

First, the model learning unit 120 uses learning data to calculate setup data which is used in the learning of the latent variable w. For example, one example is a cost function $G(w): R^m \to R$ for optimizing the latent variable w, calculated using the learning data (where $G(w) = \Sigma_i G_i(w)$ holds and a function $G_i(w)$ (N being an integer equal to or greater than 2 and i being an integer satisfying $1 \leq i \leq N$ (that is, i is an index)) is a closed proper convex function).

Next, using Bregman divergence $B_D(w_1 \| w_2) = D(w_1) - D(w_2) - <\partial D(w_2), w_1 - w_2> (w_1, w_2 \in R^m)$ defined with the function D (where $D: R^m \to R$ is a strictly convex function), the model learning unit 120 learns the latent variable w such that Bregman divergence $B_D$ ($B_D(w \| w^*)$ or $B_D(w^* \| w)$) with respect to a stationary point $w^* \in R^m$ of w that minimizes the cost function G(w) approaches 0. The function D is a strictly convex function, which may be designed as desired. The stationary point $w^*$ is also called fixed point $w^*$.

(Procedure 2)

This section describes a learning procedure using an update rule for the latent variable which is configured with monotone operator splitting, as described in <Technical background>. Although <Technical background> detailed the case of N=2, the learning procedure described below can be configured for any N that can constitute the update rule for the latent variable using monotone operator splitting. For example, for the case of N=3, a similar learning procedure can also be configured because it can be mathematically proved that transformation of monotone operator splitting is possible as in the case of N=2.

First, the model learning unit 120 uses the learning data to calculate setup data which is used in the learning of the latent variable w. For example, in addition to the cost function G(w) mentioned above, it calculates a Bregman Resolvent operator $R_i$ ($1 \leq i \leq N$) defined using the function D and the function $G_1$, and a Bregman Cayley operator $C_i$ ($1 \leq i \leq N$) defined using the Bregman Resolvent operator $R_i$ as setup data.

Then, using the Bregman Resolvent operator $R_i$ ($1 \leq i \leq N$) and the Bregman Cayley operator $C_i$ ($1 \leq i \leq N$), the model learning unit 120 calculates the value of the latent variable w recursively. Specifically, with t being a variable used for counting the number of updates (hereinafter also called a counter), the model learning unit 120 recursively calculates $w^{t+1}$, which is the result of the t+1th update of the latent variable w, using the Bregman Resolvent operator $R_i$ ($1 \leq i \leq N$) and the Bregman Cayley operator $C_i$ ($1 \leq i \leq N$).

The counter t will assume an integer value equal to or greater than 0.

Figure 18:
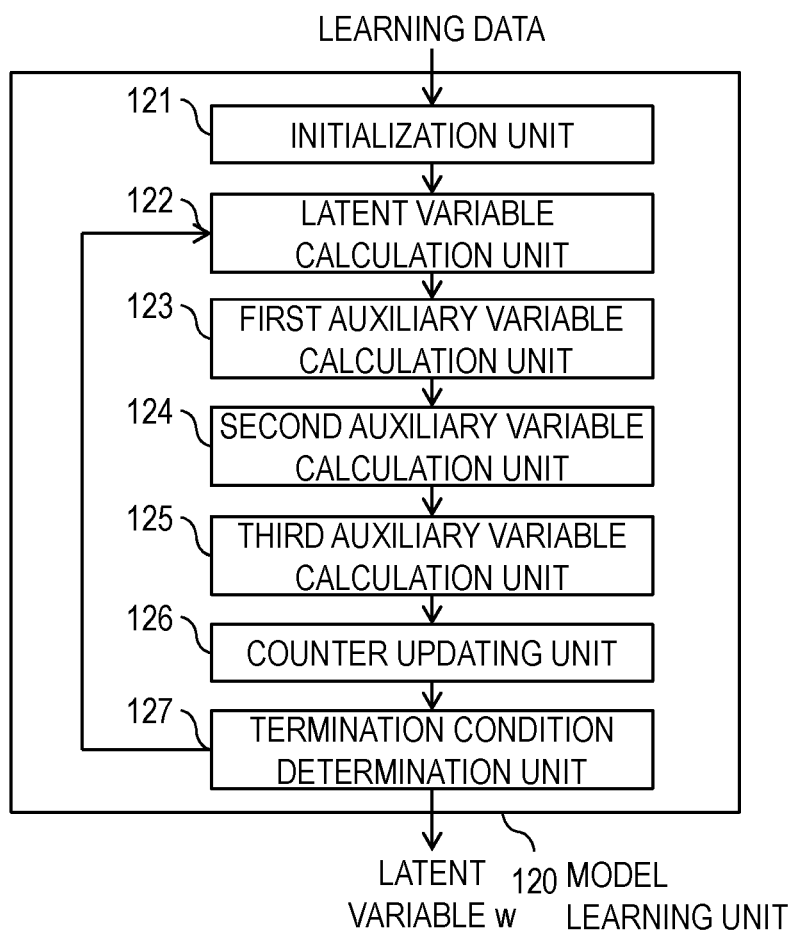
FIG. 18 is a block diagram showing a configuration of a model learning unit 120.
Figure 19:
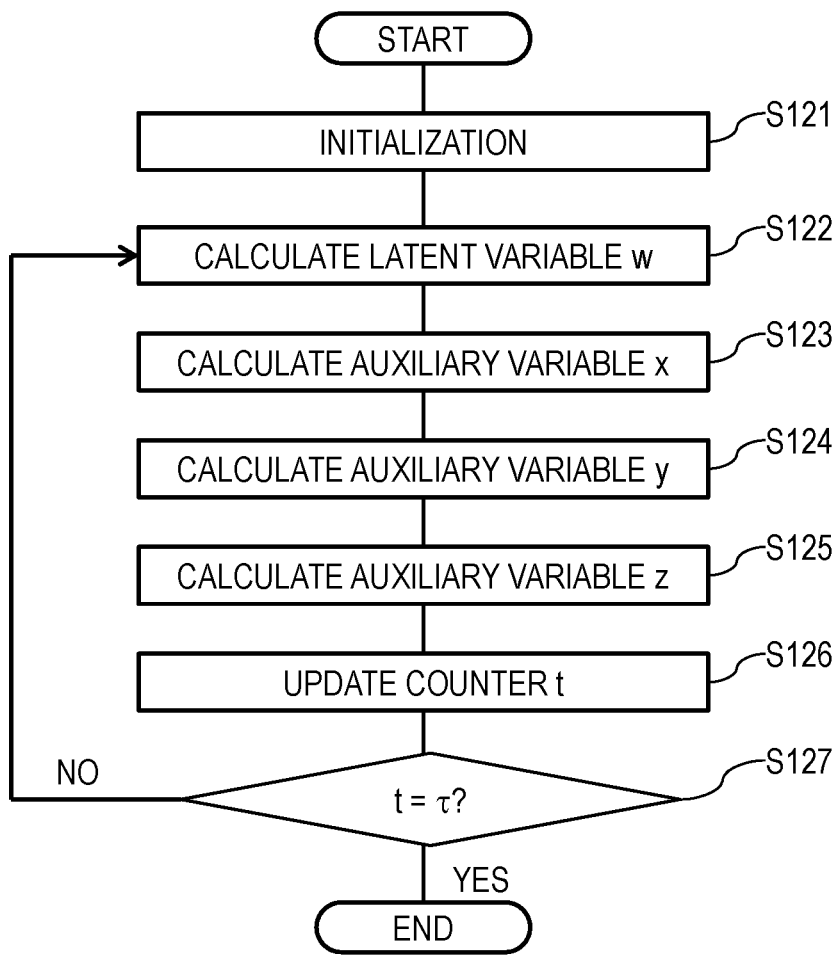
FIG. 19 is a flowchart illustrating operations of the model learning unit 120.

The model learning unit 120 which executes a learning procedure using an update rule for the latent variable which is configured with generalized P-R type monotone operator splitting and generalized D-R type monotone operator splitting in the case of N=2 is described. Now referring to FIGS. 18 and 19, the model learning unit 120 is described. FIG. 18 is a block diagram showing a configuration of the model learning unit 120. FIG. 19 is a flowchart illustrating operations of the model learning unit 120. As shown in FIG. 18, the model learning unit 120 includes an initialization unit 121, a latent variable calculation unit 122, a first auxiliary variable calculation unit 123, a second auxiliary variable calculation unit 124, a third auxiliary variable calculation unit 125, a counter updating unit 126, and a termination condition determination unit 127.

According to FIG. 19, the operation of the model learning unit 120 is described. Here, the auxiliary variables x, y, $z \in \mathbb{R}^m$ for the latent variable w are used.

At S121, the initialization unit 121 initializes the counter t. Specifically, t=0 holds. The initialization unit 121 also calculates setup data.

At S122, the latent variable calculation unit 122 calculates $w^{t+1}$, which is the result of the t+1th update of the latent variable w, from $z^t$, which is the result of the tth update of the auxiliary variable z, according to Formula (5-1).

At S123, the first auxiliary variable calculation unit 123 calculates $x^{t+1}$, which is the result of the t+1th update of the auxiliary variable x, from the $z^t$ used at S122 and the $w^{t+1}$ calculated at S122, according to Formula (5-2).

At S124, the second auxiliary variable calculation unit 124 calculates $y^{t+1}$, which is the result of the t+1th update of the auxiliary variable y, from the $x^{t+1}$ calculated at S123, according to Formula (5-3).

At S125, the third auxiliary variable calculation unit 125 calculates $z^{t+1}$, which is the result of the t+1th update of the auxiliary variable z. This is described more specifically. When generalized P-R type monotone operator splitting is used, the third auxiliary variable calculation unit 125 calculates $z^{t+1}$, which is the result of the t+1th update of the auxiliary variable z, from the $x^{t+1}$ calculated at S123 and the $y^{t+1}$ calculated at S124, according to Formula (5-4). When generalized D-R type monotone operator splitting is used, the third auxiliary variable calculation unit 125 calculates $z^{t+1}$, which is the result of the t+1th update of the auxiliary variable z, from the $z^t$ used at S122, the $x^{t+1}$ calculated at S123, and the $y^{t+1}$ calculated at S124, according to Formula (5-5) (where $\alpha$ is a real number satisfying $0 < \alpha < 1$).

At S126, the counter updating unit 126 increments the counter t by one. Specifically, $t \leftarrow t+1$ holds.

At S127, if the counter t has reached a predetermined number of updates $\tau$ ($\tau$ is an integer equal to or greater than 1) (that is, if $t=\tau$, satisfying the termination condition), the termination condition determination unit 127 outputs a current value $w^\tau$ of the latent variable w and ends the processing. Otherwise, it returns to the processing at S122. That is, the model learning unit 120 repeats the calculations from S122 to S125. The $z^{t+1}$ calculated at S125 is used at S122 and S123 in the next repeated calculation.

$$w^{t+1} = \underset{w}{\arg\min}(G_1(w) + D(w) - \langle \partial D(z^t), w \rangle) \quad (5\text{-}1)$$

$$x^{t+1} = 2w^{t+1} - z^t \quad (5\text{-}2)$$

$$y^{t+1} = \underset{y}{\arg\min}(G_2(y) + D(y) - \langle \partial D(x^{t+1}), y \rangle) \quad (5\text{-}3)$$

$$z^{t+1} = \begin{cases} 2y^{t+1} - x^{t+1} & (5\text{-}4) \\ \alpha(2y^{t+1} - x^{t+1}) + (1-\alpha)z^t & (5\text{-}5) \end{cases}$$

<<Condition of Function D for Achieving High Convergence Rate>>

To increase the convergence rate to the stationary point $w^*$ of w that minimizes the cost function G(w), the function D should be a function satisfying the following condition.

(Condition) The function D is a function such that its Hessian matrix is close to the inverse matrix of the Hessian matrix of the function $G_i(w)$.

This condition can also be said as "the function D is a function such that the product of the inverse matrix of its Hessian matrix and the Hessian matrix of the function $G_i(w)$ is close to the identity matrix".

In the case of N=2, the Hessian matrix of the function D may be calculated as follows in accordance with Newton's method or the accelerated gradient method as described in <Technical background>.

[Case 1]: The function $G_1$ is a strictly convex function, that is, strong convex (SC) and Lipschitz smooth (LS).

$$H_D(w) = H_{G_1}(w) + \varepsilon I \quad (5\text{-}6)$$

$$H_D(w) = L_{G_1}(w) + \varepsilon I \quad (5\text{-}7)$$

(Where $\varepsilon > 0$ is a real number)

The real number $\varepsilon$ is chosen such that the eigenvalue of the Hessian matrix $H_D$ is in the range of greater than 0 and equal to or smaller than 1.

[Case 2]: The functions $G_1$, $G_2$ are both strictly convex functions, that is, both are strong convex (SC) and Lipschitz smooth (LS).

$$H_D(w) = \tfrac{1}{2}(H_{G_1}(w) + H_{G_2}(w)) + \varepsilon I \quad (5\text{-}8)$$

$$H_D(w) = \tfrac{1}{2}(L_{G_1}(w) + L_{G_2}(w)) + \varepsilon I \quad (5\text{-}9)$$

(Where $\varepsilon > 0$ is a real number)

The real number $\varepsilon$ is chosen such that the eigenvalue of the Hessian matrix $H_D$ is in the range of greater than 0 and equal to or smaller than 1.

Formula (5-6) and Formula (5-8) are the case of following Newton's method, and Formula (5-7) and Formula (5-9) are the case of following the accelerated gradient method. The matrices $L_{G\_1}$, $L_{G\_2}$ are matrices given by Formula (5-10) and Formula (5-11), respectively.

$$L_{G_1}(w) \leftarrow \beta L_{G_1}(w) + (1-\beta)\mathrm{diag}(\partial G_1(w) \partial G_1^T(w)) \quad (5\text{-}10)$$

$$L_{G_2}(w) \leftarrow \beta L_{G_2}(w) + (1-\beta)\mathrm{diag}(\partial G_2(w) \partial G_2^T(w)) \quad (5\text{-}11)$$

$$(\beta \in (0, 1))$$

Alternatively, the matrices $L_{G\_1}$, $L_{G\_2}$ are matrices given by Formula (5-12) and Formula (5-13), respectively.

$$L_{G_1}(w) \leftarrow \beta L_{G_1}(w) + (1-\beta)\partial G_1(w)\partial G_1^T(w) \quad (5\text{-}12)$$

$$L_{G_2}(w) \leftarrow \beta L_{G_2}(w) + (1-\beta)\partial G_2(w)\partial G_2^T(w) \quad (5\text{-}13)$$

$$(\beta \in (0,1))$$

The matrix $L_{G\_1}$ in Formula (5-10) and Formula (5-12) is a matrix calculated using the gradient of the function $G_1(w)$. The matrix $L_{G\_2}$ in Formula (5-11) and Formula (5-13) is a matrix calculated using the gradient of a function $G_2(w)$.

Instead of Formula (5-8) and Formula (5-9) in [Case 2], geometric means such as the formulas below may be used.

$$H_D(w) = \sqrt{H_{G_1}(w)H_{G_2}(w)} + \varepsilon I \quad (5\text{-}8')$$

$$H_D(w) = \sqrt{L_{G_1}(w)L_{G_2}(w)} + \varepsilon I \quad (5\text{-}9')$$

Although the function $G_1(w)$ and the function $G_2(w)$ were described as being strictly convex functions in the description of Case 1 and Case 2 above, they need not necessarily be strictly convex functions in a mathematically strict sense. That is, the Hessian matrix of the function D can also be calculated by Formula (5-6) to Formula (5-9) when the function $G_1(w)$ or function $G_2(w)$ may be handled as a strictly convex function. More particularly, this can be expressed as below.

[Case 1]: The function $G_1$ is a strictly convex function (is strong convex (SC) and Lipschitz smooth (LS)) or can be assumed to be a strictly convex function (be strong convex (SC) and Lipschitz smooth (LS)).

In this case, the Hessian matrix of the function D can be calculated by Formula (5-6) or Formula (5-7).

[Case 2]: Each one of the functions $G_1$, $G_2$ is a strictly convex function (is strong convex (SC) and Lipschitz smooth (LS)) or can be assumed to be a strictly convex function (be strong convex (SC) and Lipschitz smooth (LS)).

In this case, the Hessian matrix of the function D can be calculated by Formula (5-8) or Formula (5-9).

While the description of the third embodiment used subdifferential, differential may be used in place of subdifferential as described in <Technical background>. In that case, the formulas below may be used instead of Formula (5-1) to Formula (5-5).

$$w^{t+1} = \underset{w}{\operatorname{argmin}}(G_1(w) + D(w) - \langle \nabla D(z^t), w \rangle) \quad (5\text{-}1)^*$$

$$x^{t+1} = 2w^{t+1} - z^t \quad (5\text{-}2)^*$$

$$y^{t+1} = \underset{y}{\operatorname{argmin}}(G_2(y) + D(y) - \langle \nabla D(x^{t+1}), y \rangle) \quad (5\text{-}3)^*$$

$$z^{t+1} = \begin{cases} 2y^{t+1} - x^{t+1} & (5\text{-}4)^* \\ \alpha(2y^{t+1} - x^{t+1}) + (1-\alpha)z^t & (5\text{-}5)^* \end{cases}$$

When differential is used, $\nabla D$ may be updated under the condition represented by the formula below.

$$\nabla D(w) = \nabla G_i(w) - \nabla G_i(0)$$

However, an update of $\nabla D$ is performed at a certain timing only if the condition represented by the formula below is satisfied.

$$\nabla D^t - \nabla D^{t-1} \succeq O$$

The embodiment according to the present invention enables fast learning of latent variables of a model to be subjected to machine learning. The embodiment according to the present invention enables the latent variables to be updated so as to accelerate the convergence to a stationary point (the optimal solution) by configuring the variable update rule based on monotone operator splitting using the Bregman Resolvent operator or the Bregman Cayley operator. Also, by appropriately configuring the convex function for use in the definition of Bregman divergence, it is possible to configure a variable update rule based on monotone operator splitting using the Bregman Resolvent operator or the Bregman Cayley operator such that the convergence to the stationary point is accelerated.

Fourth Embodiment

In this section, an embodiment corresponding to the two variable updating algorithms described in <<5: Application to consensus problem in edge computing>> in <Technical background> (the algorithms in FIG. 12 and FIG. 13) is described.

Figure 20:
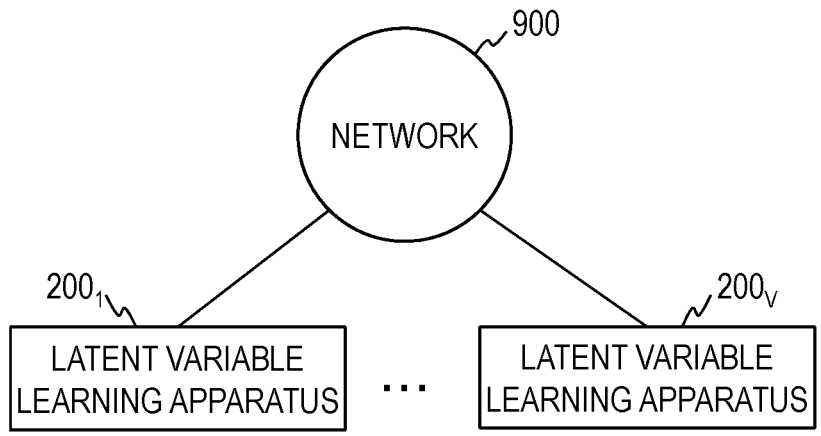
FIG. 20 is a block diagram showing a configuration of a latent variable learning system 20.

Now referring to FIG. 20, a latent variable learning system 20 is described. FIG. 20 is a block diagram showing a configuration of the latent variable learning system 20. As shown in FIG. 20, the latent variable learning system 20 includes V (V being an integer equal to or greater than 1) latent variable learning apparatuses $200_1, \ldots, 200_V$. A latent variable learning apparatus $200_i$ ($i \in v = \{1, \ldots, V\}$) corresponds to a node in the foregoing description on the consensus problem in edge computing.

Each latent variable learning apparatus $200_i$ is connected with a network 900 and communicates with a latent variable learning apparatus $200_j$ ($j \neq i$) as necessary. The network 900 can be the internet, for example.

Figure 21:
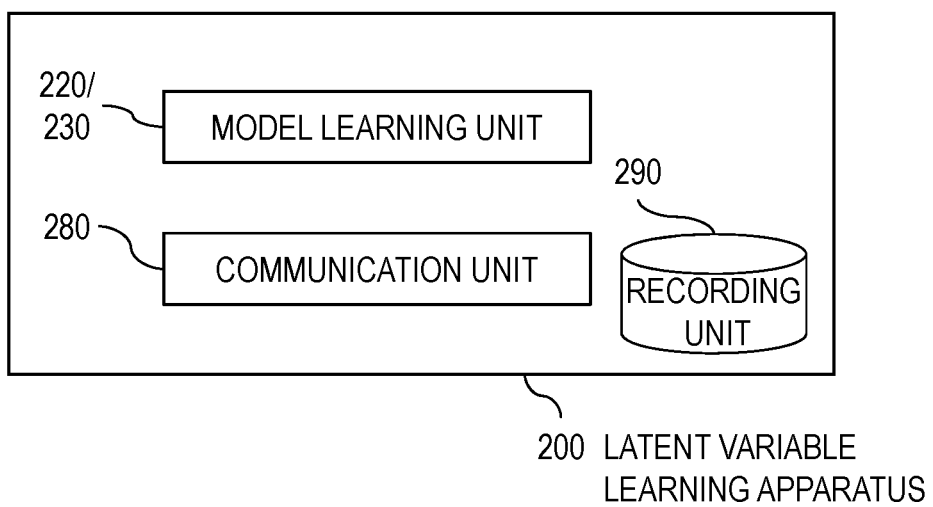
FIG. 21 is a block diagram showing a configuration of a latent variable learning apparatus 200.

Now referring to FIG. 21, a latent variable learning apparatus 200 is described. FIG. 21 is a block diagram showing a configuration of the latent variable learning apparatus 200. As shown in FIG. 21, the latent variable learning apparatus 200 includes a model learning unit 220, a communication unit 280, and a recording unit 290.

The latent variable learning apparatus 200, uses learning data to learn a latent variable $p_i \in R^{p'}$ (p' being an integer equal to or greater than 1) of a model to be subjected to machine learning. The learning data may be common to all latent variable learning apparatus $200_i$, or may be different for each latent variable learning apparatus $200_i$.

Figure 22:
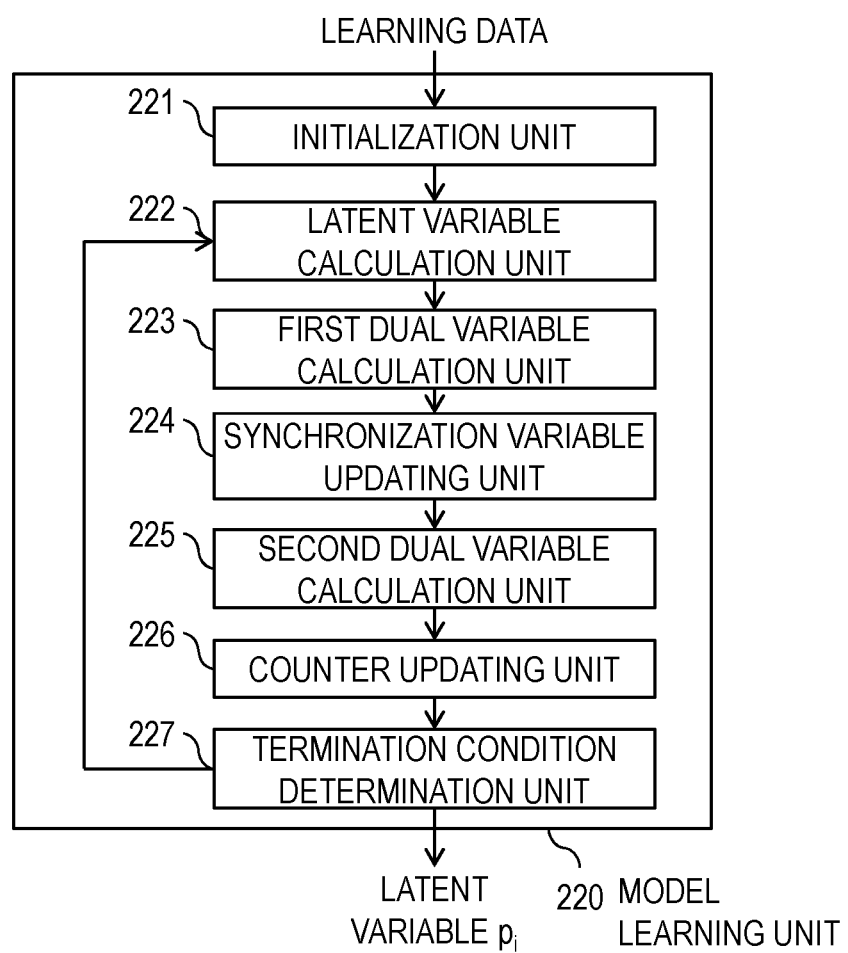
FIG. 22 is a block diagram showing a configuration of a model learning unit 220.
Figure 23:
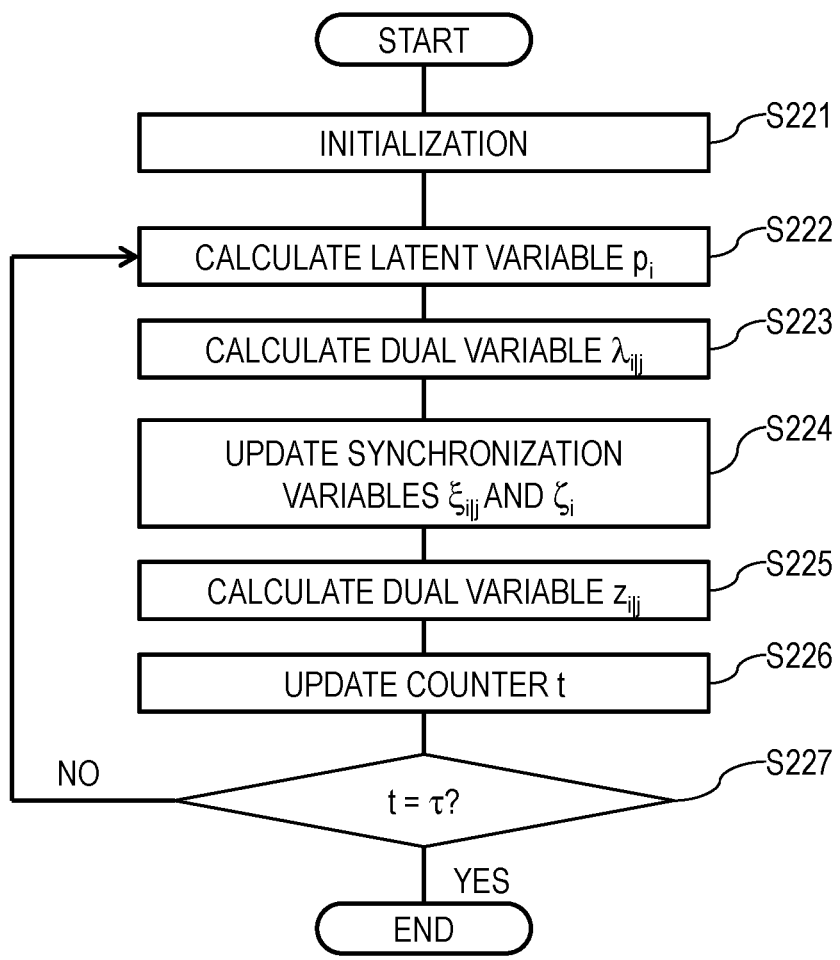
FIG. 23 is a flowchart illustrating operations of the model learning unit 220.

Next, referring to FIGS. 22 and 23, the model learning unit 220 is described. FIG. 22 is a block diagram showing a configuration of the model learning unit 220. FIG. 23 is a flowchart illustrating operations of the model learning unit 220. As shown in FIG. 22, the model learning unit 220 includes an initialization unit 221, a latent variable calculation unit 222, a first dual variable calculation unit 223, a synchronization variable updating unit 224, a second dual variable calculation unit 225, a counter updating unit 226, and a termination condition determination unit 227.

According to FIG. 23, the operation of the model learning unit 220 is described. Before proceeding to specific description, description on several symbols is provided. These symbols have been used in the discussion so far; and the following description serves to summarize them.

$v = \{1, \ldots, V\}$ represents a set of the indices of the latent variable learning apparatuses 200. N(i) represents a set of the indices of the latent variable learning apparatuses 200 communicating with the latent variable learning apparatus $200_i$.

For latent variables $p_i$, $p_j$ (where $j \in N(i)$), let $\lambda_{i|j} \in R^{p'}$ be a dual variable belonging to the latent variable learning apparatus $200_i$, and let $\lambda_{j|i} \in R^{p'}$ be a dual variable belonging to the latent variable learning apparatus $200_j$. Similarly, for the latent variables $p_i$, $p_j$ (where $j \in N(i)$), let $z_{i|j} \in R^{p'}$ be a dual variable belonging to the latent variable learning apparatus $200_i$ and let $z_{j|i} \in R^{p'}$ be a dual variable belonging to the latent variable learning apparatus $200_j$.

Let function $F_{1,i}(p_i):R^{p'} \to R$ be a cost function (where $F_{1,i}(p_i)$ is a closed proper convex function) for optimizing the latent variable $p_i$ calculated using the learning data.

Let $A_{ij} \in R^{p' \times p'}$ be a real number matrix of p'×p' given by the formula below.

$$A_{i|j} = \begin{cases} I & (i > j, j \in N(i)) \\ -I & (j > i, j \in N(i)) \end{cases}$$

Let a function $D_{i|j}: R^{p'} \to R$ (where $j \in N(i)$) be a strictly convex function belonging to the latent variable learning apparatus $200_i$.

Let $\xi_{i|j}$ and $\zeta_i$ be variables of the latent variable learning apparatus $200_i$ for storing data sent from the latent variable learning apparatus $200_j$ (where $j \in N(i)$). $\xi_{i|j}$ P and $\zeta_i$ are also called synchronization variables hereinbelow. Let t be a variable for counting the number of times a variable is updated (hereinafter, also called a counter), and let τ (τ is an integer equal to or greater than 1) be a predetermined number of updates. This τ represents the upper limit on the number of repeated calculations at S222 to S225 described later.

In the following description, $S_i$ ($i \in v=\{1, \ldots, V\}$) is assumed to indicate V latent variable learning apparatuses $200_1, \ldots, 200_V$. Therefore, the latent variable learning system 20 includes a latent variable learning apparatus $S_i$ ($i \in v$), and the latent variable learning apparatus $S_i$ ($i \in v$) uses learning data to learn the latent variable $p_i$ by a predetermined procedure. Referring to FIG. 23, the procedure is described below.

At S221, the initialization unit 221 initializes the counter t. Specifically, t=0 holds. The initialization unit 221 also calculates setup data. For example, one example is the cost function $F_{1,i}(p_i)$.

At S222, the latent variable calculation unit 222 calculates $p_i^{t+1}$, which is the result of the t+1th update of the latent variable $p_i$ from $z_{i|j}^t$, which is the result of the tth update of the dual variable $z_{i|j}$, and from $\zeta_i^t$, which is the result of the tth update of the variable $\zeta_i$, according to the formula below.

$$p_i^{t+1} = \underset{p_i}{\arg\min}\left(F_{1,i}(p_i) - \sum_{j \in N(i)} \langle z_{i|j}^t, A_{i|j} p_i \rangle + \frac{1}{2\gamma} \|A_{i|j} p_i + A_{j|i} \zeta_i^t\|_2^2\right)$$

Note that appropriate initial values have been set in $z_{i|j}^0$ and $\zeta_i^0$. Also, γ (γ>0) is assumed to be a predetermined real number.

At S223, the first dual variable calculation unit 223 calculates $\lambda_{i|j}^{t+1}$, which is the result of the t+1th update of the dual variable $\lambda_{i|j}$ ($j \in N(i)$) from the $z_{i|j}^t$ used at S222 and the $p_i^{t+1}$ calculated at S222, for $j \in N(i)$ according to the formula below.

$$\lambda_{i|j}^{t+1} = z_{i|j}^t - 2H_{D_{i|j}}^{-1}(z_{i|j}^t) A_{i|j} p_i^{t+1}$$

Here, $H_{D\_i|j}$ represents the Hessian matrix of the function $D_{i|j}$. That is, $H_{D\_i|j}^{-1}$ is the inverse matrix thereof.

At S224, the synchronization variable updating unit 224 uses the communication unit 280 to receive values produced by learning of the latent variable learning apparatus $S_j$ ($j \in N(i)$) as $\xi_{i|j}^{t+1}$ and $\zeta_i^{t+1}$, which are the results of t+1th update of the variables $\xi_{i|j}$, $\zeta_i$ ($j \in N(i)$), and updates the variables $\xi_{i|j}$, $\zeta_i$ according to the formula below.

$$\xi_{i|j}^{t+1} = \text{Transmit}_{j \to i}\{H_{D_{j|i}}(z_{j|i}^t) \lambda_{j|i}^{t+1}\}$$

$$\zeta_i^{t+1} = \text{Transmit}_{j \to i}\{p_j^{t+1}\}$$

At S225, the second dual variable calculation unit 225 calculates $z_{i|j}^{t+1}$, which is the result of the t+1th update of the dual variable ($j \in N(i)$) for $j \in N(i)$ according to the formula below.

$$z_{i|j}^{t+1} = \begin{cases} H_{D_{i|j}}^{-1}(z_{i|j}^t) \xi_{i|j}^{t+1} & (6\text{-}1) \\ \alpha H_{D_{i|j}}^{-1}(z_{i|j}^t) \xi_{i|j}^{t+1} + (1-\alpha) z_{i|j}^t & (6\text{-}2) \end{cases}$$

Here, α is a real number satisfying 0<α<1.

Formula (6-1) corresponds to the case of using generalized P-R type monotone operator splitting, and Formula (6-2) corresponds to the case of using generalized D-R type monotone operator splitting.

At S226, the counter updating unit 226 increments the counter t by one. Specifically, t←t+1 holds.

At S227, if the counter t has reached a predetermined number of updates τ (that is, if t=τ, satisfying the termination condition), the termination condition determination unit 227 outputs a current value $p_i^\tau$ of the latent variable $p_i$ and ends the processing. Otherwise, it returns to the processing at S222. That is, the model learning unit 220 repeats the calculations from S222 to S225. The $z_{i|j}^{t+1}$ calculated at S225 is used at S222 and S223 in the next repeated calculation.

Preferably, the Hessian matrix is designed using Formula (5-6) to Formula (5-9).

(First Modification)

The foregoing procedure corresponds to the algorithm of FIG. 12. A procedure corresponding to the algorithm of FIG. 13 is described here. This procedure does not use the variable $\zeta_i$ because it is not necessary to exchange latent variables.

Figure 24:
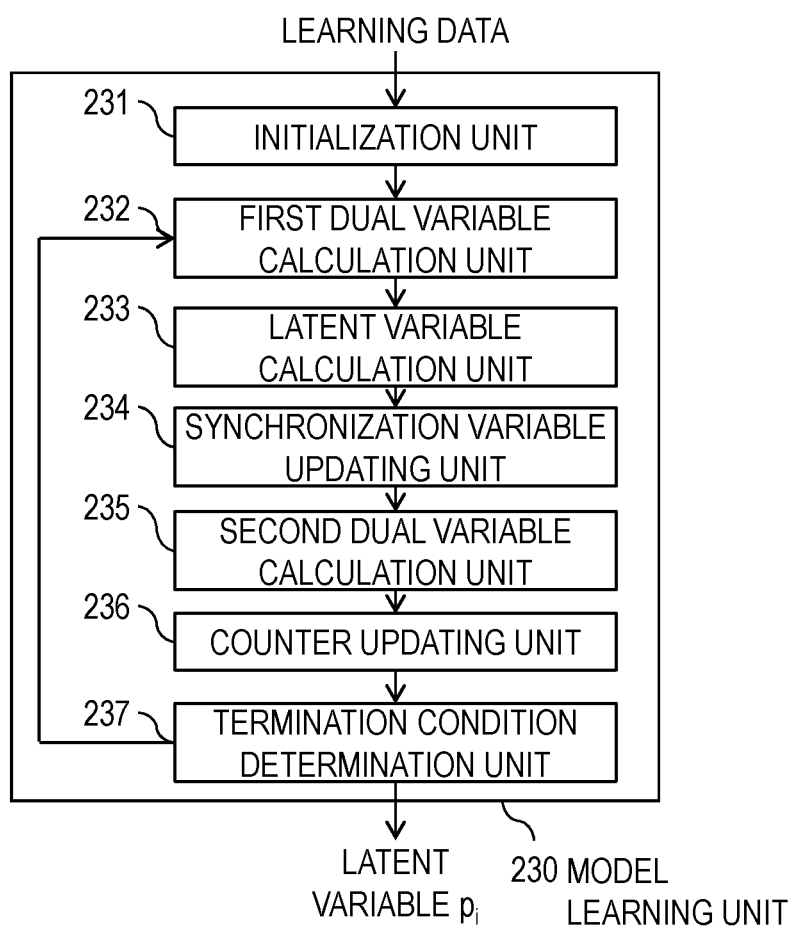
FIG. 24 is a block diagram showing a configuration of a model learning unit 230.
Figure 25:
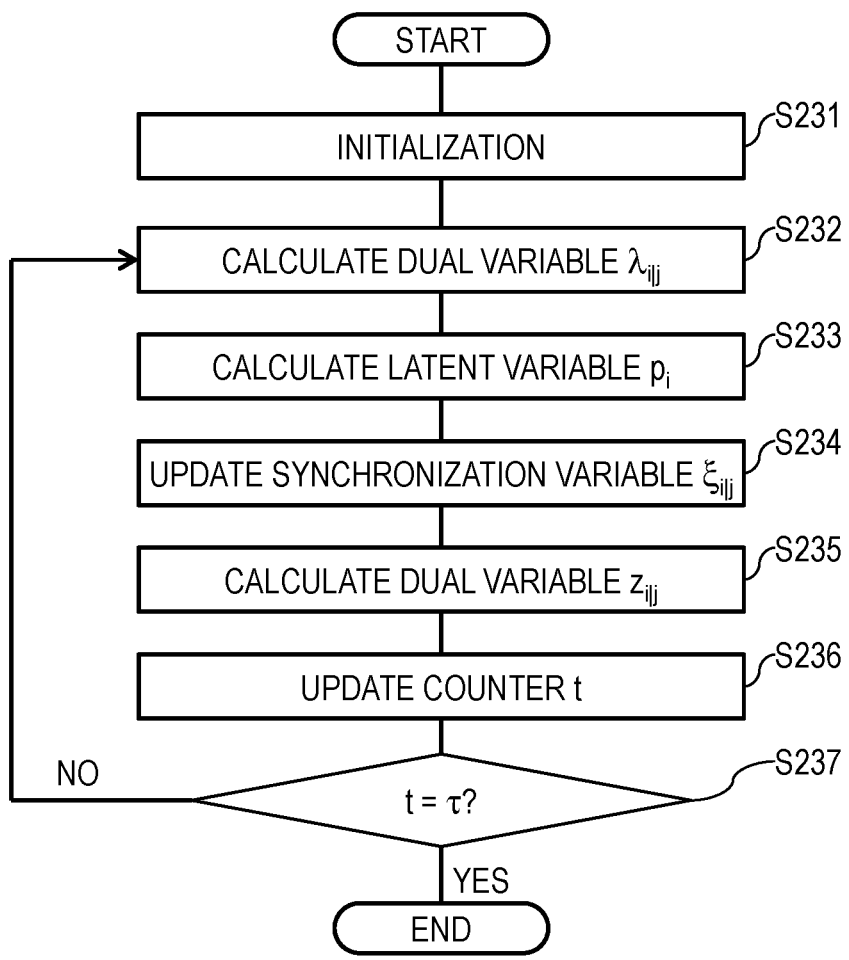
FIG. 25 is a flowchart illustrating operations of the model learning unit 230.

The latent variable learning apparatus 200 includes a model learning unit 230 in place of the model learning unit 220, as shown in FIG. 21. Now referring to FIGS. 24 and 25, the model learning unit 230 is described. FIG. 24 is a block diagram showing a configuration of the model learning unit 230. FIG. 25 is a flowchart illustrating operations of the model learning unit 230. As shown in FIG. 24, the model learning unit 230 includes an initialization unit 231, a first dual variable calculation unit 232, a latent variable calculation unit 233, a synchronization variable updating unit 234, a second dual variable calculation unit 235, a counter updating unit 236, and a termination condition determination unit 237.

According to FIG. 25, the operation of the model learning unit 230 is described.

At S231, the initialization unit 231 initializes the counter t. Specifically, t=0 holds. The initialization unit 231 also calculates setup data.

At S232, the first dual variable calculation unit 232 calculates $\lambda_{i|j}^{t+1}$, which is the result of the t+1th update of the dual variable $\lambda_{i|j}$ ($j \in N(i)$), from $z_{i|j}^t$, which is the result of the tth update of the dual variable and from $p_i^t$, which is the result of the tth update of the latent variable $p_i$, for $j \in N(i)$ according to the formula below.

$$\lambda_{i|j}^{t+1} = z_{i|j}^t - 2H_{D_{i|j}}^{-1}(z_{i|j}^t)(A_{i|j})(p_i^t - H_{F_{1,i}}^{-1}(p_i^t) \partial F_{1,i}(p_i^t)))$$

Note that appropriate initial values have been set in $z_{i|j}^0$ and $p_i^0$. $H_{D\_i|j}$ represents the Hessian matrix of the function $D_{i|j}$, and $H_{F\_1,i}$ represents the Hessian matrix of the function $F_{1,i}$. That is, $H_{D\_i|j}^{-1}$ and $H_{F\_1,i}^{-1}$ are the inverse matrices of them. $\partial F_{1,i}$ represents the subdifferential of the function $F_{1,i}$.

At S233, the latent variable calculation unit 233 calculates $p_i^{t+1}$, which is the result of the t+1th update of the latent variable $p_i$, according to the formula below.

$$p_i^{t+1} = p_i^t - H_{F_{1,i}}^{-1}(p_i^t)(\partial F_{1,i}(p_i^t) - \Sigma_{j \in N(i)} A_{ij}^T w_{ij}^{t+1}$$

Here, $w_{i|j}^t$ represents the result of the tth update of the dual variable $w_{i|j}$.

At S234, the synchronization variable updating unit 234 uses the communication unit 280 to receive a value produced by learning of the latent variable learning apparatus $S_j$ ($j \in N(i)$) as $\xi_{i|j}^{t+1}$, which is the result of t+1th update of the variable $\xi_{i|j}$ ($j \in N(i)$), and updates the variable $\xi_{i|j}$ according to the formula below.

$$\xi_{i|j}^{t+1} = \text{Transmit}_{j \to i}\{H_{D_{j|i}}(z_{j|i}^t)\lambda_{j|i}^{t+1}\}$$

At S235, the second dual variable calculation unit 235 calculates $z_{i|j}^{t+1}$, which is the result of the t+1th update of the dual variable $z_{i|j}$ ($j \in N(i)$) for $j \in N(i)$ according to the formula below.

$$z_{i|j}^{t+1} = \begin{cases} H_{D_{i|j}}^{-1}(z_{i|j}^t)\xi_{i|j}^{t+1} & (6\text{-}1) \\ \alpha H_{D_{i|j}}^{-1}(z_{i|j}^t)\xi_{i|j}^{t+1} + (1-\alpha)z_{i|j}^t & (6\text{-}2) \end{cases}$$

Here, $\alpha$ is a real number satisfying $0<\alpha<1$.

Formula (6-1) corresponds to the case of using generalized P-R type monotone operator splitting, and Formula (6-2) corresponds to the case of using generalized D-R type monotone operator splitting.

At S236, the counter updating unit 236 increments the counter t by one. Specifically, $t \leftarrow t+1$ holds.

At S237, if the counter t has reached a predetermined number of updates $\tau$ (that is, if $t=\tau$, satisfying the termination condition), the termination condition determination unit 237 outputs a current value $p_i^\tau$ of the latent variable $p_i$ and ends the processing. Otherwise, it returns to the processing at S232. That is, the model learning unit 230 repeats the calculations from S232 to S235. The $z_{i|j}^{t+1}$ calculated at S235 is used at S232 and S233 in the next repeated calculation.

Preferably, the Hessian matrix $H_{D\_i|j}$ is designed using Formula (5-6) to Formula (5-9).

The embodiment according to the present invention enables fast learning of latent variables of a model to be subjected to machine learning. The embodiment according to the present invention enables the latent variables to be updated so as to accelerate the convergence to a stationary point (the optimal solution) by configuring the variable update rule based on monotone operator splitting using the Bregman Resolvent operator or the Bregman Cayley operator. Also, by appropriately configuring the convex function for use in the definition of Bregman divergence, it is possible to configure a variable update rule based on monotone operator splitting using the Bregman Resolvent operator or the Bregman Cayley operator such that the convergence to the stationary point is accelerated.

APPENDIX

Each apparatus according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the apparatus executing the processing or any necessity.

As already mentioned, when the processing functions of the hardware entities described in the embodiments (the apparatuses of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A machine learning method comprising:
learning a deep neural network by performing:
a step in which a plurality of node portions learn mapping that uses one common primal variable by machine learning based on their respective input data while sending and receiving information to and from each other, wherein the plurality of node portions is a plurality of distributed servers,
the plurality of node portions perform the machine learning so as to minimize, instead of a cost function of a non-convex function originally corresponding to the machine learning, a proxy convex function serving as an upper bound on the cost function,
the proxy convex function is represented by a formula of a first-order gradient of the cost function with respect to a primal variable,
V is a predetermined positive integer equal to or greater than 2; the plurality of node portions are node portions $1, \ldots, V$, and a set of node portions is $\sim V = \{1, \ldots, V\}$; B is a predetermined positive integer, with $b = 1, \ldots, B$ and a set of positive integers equal to or less than B is $\sim B = \{1, \ldots, B\}$; a set of node portions connected with a node portion i is $\sim N(i)$; t is an integer, with $t = 0, \ldots, T-1$, where T is a positive integer; the bth vector constituting a dual variable $\lambda_{i|j}$ at the node portion i with respect to a node portion j is $\lambda_{i|j,b}$; the dual variable $\lambda_{i|j,b}$ after the t+1th update is $\lambda_{i|j,b}^{(t+1)}$; the bth vector constituting a dual auxiliary variable $z_{i|j}$ of the dual variable $\lambda_{i|j}$ is $z_{i|j,b}$; the dual auxiliary variable $z_{i|j,b}$ after the t+1th update is $z_{i|j,b}(t+1)$; the bth vector constituting a dual auxiliary variable $y_{i|j}$ of the dual variable is $\lambda_{i|j}$ is $y_{i|j,b}$; the dual auxiliary variable $y_{i|j,b}$ after the t+1th update is $y_{i|j,b}^{(t+1)}$; the bth element of a primal variable $w_i$ of the node portion i is $w_{i,b}$; the dual auxiliary variable $w_{i,b}$ after the t+1th update is $w_{i,b}^{(t+1)}$;

a cost function corresponding to the node portion i used in the machine learning is $f_i$; a first-order gradient of the cost function $f_i$ with respect to $w_{i,b}^{(t)}$ is $\nabla f_i(w_{i,b}^{(t)})$; I is an identity matrix;

O is a zero matrix; $\sigma_1$ is a predetermined positive number; $\eta$ is a positive number; and a matrix $A_{i|j}$ at the node portion i with respect to a node portion j is defined by the formula below, $$A_{i|j} = \begin{cases} I & (i > j,\ j \in \tilde{N}(i)) \\ -I & (i < j,\ j \in \tilde{N}(i)), \\ O & (\text{otherwise}) \end{cases}$$

and
for $t = 0, \ldots, T-1$,
(a) a step in which the node portion i performs an update of the dual variable according to the formula below:

for $i \in \tilde{V},\ j \in \tilde{N}(i),\ b \in \tilde{B}$, $$\lambda_{i|j,b}^{(t+1)} = \left(\frac{1}{\sigma_1}I + \eta A_{i|j}A_{i|j}^T\right)^{-1}\left[A_{i|j}(w_{i,b}^{(t)} - \eta \nabla f_i(w_{i,b}^{(t)})) + \frac{1}{\sigma_1}z_{i|j,b}^{(t)}\right]$$

where $A^T$ denotes the transpose matrix of a matrix A, and
(b) a step in which the node portion i performs an update of the primal variable according to the formula below:

for $i \in \sim V, b \in \sim B$, $w_{i,b}^{(t+1)} = w_{i,b}^{(t)} - \eta(\nabla f_i(w_{i,b}^{(t)}) + \Sigma A_{i|j}^T \lambda_{i|j,b}^{(t+1)} j \in \tilde{N}(i))$, and
for some or all of $t = 0, \ldots, T-1$, the following are performed in addition to the step (a) and the step (b):
(c) a step in which, with $i \in \sim V$, $j \in \sim N(i)$, and $b \in \sim B$, at least one node portion i sends the dual auxiliary variable $y_{i|j,b}^{(t+1)}$ to at least one node portion j, and
(d) a step in which, with $i \in \sim V$, $j \in \sim N(i)$, and $b \in \sim B$, the node portion i that has received a dual auxiliary variable $y_{j \in i,b}^{(t+1)}$ sets $z_{i|j,b}(t+1) = y_{j|i,b}^{(t+1)}$, and
performing machine learning wherein the machine learning is carried out even when the cost function is not a convex function, wherein
the primal variable is updated independently of the plurality of the node portions.

* * * * *